(12) United States Patent
Miyake et al.

(10) Patent No.: US 10,890,502 B2
(45) Date of Patent: Jan. 12, 2021

(54) PRESSURE SENSOR DEVICE

(71) Applicant: FUJI ELECTRIC CO.,LTD., Kanagawa (JP)

(72) Inventors: Shuntaro Miyake, Matsumoto (JP); Shojiro Kurimata, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 256 days.

(21) Appl. No.: 16/114,156

(22) Filed: Aug. 27, 2018

(65) Prior Publication Data

US 2019/0078957 A1 Mar. 14, 2019

(30) Foreign Application Priority Data

Sep. 8, 2017 (JP) .................................. 2017-173571
Apr. 24, 2018 (JP) .................................. 2018-082944
Jul. 19, 2018 (JP) .................................. 2018-135613

(51) Int. Cl.
*G01L 9/00* (2006.01)
*G01L 19/14* (2006.01)
*G01L 19/00* (2006.01)
*G01L 19/06* (2006.01)

(52) U.S. Cl.
CPC .......... *G01L 19/147* (2013.01); *G01L 9/0051* (2013.01); *G01L 9/0055* (2013.01); *G01L 19/0084* (2013.01); *G01L 19/0627* (2013.01); *G01L 19/142* (2013.01); *G01L 19/148* (2013.01)

(58) Field of Classification Search
CPC ... G01L 19/147; G01L 19/142; G01L 19/148; G01L 9/0051
See application file for complete search history.

(56) References Cited

U.S. PATENT DOCUMENTS

| 4,918,992 | A | * | 4/1990 | Mathias | ................ | G01L 19/141 |
| | | | | | | 338/4 |
| 5,600,071 | A | | 2/1997 | Sooriakumar et al. | | |
| 6,140,144 | A | * | 10/2000 | Najafi | ................. | B81C 1/00269 |
| | | | | | | 438/106 |
| 8,215,176 | B2 | * | 7/2012 | Ding | ..................... | G01L 19/143 |
| | | | | | | 73/721 |
| 9,006,847 | B2 | * | 4/2015 | Welter | ................ | G01L 19/0627 |
| | | | | | | 257/417 |
| 9,885,626 | B2 | * | 2/2018 | Haag | ..................... | B81B 3/0021 |
| 9,945,747 | B1 | * | 4/2018 | Kusanale | ............ | G01L 19/0627 |

(Continued)

FOREIGN PATENT DOCUMENTS

| JP | H09126927 A | 5/1997 |
| JP | 2004361308 A | 12/2004 |

(Continued)

*Primary Examiner* — Jamel E Williams

(57) ABSTRACT

A pressure sensor device including: an absolute pressure sensor unit; a sensor case to accommodate the absolute pressure sensor unit; and an adhesive provided between the absolute pressure sensor unit and the sensor case to fix the absolute pressure sensor unit and the sensor case together, is provided. The sensor case has protrusions on the bottom surface, the absolute pressure sensor unit is provided above the protrusions, and there is space free of the adhesive at a part of a region between the absolute pressure sensor unit and the sensor case, and under the absolute pressure sensor unit.

21 Claims, 41 Drawing Sheets

(56) References Cited

U.S. PATENT DOCUMENTS

| | | | |
|---|---|---|---|
| 10,006,825 B2* | 6/2018 | Brida | G01L 19/04 |
| 10,717,645 B2* | 7/2020 | Feyh | H01L 23/24 |
| 2005/0016289 A1 | 1/2005 | Saito et al. | |
| 2009/0071259 A1* | 3/2009 | Tanaka | G01L 9/0042 |
| | | | 73/725 |
| 2010/0224945 A1 | 9/2010 | Takahata et al. | |
| 2013/0167650 A1 | 7/2013 | Albicker et al. | |
| 2017/0350783 A1* | 12/2017 | Sixtensson | G01L 19/147 |
| 2018/0252606 A1* | 9/2018 | Kishimoto | G01L 9/0054 |
| 2018/0282148 A1* | 10/2018 | Hayashi | G01L 9/0073 |
| 2018/0313711 A1* | 11/2018 | Sixtensson | G01L 19/04 |

FOREIGN PATENT DOCUMENTS

| | | |
|---|---|---|
| JP | 2010027925 A | 2/2010 |
| JP | 2010230655 A | 10/2010 |
| JP | 2013537967 A | 10/2013 |
| JP | 2014048072 A | 3/2014 |
| JP | 2014145623 A | 8/2014 |

* cited by examiner

150

100

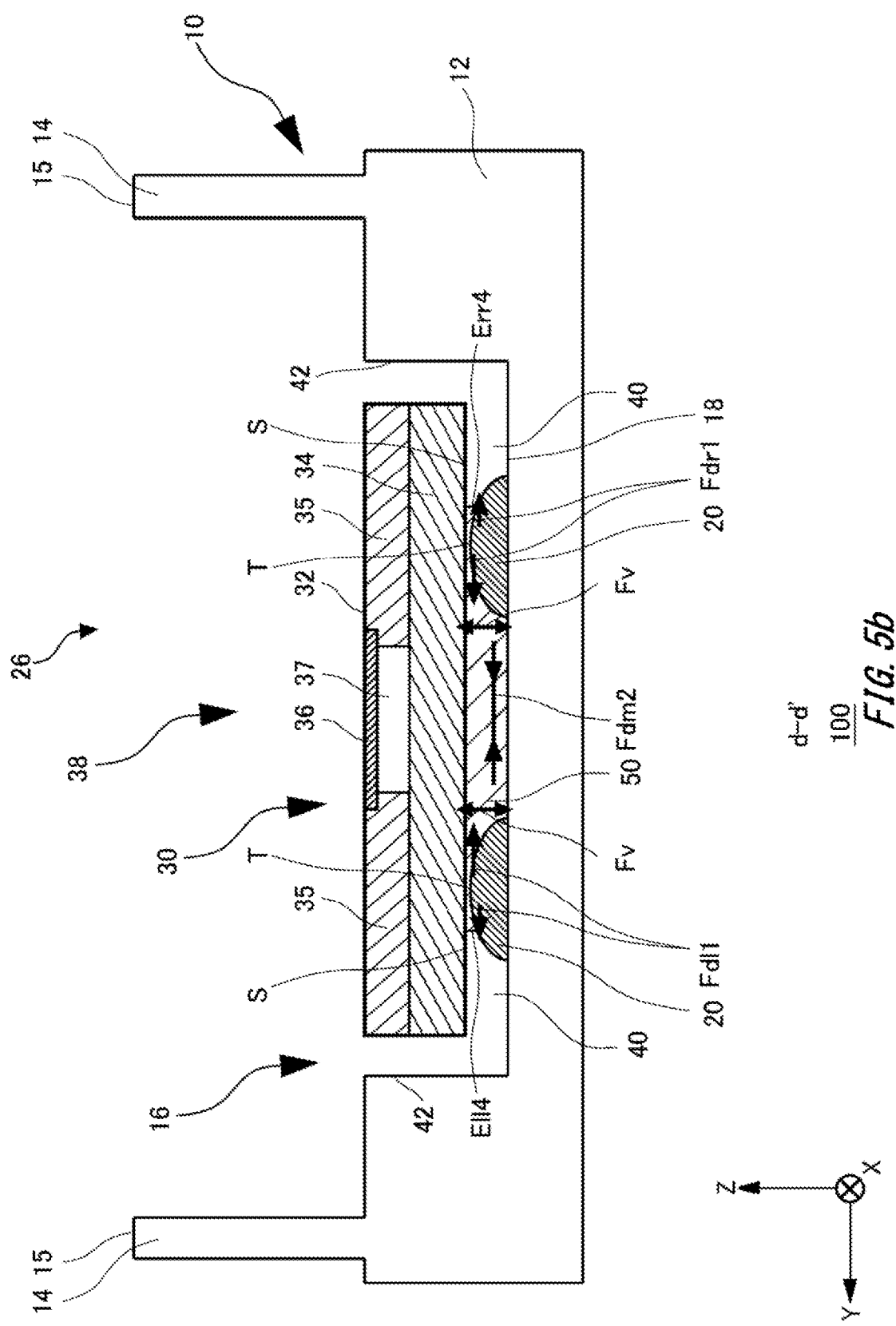

160

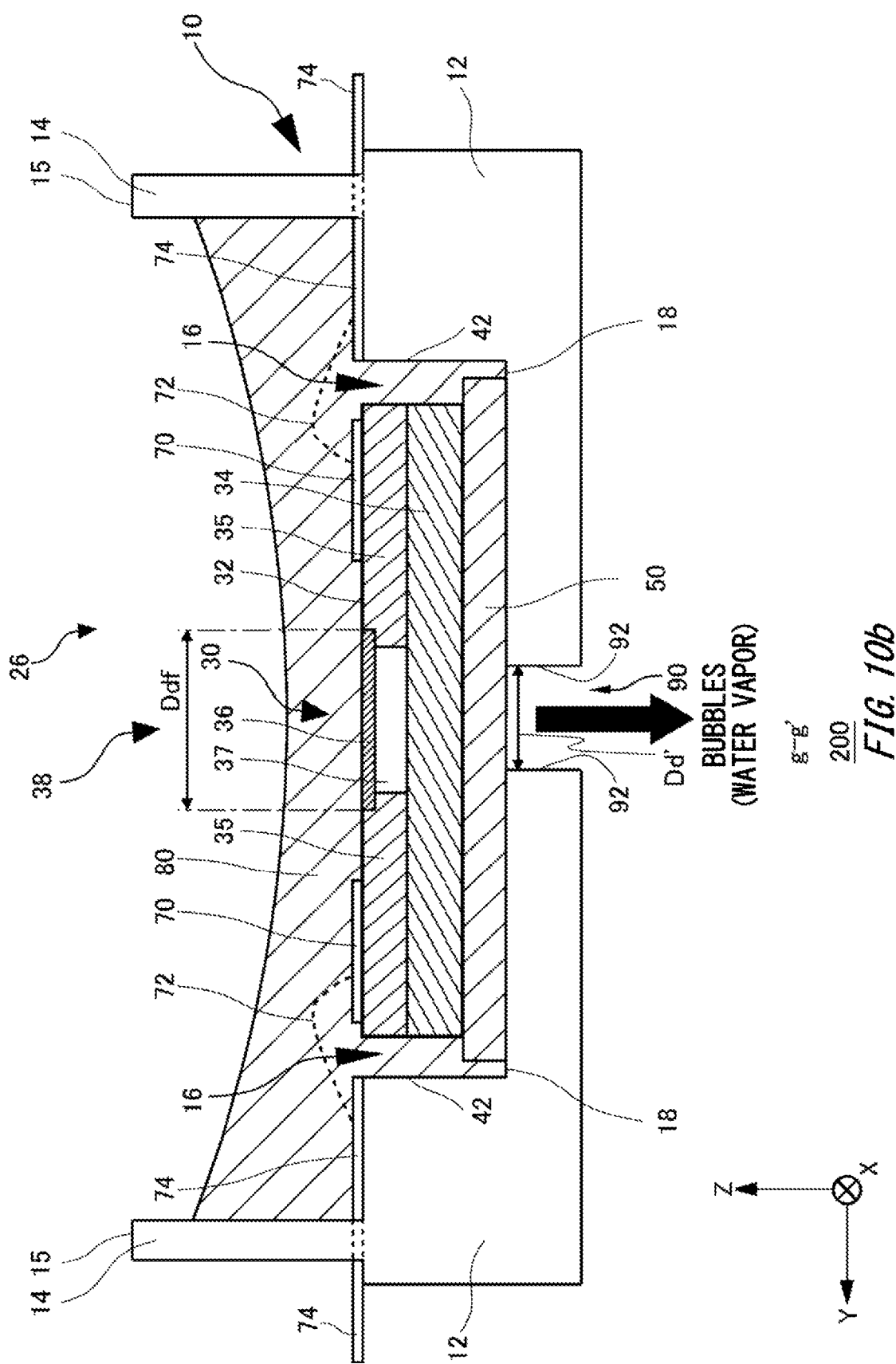

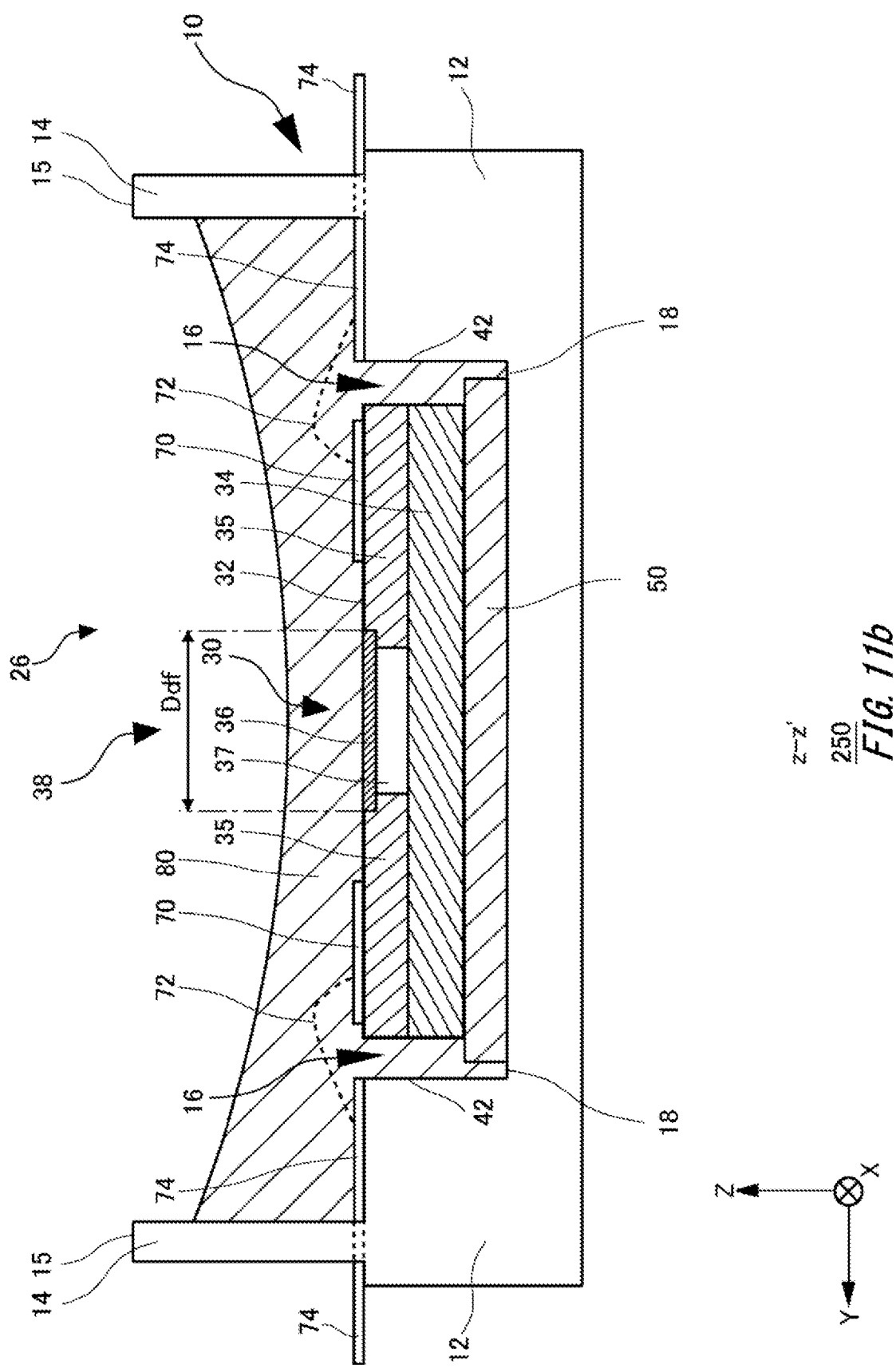

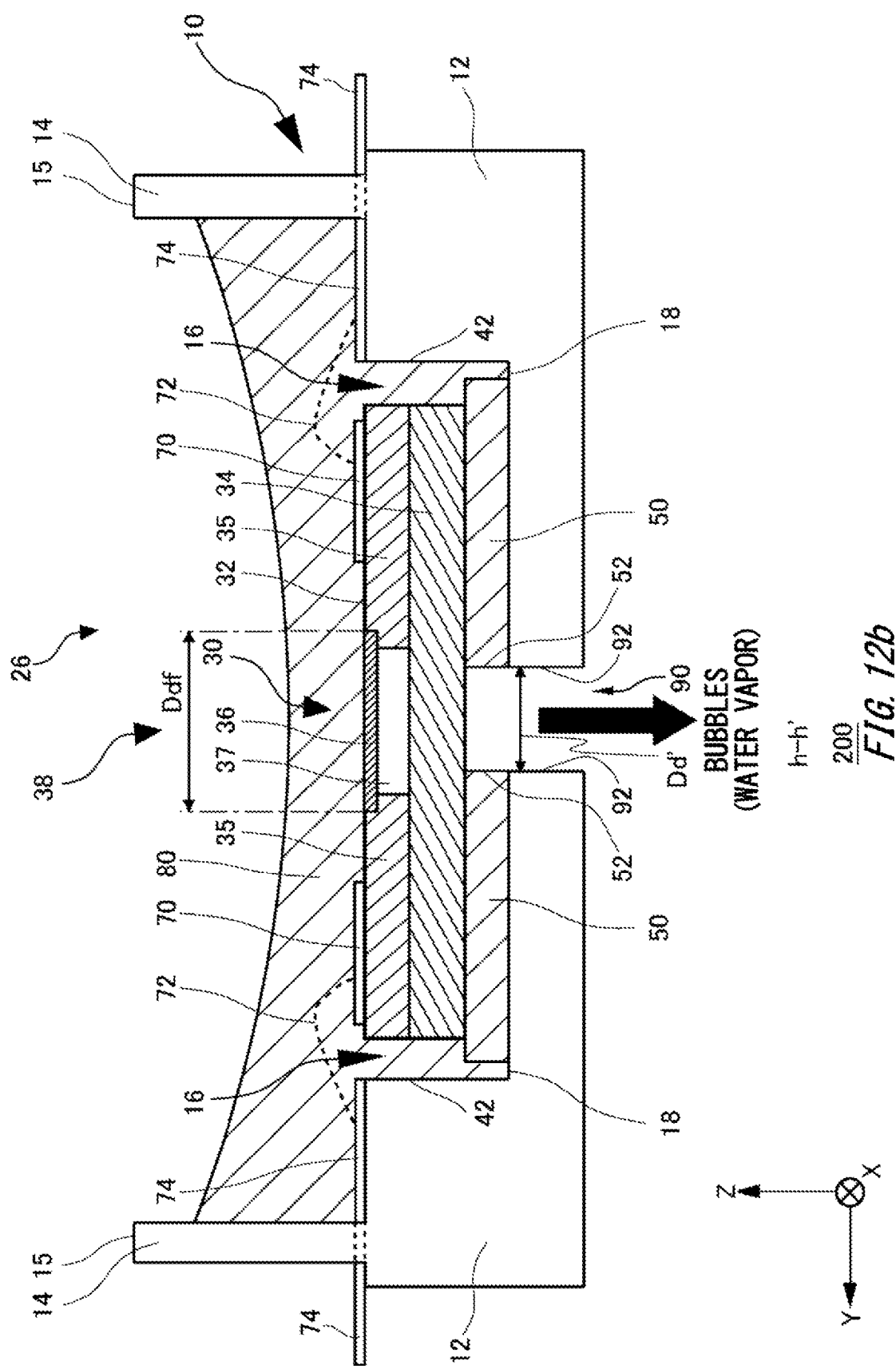

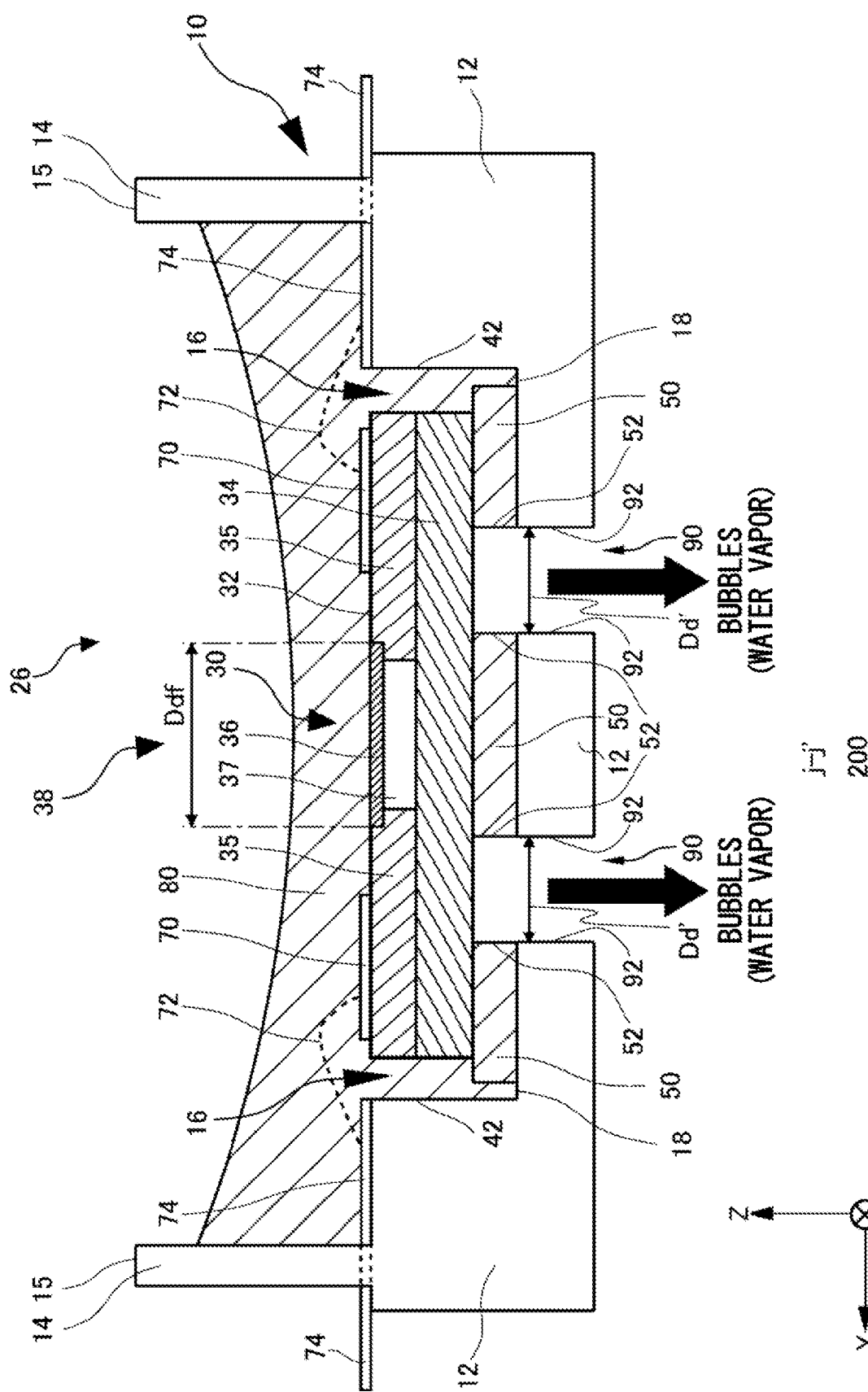

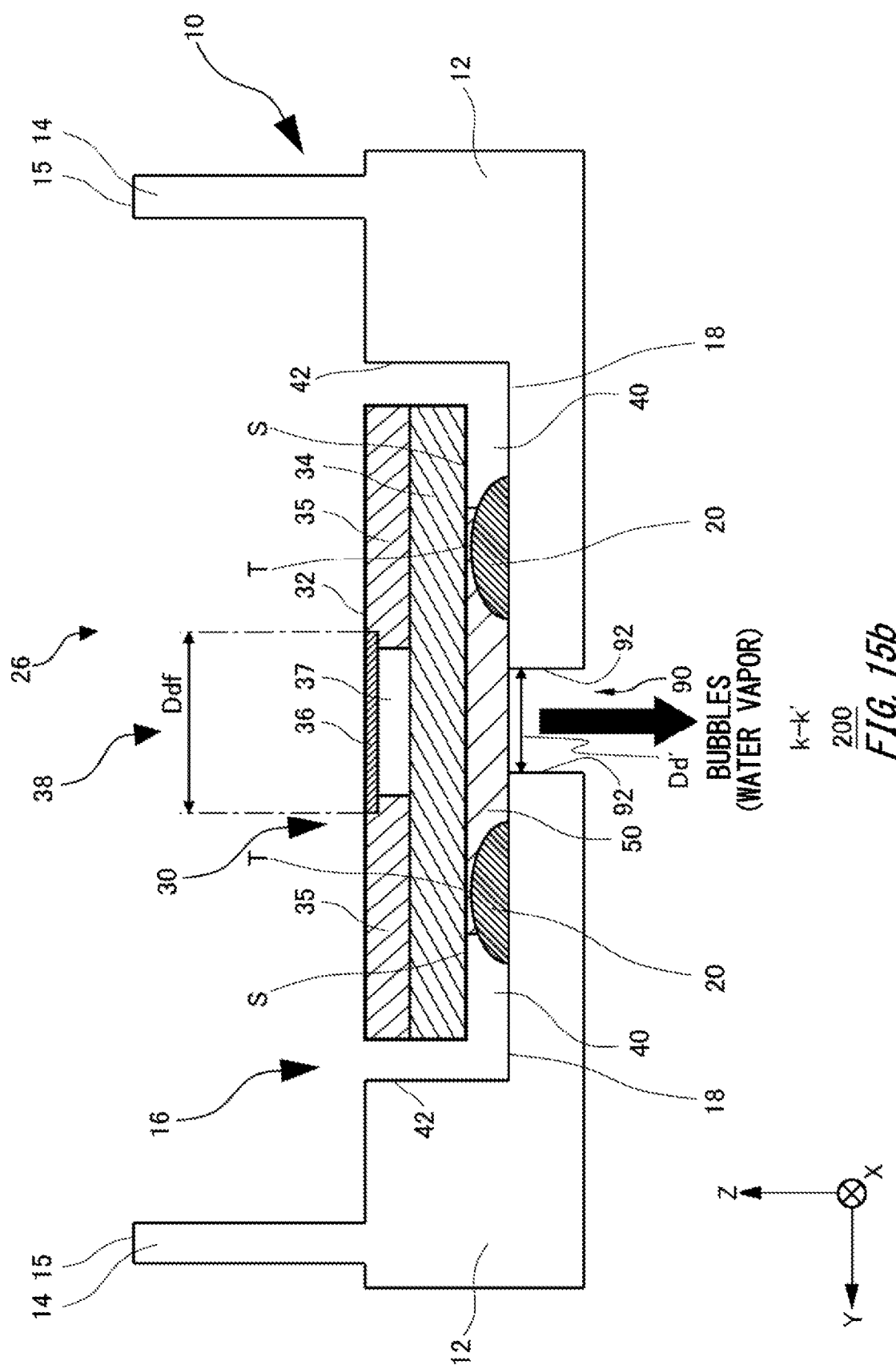

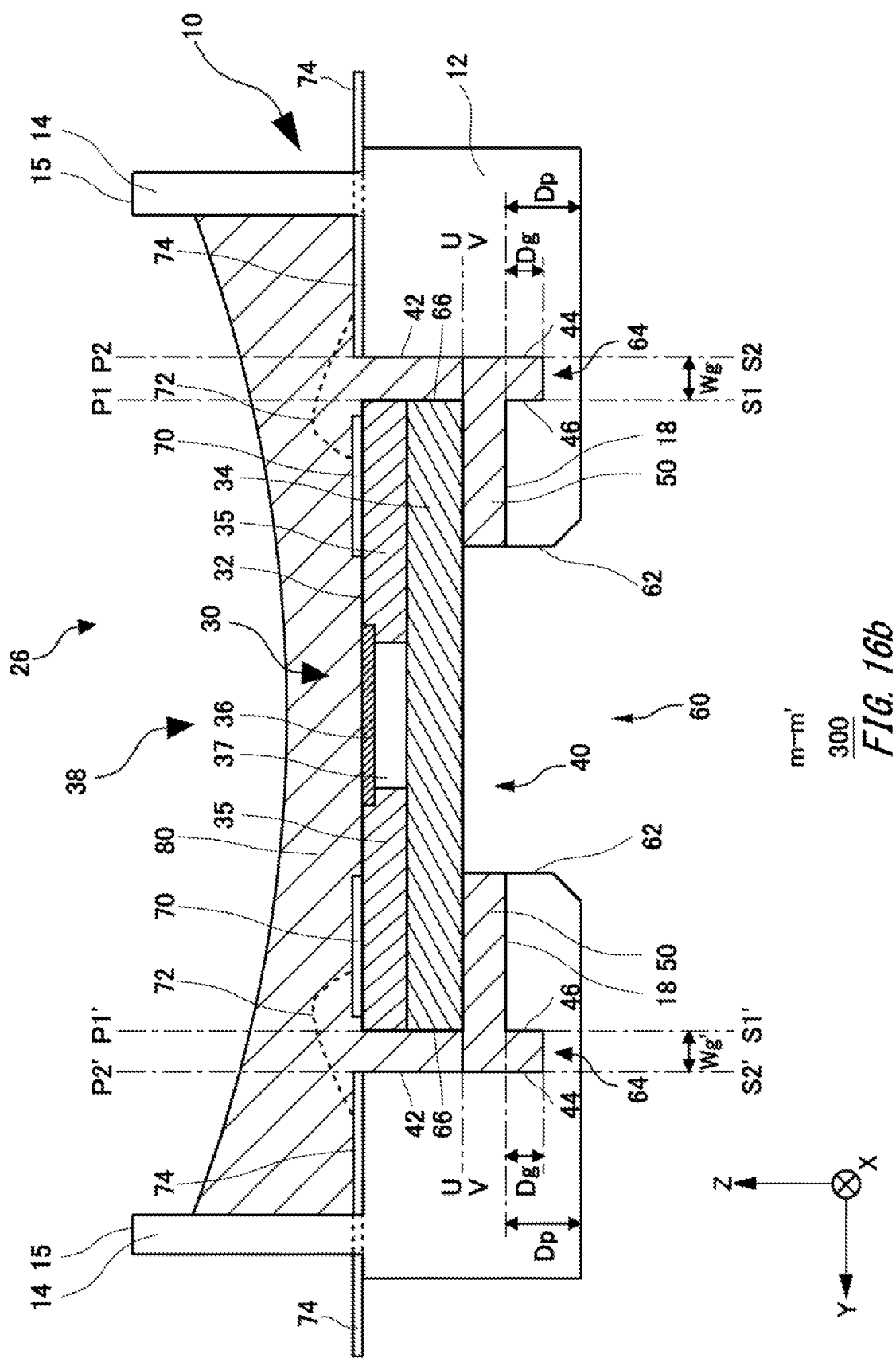

PRESSURE SENSOR DEVICE

The contents of the following Japanese patent application(s) are incorporated herein by reference:
NO. 2017-173571 filed in JP on Sep. 8, 2017
NO. 2018-082944 filed in JP on Apr. 24, 2018 and
NO. 2018-135613 filed in JP on Jul. 19, 2018.

BACKGROUND

1. Technical Field

The present invention relates to a pressure sensor device.

2. Related Art

Conventionally, pressure sensor device such as absolute pressure sensors device have been known (refer to Patent Documents 1, 2, and 3 for example).
Patent Document 1: Japanese Patent Application Publication No. H9-126927.
Patent Document 2: Japanese Patent Application Publication No. 2010-27925.
Patent Document 3: Japanese Patent Application Publication No. 2004-361308.

It is required to ensure reliability in pressure sensor device. For example, it is preferable to suppress a temporal change of output.

SUMMARY

In the first aspect of the present invention, a pressure sensor device including: an absolute pressure sensor unit; a sensor case to accommodate the absolute pressure sensor unit; and an adhesive provided between the absolute pressure sensor unit and the sensor case to fix the absolute pressure sensor unit and the sensor case together, is provided. The sensor case has protrusions on the bottom surface. The absolute pressure sensor unit is provided above the protrusions. There is space free of the adhesive between the absolute pressure sensor unit and the sensor case, and under a part of the absolute pressure sensor unit.

At least three protrusions may be provided in the sensor case. The adhesive may be provided outside the space when seen from above, under the absolute pressure sensor unit. There may be space inside a region surrounded by a plurality of protrusions. The adhesive may be provided inside the space when seen from above, under the absolute pressure sensor unit. There may be space outside a region surrounded by a plurality of protrusions.

A plurality of protrusions may contact space. There may be an aperture on the bottom surface of the sensor case, at a position overlapping the absolute pressure sensor unit when seen from above the sensor case. The adhesive may not exist above the aperture. The protrusions may have notch portions, when seen from above the sensor case. Ends of the notch portions and an end of the aperture may overlap, when seen from above the sensor case. The ends of the notch portions may pass through tops of the protrusions.

The adhesive may be provided above the protrusions so as to contact the protrusions. The absolute pressure sensor unit may be provided above the adhesive so as to contact the adhesive.

The pressure sensor device may further include a protectant composed of the same kind of material as a composing material of the adhesive. The sensor case may be filled with the protectant such that the absolute pressure sensor unit is covered with the protectant.

In the second aspect of the present invention, a pressure sensor device including: an absolute pressure sensor unit; and a sensor case to: accommodate the absolute pressure sensor unit; have a pressure receiving aperture portion on an upper surface; and have a bottom surface aperture portion smaller than the pressure receiving aperture portion on the bottom surface, is provided.

The sensor case may have a concave portion for accommodating the absolute pressure sensor unit. The sensor case may have the bottom surface aperture portion on the bottom surface of the concave portion. The sensor case may have a plurality of bottom surface aperture portions.

The pressure sensor device may further include an adhesive provided between the absolute pressure sensor unit and the sensor case to fix the absolute pressure sensor unit and the sensor case together. The adhesive may be provided above the bottom surface aperture portion. The adhesive may not be provided above the bottom surface aperture portion.

The sensor case may have protrusions on the bottom surface. The protrusions may be provided in regions that are different from regions of the bottom surface aperture portion.

Grooves may be provided to ends of the bottom surface of the sensor case. The grooves may be provided so as to surround the absolute pressure sensor unit when seen from above the sensor case.

The grooves may be provided to positions not overlapping the absolute pressure sensor unit when seen from above the sensor case.

Note that, the summary clause does not necessarily describe all necessary features of the embodiments of the present invention. The present invention may also be a sub-combination of the features described above.

BRIEF DESCRIPTION OF THE DRAWINGS

FIG. 1b is an enlarged drawing of the region A shown in FIG. 1a.

FIG. 1c is a drawing to illustrate an exemplary a-a' cross section shown in FIG. 1a.

FIG. 1d is a drawing to illustrate an exemplary perspective view of the pressure sensor device 100 shown in FIG. 1a.

FIG. 2b is the aa-aa' cross sectional view of FIG. 2a.

FIG. 3b is a drawing to illustrate an exemplary b-b' cross section shown in FIG. 3a.

FIG. 4b is a drawing to illustrate an exemplary c-c' cross section shown in FIG. 4a.

FIG. 5b is a drawing to illustrate an exemplary d-d' cross section shown in FIG. 5a.

FIG. 6b is the dd-dd' cross sectional view of FIG. 6a.

FIG. 7b is a drawing to illustrate an exemplary e-e' cross section shown in FIG. 7a.

FIG. 8b is a drawing to illustrate an exemplary f-f' cross section shown in FIG. 8a.

FIG. 9a is a drawing to illustrate a temporal change of a variation of output of the pressure sensor device 100 of FIG. 1a.

FIG. 9b is a drawing to illustrate a temporal change of a variation of output of the pressure sensor device 100 of FIG. 1a.

FIG. 9c is a drawing to illustrate a temporal change of a variation of output of the pressure sensor device 100 of FIG. 1a.

FIG. 10b is a drawing to illustrate an exemplary g-g' cross section shown in FIG. 10a.

FIG. 11b is a drawing to illustrate a z-z' cross section of FIG. 11a.

FIG. 11c is a drawing to illustrate a cross section in case of heating a sensor case 10 in the z-z' cross section of FIG. 11a.

FIG. 12b is a drawing to illustrate an exemplary h-h' cross section shown in FIG. 12a.

FIG. 13b is a drawing to illustrate an exemplary i-i' cross section shown in FIG. 13a.

FIG. 14b is a drawing to illustrate an exemplary j-j' cross section shown in FIG. 14a.

FIG. 15b is a drawing to illustrate an exemplary k-k' cross section shown in FIG. 15a.

FIG. 16b is a drawing to illustrate an exemplary m-m' cross section shown in FIG. 16a.

FIG. 17b is a drawing to illustrate an n-n' cross section shown in FIG. 17a.

FIG. 18b is a drawing to illustrate a p-p' cross section shown in FIG. 18a.

DESCRIPTION OF EXEMPLARY EMBODIMENTS

Hereinafter, the present invention will be described with reference to embodiments of the invention. However, the following embodiments should not to be considered as limiting the claimed invention. Also, every combination of features described with reference to the embodiments should not to be considered essential to means provided by aspects of the invention.

In the present specification, one direction side parallel with a depth direction of an absolute pressure sensor unit is referred to as an "upper" side, and the other direction side is referred to as a "lower" side. Between two principal surfaces of an absolute pressure sensor unit, one surface is referred to as an upper surface and the other surface is referred to as a lower surface. The "upper" and "lower" directions shall not to be limited to the gravitational direction.

In the present specification, technical matters may be described using orthogonal coordinate axes of an X axis, Y axis and Z axis. In the present specification, a plane parallel with an upper surface of an absolute pressure sensor unit is defined as an XY plane, and a depth direction of an absolute pressure sensor unit is defined as the Z axis.

Figure 1A:
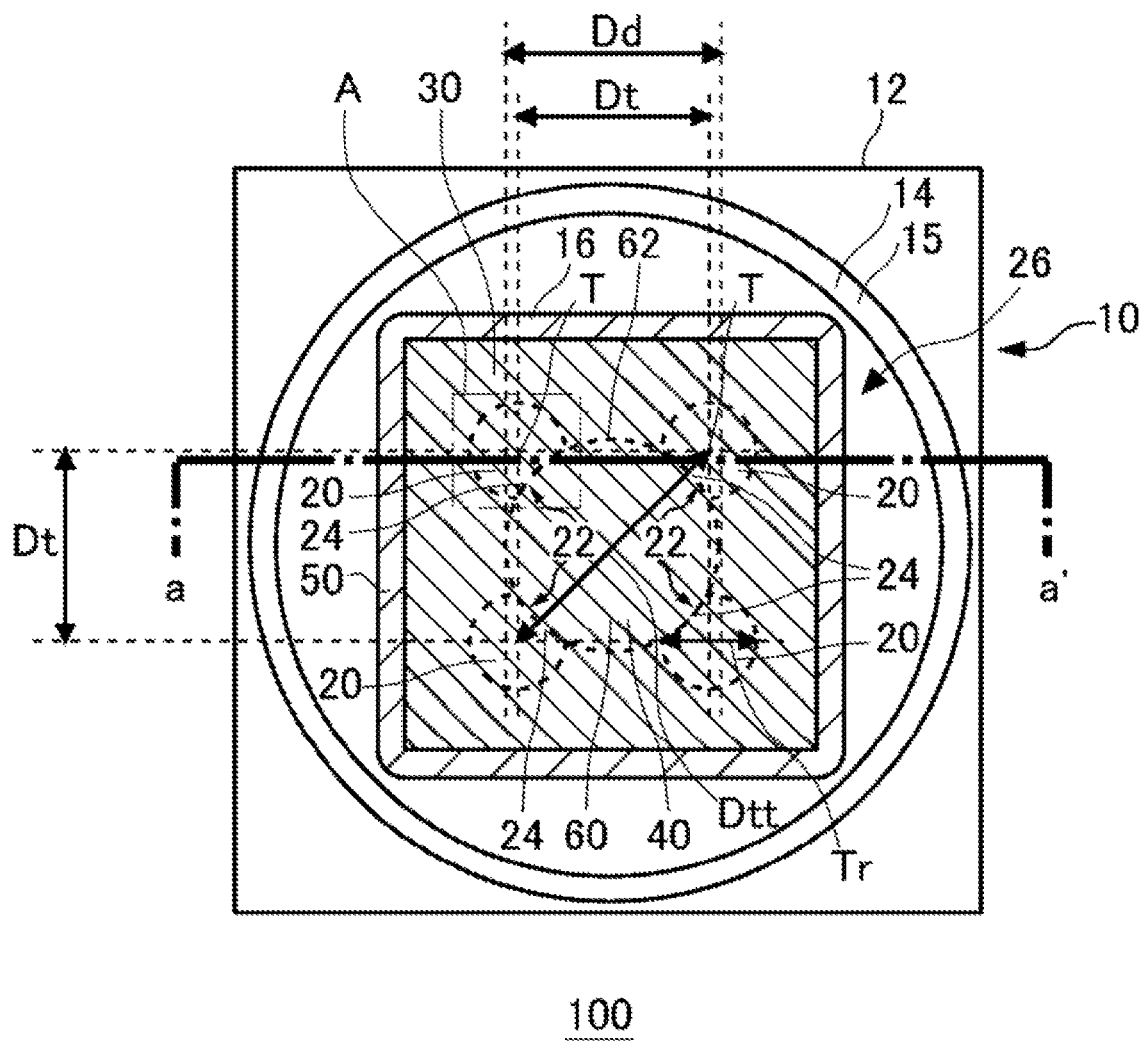
FIG. 1a is a drawing to illustrate an exemplary upper surface of a pressure sensor device 100 according to the present embodiment.

FIG. 1a is a drawing to illustrate an exemplary upper surface of a pressure sensor device 100 according to the present embodiment. The pressure sensor device 100 includes an absolute pressure sensor unit 30, and a sensor case 10 to accommodate the absolute pressure sensor unit 30. The absolute pressure sensor is a sensor to measure differential pressure between pressure in enclosed space that is arranged on a lower surface side of a diaphragm and pressure in a space that is to be measured and on an upper surface side of the diaphragm. An exemplary pressure in the enclosed space is vacuum pressure.

The absolute pressure sensor unit 30 detects pressure from the space that is to be measured. The absolute pressure sensor unit 30 has, as an example, a piezoelectric device that generates voltage corresponding to pressure applied thereto. The piezoelectric device may be a piezo device formed on a semiconductor substrate such as a silicon substrate.

The sensor case 10 is formed of resin, as an example. The sensor case 10 of the present example has a concave portion 16 to accommodate the absolute pressure sensor unit 30. The shape of the concave portion 16 illustrated in FIG. 1a is a quadrangle shape in a top view. However, the shape of the concave portion 16 is not limited to be this shape. The absolute pressure sensor unit 30 is fixed to the bottom surface of the concave portion 16 with an adhesive 50. The bottom surface of the concave portion 16 is filled with the adhesive 50. Note that, the bottom surface of the concave portion 16 refers to a surface facing the absolute pressure sensor unit 30 in a region on which the absolute pressure sensor unit 30 is mounted.

The sensor case 10 has a base portion 12 in which the concave portion 16 is provided, and a wall 14 provided in the upper surface of the base portion 12 so as to surround the concave portion 16, as an example. The base portion 12 and the wall 14 are formed of resin, as an example. The wall 14 may be provided integrally with the base portion 12. The wall 14 is in a cylindrical shape as an example. The upper portion of the cylindrical shape is formed into an open end connected to the space that is to be measured.

The bottom surface of the concave portion 16 of the sensor case 10 is provided with protrusions 20. The pressure sensor device 100 of the present example is provided with four protrusions 20 as an example. Although the four protrusions 20 are provided such that the four protrusions 20 form a square in the XY plane in the present example, they may also be provided to form another shape such as a rectangular shape.

The adhesive 50 is provided outside space 40 under the absolute pressure sensor unit 30, when seen from above. Here, providing the adhesive 50 outside the space 40 refers to providing the space 40 on the middle side of the absolute pressure sensor unit 30 in the XY plane, and providing the adhesive 50 outside the space 40, when seen from above.

On the bottom surface of the concave portion 16, the space 40 free of the adhesive 50 is provided in a region under the absolute pressure sensor unit 30, inside a region surrounded by four protrusions 20 in the XY plane so as to contact the four protrusions 20 in the present example. Note that, if three or more protrusions 20 exist, space 40 free of an adhesive 50 is not necessarily required to be provided inside a region surrounded by all the protrusions 20. That is, space 40 free of an adhesive 50 may be provided away from at least one protrusion 20 among the three or more protrusions 20, and the space 40 free of the adhesive 50 may be provided inside a region surrounded by the rest of the plurality of protrusions 20. Also, in the present example, edges 24 of notch portions 22 of the protrusions 20 overlap an edge 62 of an aperture 60, when seen from above.

The bottom surface of the sensor case 10 has the aperture 60 at a position overlapping the absolute pressure sensor unit 30 in the XY plane. Although the aperture 60 is provided in a circular shape in the XY plane in the present example, it may be provided in another shape such as a quadrangle shape. The diaphragm to detect pressure exists on the center side of the absolute pressure sensor unit 30 in the XY plane. Thus, it is preferable for the adhesive 50 not to exist at the center portion of the absolute pressure sensor unit 30, and to exist in the peripheral portion in the XY plane instead.

The sensor case 10 has a pressure receiving aperture portion 26 on an upper surface 15. The upper surface 15 refers to an upper surface of the wall 14. That is, in the present example, the pressure receiving aperture portion 26 refers to the inside of the wall 14 when seen from above, i.e., a region surrounded by the wall 14. Although the wall 14 is provided in a circular shape and the pressure receiving aperture portion 26 is provided in a circular shape when seen from above in the present example, they may be provided in other shapes such as quadrangle shapes.

Distance Dt between centers of adjacent protrusions 20 in the XY plane may be from 150% to 250% inclusive of a diameter Tr of a protrusion 20. A diameter Dd of the aperture 60 may be set such that the aperture 60 fits inside the region surrounded by the four protrusions 20. The diameter Dd may be from 80% to 120% inclusive of the distance Dt, as an example.

The diameter Tr may be 0.8 mm, as an example. The distance Dt may be 1.6 mm, as an example. Distance Dtt of a diagonal line in the square formed by the protrusions 20 in the XY plane may be 2.26 mm, as an example. Also, the diameter Dd may be 1.8 mm, as an example. The diameter Dd may be 0.3 mm or longer. Moreover, the diameter Dd may be equal to the distance Dtt or shorter.

Figure 1B:
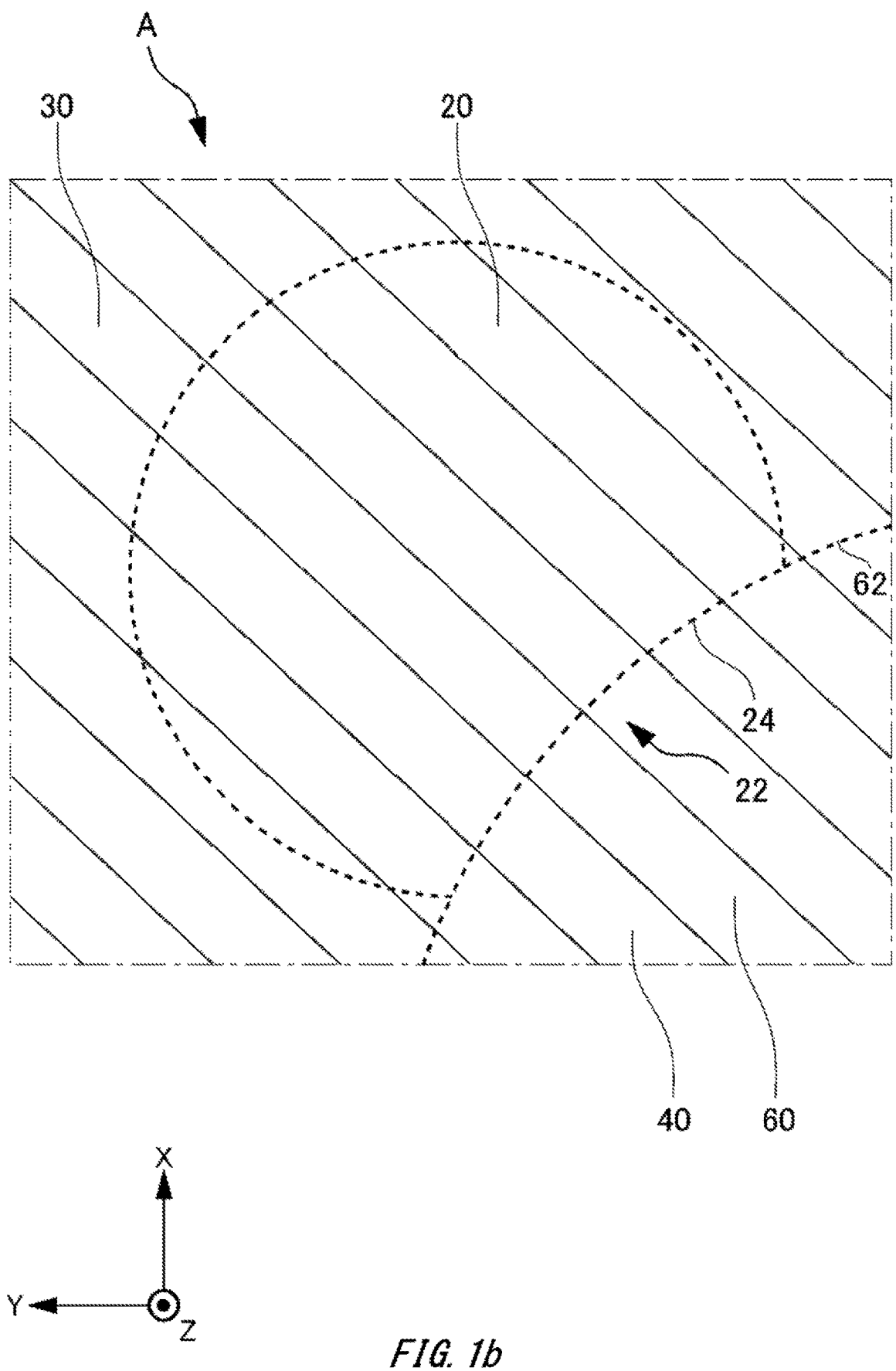

FIG. 1b is an enlarged drawing of the region A shown in FIG. 1a. As shown in FIG. 1b, a protrusion 20 has a notch portion 22 in the XY plane. The protrusion 20 of the present example is in a circular shape in the XY plane, and a part of the outer circumference of the circle is inwardly recessed to form the notch portion 22. Note that, the shape of the protrusion 20 in the XY plane is not limited to a circle. An edge 24 of the notch portion 22 and the edge 62 of the aperture 60 in the XY plane overlap when seen from above. If the aperture 60 is tapered, the edge 62 of the aperture 60 refers to an edge of the concave portion 16 on the bottom surface. Similarly, the edge 24 of the notch portion 22 may refer to the edge of the concave portion 16 on the bottom surface.

Figure 1C:
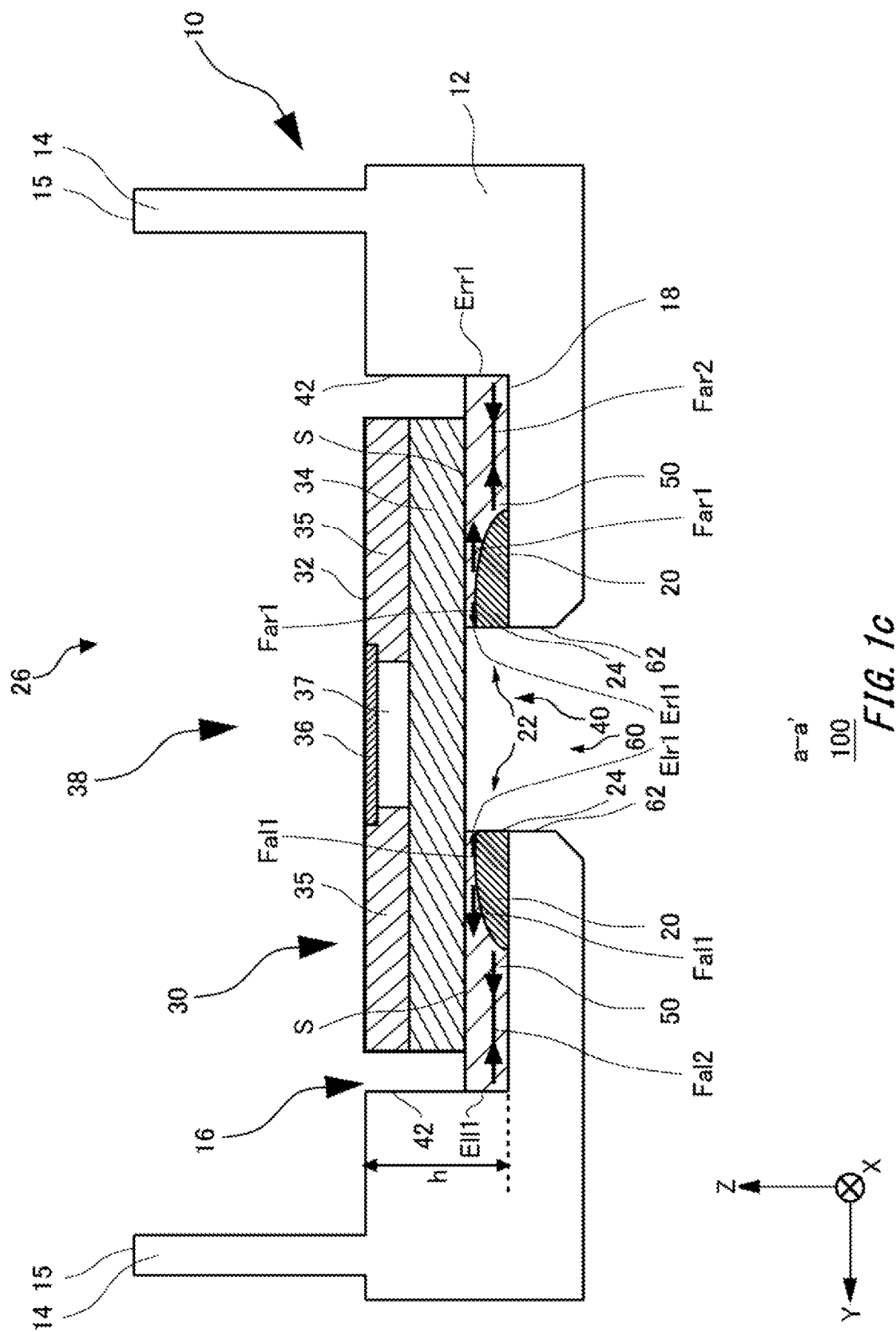

FIG. 1c is a drawing to illustrate an exemplary a-a' cross section shown in FIG. 1a. FIG. 1c schematically illustrates an exemplary cross section of the sensor case 10. The wall 14 is provided on the base portion 12 so as to surround the concave portion 16. The wall 14 may be provided protruding from the base portion 12 in the Z axis direction.

The absolute pressure sensor unit 30 of the present example has a support substrate 34 formed of insulating material such as glass, and a semiconductor substrate 35 that is formed of semiconductor material such as silicon and fixed to the support substrate 34. A diaphragm 36 is provided to the upper surface side of the semiconductor substrate 35. The diaphragm 36 may be provided inside a region surrounded by two protrusions 20 in the a-a' cross section. Also, the diaphragm 36 may be provided inside a region surrounded by the four protrusions 20 in the top view in FIG. 1a.

The semiconductor substrate 35 is provided with an enclosed space 37 under the diaphragm 36. The enclosed space 37 of the present example is enclosed by the semiconductor substrate 35 and the support substrate 34. A piezo device or the like to detect differential pressure between pressure in the enclosed space 37 and pressure in space 38 that is to be measured is arranged on the diaphragm 36.

The concave portion 16 of the sensor case 10 has the bottom surface 18. The bottom surface 18 refers to the bottom of the concave portion 16 facing the bottom surface of the absolute pressure sensor unit 30. The bottom surface 18 is provided with the protrusions 20. The bottom surface 18 may be provided with the protrusions 20 after providing the sensor case 10 with the concave portion 16, or the protrusions 20 may be formed integrally with the bottom surface 18. The protrusions 20 have functions to make thickness of the adhesive 50 constant in the Z axis direction. Height of the protrusions 20, i.e., the thickness of the protrusions 20 in the Z axis direction, may be from 60 μm to 200 μm inclusive, as an example. Although the protrusions 20 are circular in the XY plane in the present example, they may be in other shapes such as quadrangle shapes.

An upper surface 32 of the absolute pressure sensor unit 30 may be arranged at a position higher than an upper end of the concave portion 16, may be arranged at a position lower than the upper end, or may be arranged at a position at the same height level as the upper end. That is, the height from the bottom surface 18 to the upper surface 32 of the absolute pressure sensor unit 30 may be larger than the height h from the bottom surface 18 to the upper end of the concave portion 16, may be smaller than the height h, or may be the same as the height h. FIG. 1c illustrates an example in which the height from the bottom surface 18 to the upper surface 32 matches the height h from the bottom surface 18 to the upper end of the concave portion 16.

The absolute pressure sensor unit 30 is fixed to the bottom surface 18 with the adhesive 50. Because the absolute pressure sensor unit 30 senses pressure from the upper surface 32, the lower surface of the absolute pressure sensor unit 30 only needs to be fixed to the bottom surface 18. The adhesive 50 is a fluorine-based adhesive as a non-limiting example. PEPE (perfluoropolyether) or the like can be used as a fluorine-based adhesive 50. By providing the bottom surface 18 with the protrusions 20, it is made sure that there is a certain thickness of the adhesive 50 in the Z axis direction, and the thickness of the adhesive 50 can be made constant. The thicker the adhesive 50 in the Z axis direction is, the less likely it is for the stress to be directly propagated from the base portion 12 to the absolute pressure sensor unit 30. Therefore, the stress applied from the base portion 12 to the absolute pressure sensor unit 30 is reduced.

If the absolute pressure sensor unit 30 is applied to a pressure detecting device for measuring intake pressure of an engine that is used in a motor vehicle, the absolute pressure sensor unit 30 will be exposed to a harmful environment such as fuel and the like of the motor vehicle. Thus, if the absolute pressure sensor unit 30 is applied to the pressure detecting device, it is preferable to use a fluorine-based adhesive 50 that is less likely to expand upon exposure to fuel and the like of a motor vehicle and has high resistance, compared with a silicon-based adhesive.

As shown in FIG. 1c, the pressure sensor device 100 of the present example has the space 40 free of the adhesive 50, at a part of a region under the absolute pressure sensor unit 30. Also, there is the aperture 60 on the bottom surface 18. The aperture 60 is provided on the −Z axis direction side relative to the absolute pressure sensor unit 30, in a region overlapping the absolute pressure sensor unit 30. Also, the adhesive 50 does not exist in the aperture 60 on the +Z axis direction side relative to the bottom surface 18. As shown in FIG. 1c, the aperture 60 on the −Z axis direction side relative to the bottom surface 18 may be tapered. The diaphragm 36 may be provided inside a region surrounded by two protrusions 20 in the Y axis direction in the a-a' cross section, and inside a region surrounded by two protrusions 20 in the X axis direction, in the X axis direction perpendicular to the a-a' cross section.

As shown in FIG. 1c, the adhesive 50 on the side close to the −Y axis direction relative to the aperture 60 has two ends: one end Err1 contacting one side wall 42 on the −Y axis direction side of two side walls 42 in the a-a' cross section; and the other end Erl1 on the aperture 60 side. Also, the adhesive 50 on the side close to the +Y axis direction relative to the aperture 60 has two ends: one end Ell1 contacting one side wall 42 on the +Y axis direction side of two side walls 42 in the a-a' cross section; and the other end Elr1 on the aperture 60 side.

The edges 24 of the notch portions 22 and the edge 62 of the aperture 60 overlap in the top view in FIG. 1a. Thus, the end Erl1 and the edge 62 of the aperture 60 also overlap. Similarly, the end Elr1 and the edge 62 of the aperture 60 overlap as well. After providing the bottom surface 18 with the protrusions 20, the structure in which the edges 24 and the edge 62 overlap may be manufactured by punching out the protrusions 20 and the base portion 12 at once to form the aperture 60 so as to provide the notch portions 22.

The pressure sensor device 100 of the present example is manufactured by filling the bottom surface 18 of the sensor case 10 that is punched out to form the aperture 60 with the adhesive 50 up to substantially the same height as the height from the bottom surface 18 to tops T of the protrusions 20 in the Z axis direction, and then mounting the absolute pressure sensor unit 30 on the concave portion 16 filled with the adhesive 50. Thus, the adhesive 50 exists between the tops T of the protrusions 20 and the bottom surface of the absolute pressure sensor unit 30, and the tops T and the bottom surface of the absolute pressure sensor unit 30 do not contact each other. Since the tops T of the protrusions 20 and the bottom surface of the absolute pressure sensor unit 30 do not contact each other in the pressure sensor device 100 of the present example, stress from the base portion 12 is not directly propagated to the bottom surface of the absolute pressure sensor unit 30. Therefore, it is possible to suppress a variation of output of the pressure sensor device 100.

After mounting the absolute pressure sensor unit 30 on the concave portion 16, the stress generated on the bottom surface of the absolute pressure sensor unit 30 is offset-adjusted once. If an external environment such as ambient temperature of the pressure sensor device 100 changes, stress is generated due to difference in thermal expansion coefficient between the bottom surface of the sensor case 10 and the adhesive 50, on an interface S between the sensor case 10 and the adhesive 50. In a process of releasing this stress, a distortion occurs on the bottom surface of the absolute pressure sensor unit 30. This distortion causes a variation of output of the absolute pressure sensor unit 30.

In the pressure sensor device 100 of the present example, the end Erl1 and the edge 62 overlap in the XY plane. Therefore, with respect to a protrusion 20 on the side close to the −Y axis direction relative to the aperture 60, the distance from a top T that exists on the side close to the +X direction relative to the a-a' cross section in FIG. 1c to the end Erl1 can be significantly reduced. Thus, with respect to the protrusion 20 on the side close to the −Y axis direction relative to the aperture 60, tensile stress Far1 applied from the top T to the edge 24 toward the +Y axis direction side can be significantly reduced.

In the pressure sensor device 100 of the present example, the end Elr1 and the edge 62 overlap in the XY plane. Therefore, in a similar manner, with respect to a protrusion 20 on the side close to the +Y axis direction relative to the aperture 60, the distance from a top T that exists on the side close to the +X direction relative to the a-a' cross section in FIG. 1c to the end Elr1 can be significantly reduced. Thus, with respect to the protrusion 20 on the side close to the +Y axis direction relative to the aperture 60, tensile stress Fal1 applied from the top T to the edge 24 toward the −Y axis direction side can be significantly reduced.

In the pressure sensor device 100 of the present example, the distance from a top T to an end of the adhesive 50 in the X axis direction can be made short in the X axis direction as well. Thus, tensile stress applied in the −X axis direction side in FIG. 1c can also be reduced.

As mentioned above, in the pressure sensor device 100 of the present example, the tensile stress Far1 and Fal1 applied in the Y axis direction from the tops T of the protrusions 20 toward a region under the diaphragm 36 can be significantly reduced. Compressive stress Far2 and Fal2 are generated in the adhesives 50 existing on end sides of the bottom surface 18 in the Y axis direction respectively. On the other hand, because the aperture 60 is provided but the adhesive 50 is not provided in a region under the diaphragm 36 having larger influence on a variation of output of the pressure sensor device 100, the tensile stress caused by the existence of the adhesive 50 can also be suppressed. Thus, a distortion caused on the bottom of the absolute pressure sensor unit 30, positioned on the aperture 60, can be suppressed. Therefore, it is possible to suppress a variation of output of the absolute pressure sensor unit 30.

Also, in the pressure sensor device 100 of the present example, because the bottom surface 18 is filled with the adhesive 50, the adhesive 50 contacts the side walls 42 of the concave portion 16. That is, in the pressure sensor device 100 of the present example, there is no space 40 between the adhesive 50 and the side walls 42. Thus, bubbles are unlikely to enter the adhesive 50. Therefore, stress derived from the bubbles is unlikely to be generated on the interface S.

Note that, although the stress generated originating from a protrusion 20 and applied to the adhesive 50, and the stress generated at the adhesive 50 between a protrusion 20 and a side wall 42 are defined as tensile stress and compressive stress respectively in the present embodiment, this relation of the tensile stress and the compressive stress can be reversed by heating or cooling. Thus, the arrows in the drawing to indicate the tensile stress and the compressive stress are provided merely for convenience.

Figure 1D:
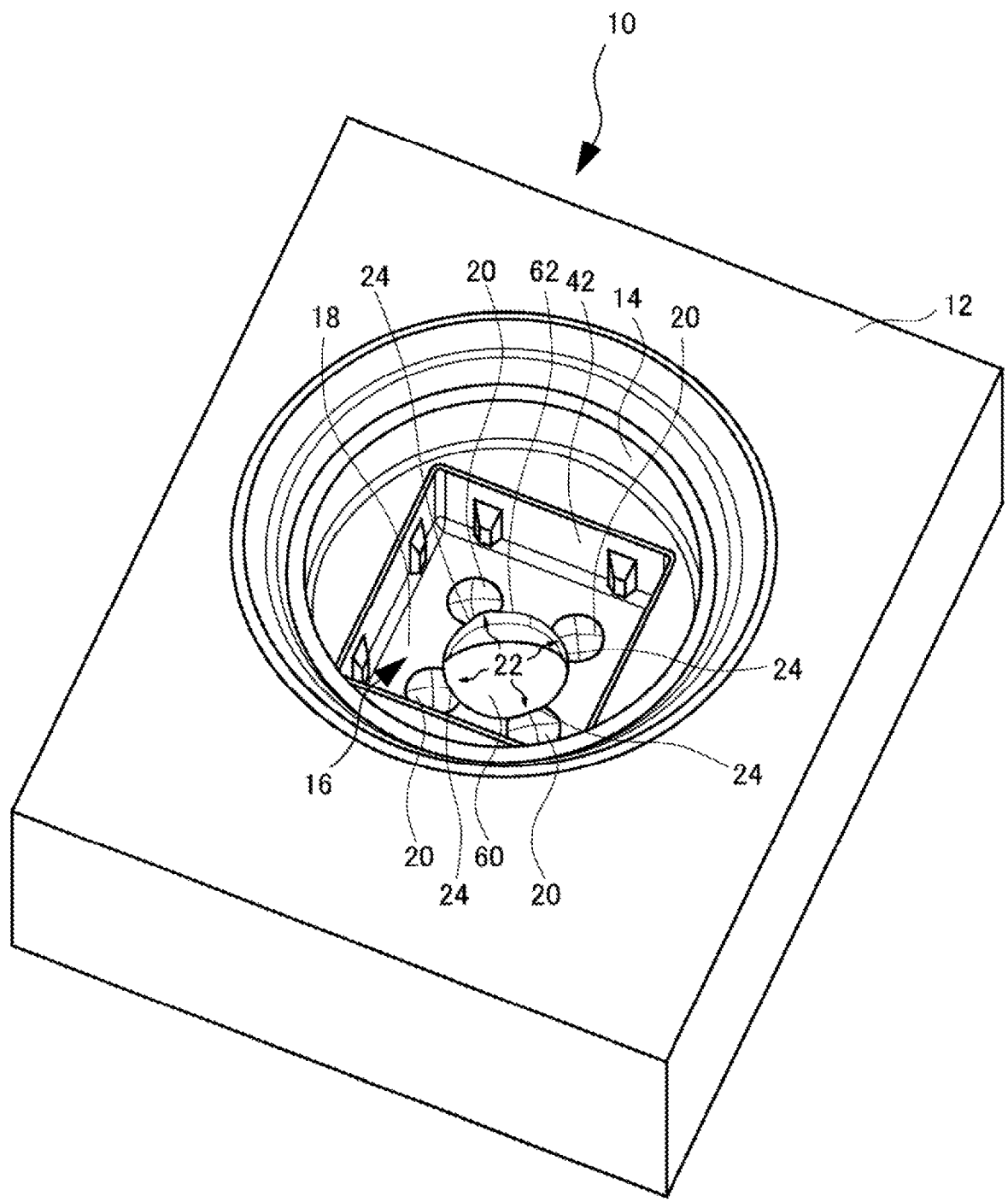

FIG. 1d is a drawing to illustrate an exemplary perspective view of the pressure sensor device 100 shown in FIG. 1a. FIG. 1d illustrates an exemplary sensor case 10 in greater detail. In FIG. 1d, the absolute pressure sensor unit 30 and the adhesive 50 shown in FIG. 1a are omitted from the illustration. As shown in FIG. 1d, the pressure sensor device 100 of the present example has the wall 14 provided in the base portion 12 so as to surround the concave portion 16. The bottom surface 18 of the concave portion 16 is provided with four protrusions 20 as an example. The four protrusions 20 are provided to form a square shape as an example, when seen from above. Also, there is the aperture 60 on the bottom surface 18. The aperture 60 is provided inside a region surrounded by the four protrusions 20 as an example, when seen from above.

In the present example, the protrusions 20 have circular shapes the outer circumferences of which are partially recessed inward, thereby forming notch portions 22. The edges 24 of the notch portions 22 and the edge 62 of the aperture 60 may overlap, when seen from above. The structure in which the edges 24 and the edge 62 overlap may be formed by punching out the protrusions 20 and the base portion 12 at once to form the aperture 60.

Figure 2A:
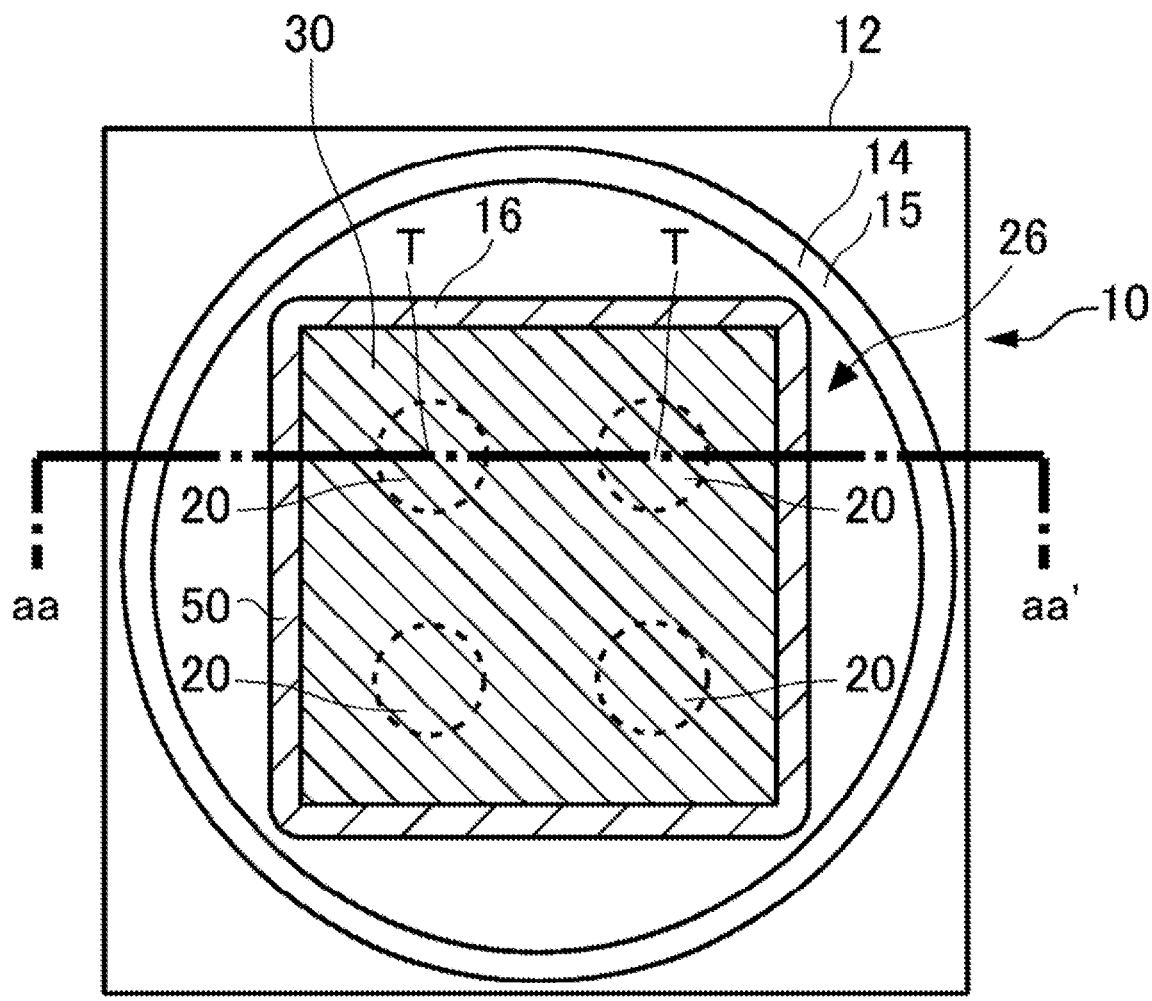
FIG. 2a is a top view of a pressure sensor device 150 of Comparative Example 1.

FIG. 2a is a top view of a pressure sensor device 150 of Comparative Example 1. As shown in FIG. 2a, the pressure sensor device 150 of Comparative Example 1 has no aperture 60 on the bottom surface 18 of a concave portion 16. Four protrusions 20 are provided at the same positions as positions of the four protrusions 20 in FIG. 1a in the XY plane. The space between the bottom surface 18 of the concave portion 16 and the bottom surface of an absolute pressure sensor unit 30 is filled with an adhesive 50.

Figure 2B:
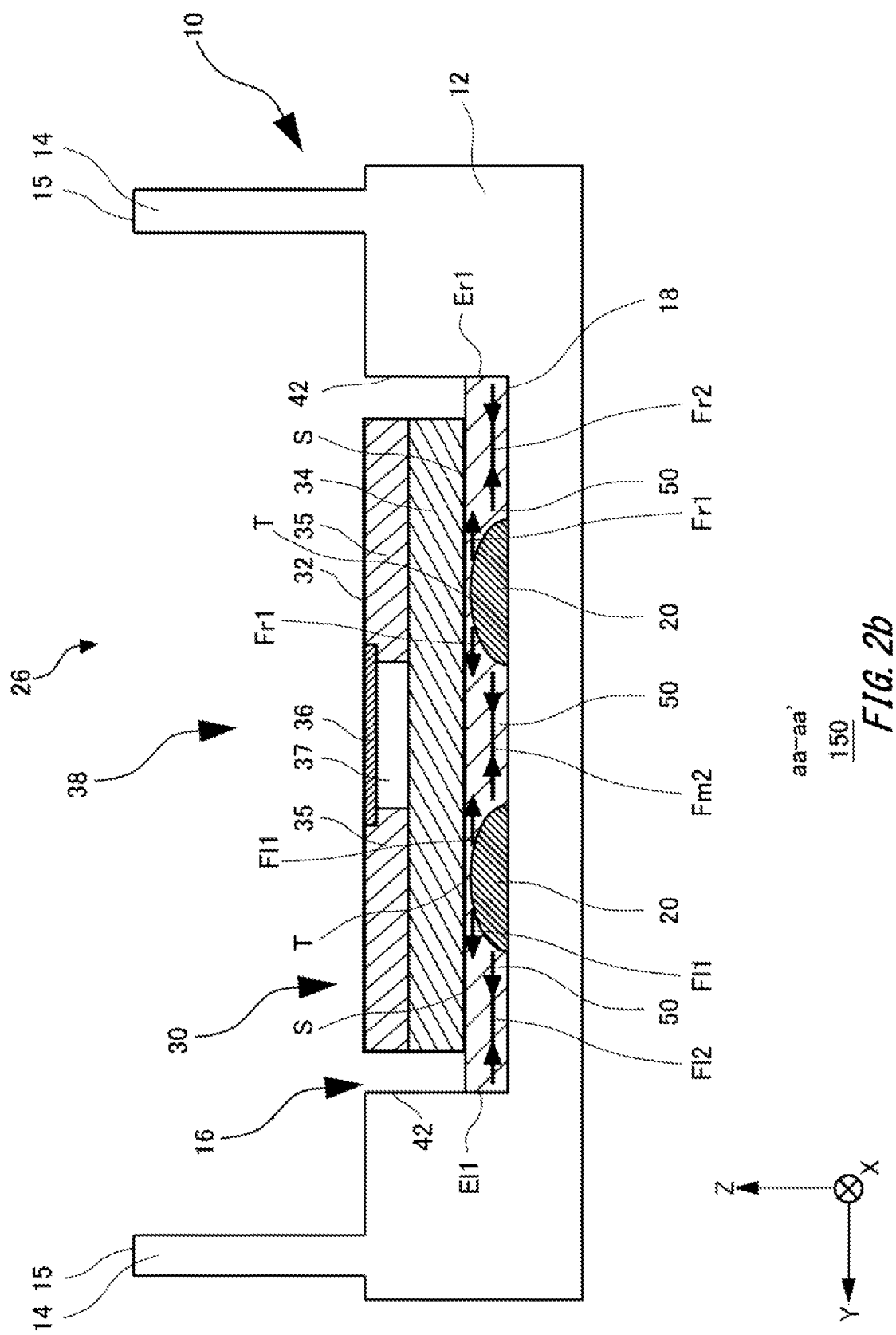

FIG. 2b is an aa-aa' cross sectional view of FIG. 2a. As shown in FIG. 2b, in the pressure sensor device 150 of Comparative Example 1, an entire region under the absolute pressure sensor unit 30 is filled with the adhesive 50, and space 40 and the aperture 60 are not provided between the absolute pressure sensor unit 30 and a sensor case 10. The adhesive 50 has an end Er1 contacting one side wall 42 on the −Y axis direction side of two side walls 42 in the aa-aa' cross section, and an end El1 contacting a side wall 42 on the +Y axis direction side between the two side walls 42.

In the pressure sensor device 150 of Comparative Example 1, compared to the pressure sensor device 100 of FIG. 1c, tensile stress Fr1 applied from a top T of a protrusion 20 on the −Y axis direction side between two protrusions 20 in the aa-aa' cross section toward the +Y axis direction side, i.e., toward the middle side of the bottom surface 18, is not relaxed. Similarly, tensile stress Fl1 applied from a top T of a protrusion 20 on the +Y axis direction side between two protrusions 20 in the aa-aa' cross section toward the −Y axis direction side, i.e., toward the middle side of the bottom surface 18, is not relaxed. Compressive stress Fr2 and Fl2 are generated in the adhesives 50 existing on end sides of the bottom surface 18 in the Y axis direction respectively. On the other hand, because a region surrounded by the two protrusions 20 in FIG. 2b, under a diaphragm 36 having larger influence on a variation of output of the pressure sensor device 100, is filled with the adhesive 50, compressive stress Fm2 is generated in the adhesive 50. Similarly, because regions between the protrusions 20 shown in FIG. 2b and protrusions 20 existing in the +X axis direction side perpendicular to the aa-aa' cross section are also filled with the adhesive 50, compressive stress is also generated in the adhesive 50. Thus, in a process of releasing this stress, a distortion occurs on the bottom surface of the absolute pressure sensor unit 30. Therefore, it is not possible to suppress a variation of output of the absolute pressure sensor unit 30.

Figure 3A:
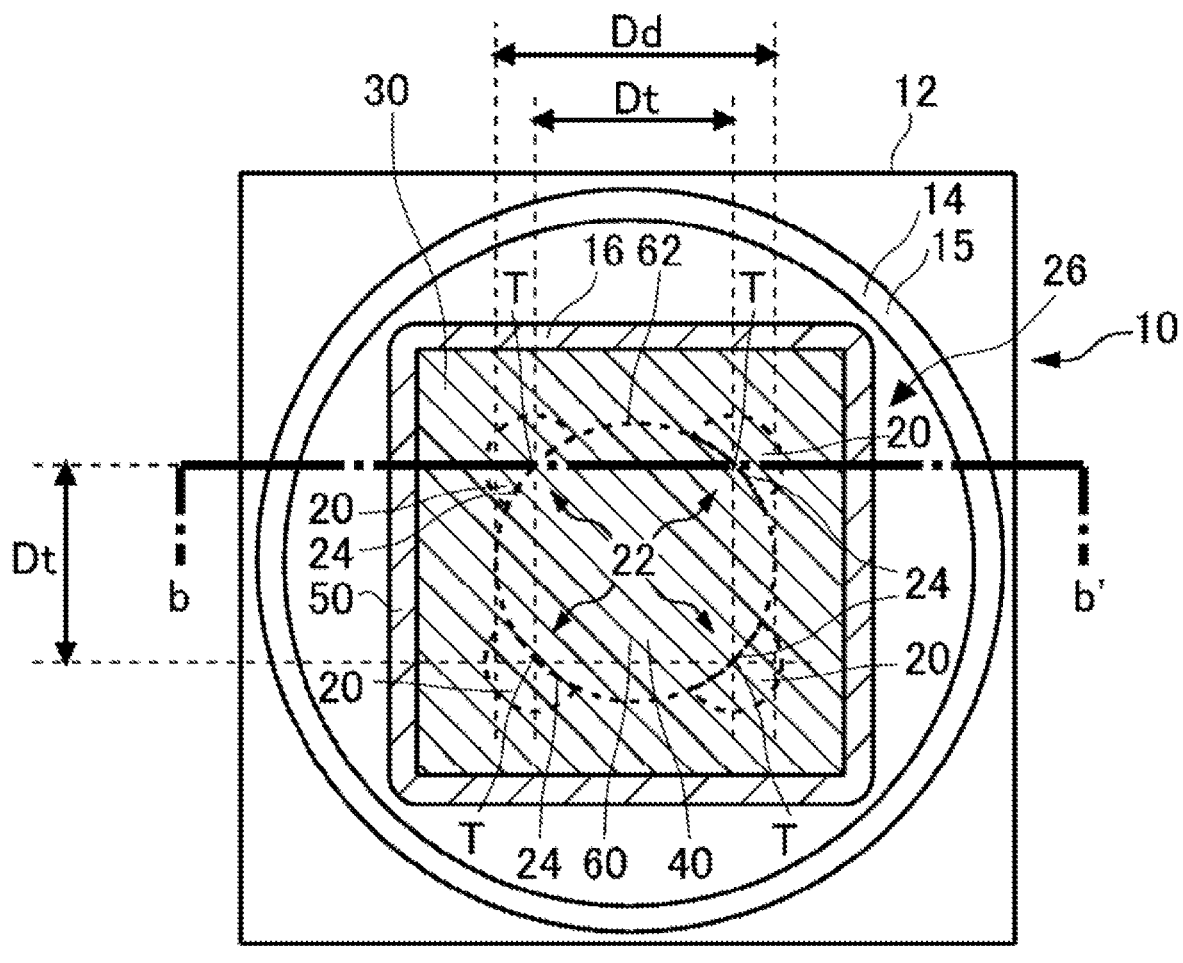
FIG. 3a is a drawing to illustrate another exemplary upper surface of a pressure sensor device 100 according to the present embodiment.
Figure 3A:
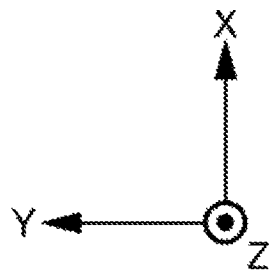

FIG. 3a is a drawing to illustrate another exemplary upper surface of a pressure sensor device 100 according to the present embodiment. The pressure sensor device 100 of the present example is different from the pressure sensor device 100 illustrated in FIG. 1a, in that edges 24 of notch portions 22 of protrusions 20 pass through tops T of the protrusions 20, and the tops T overlap an edge 62 of an aperture 60 when seen from above.

Figure 3B:
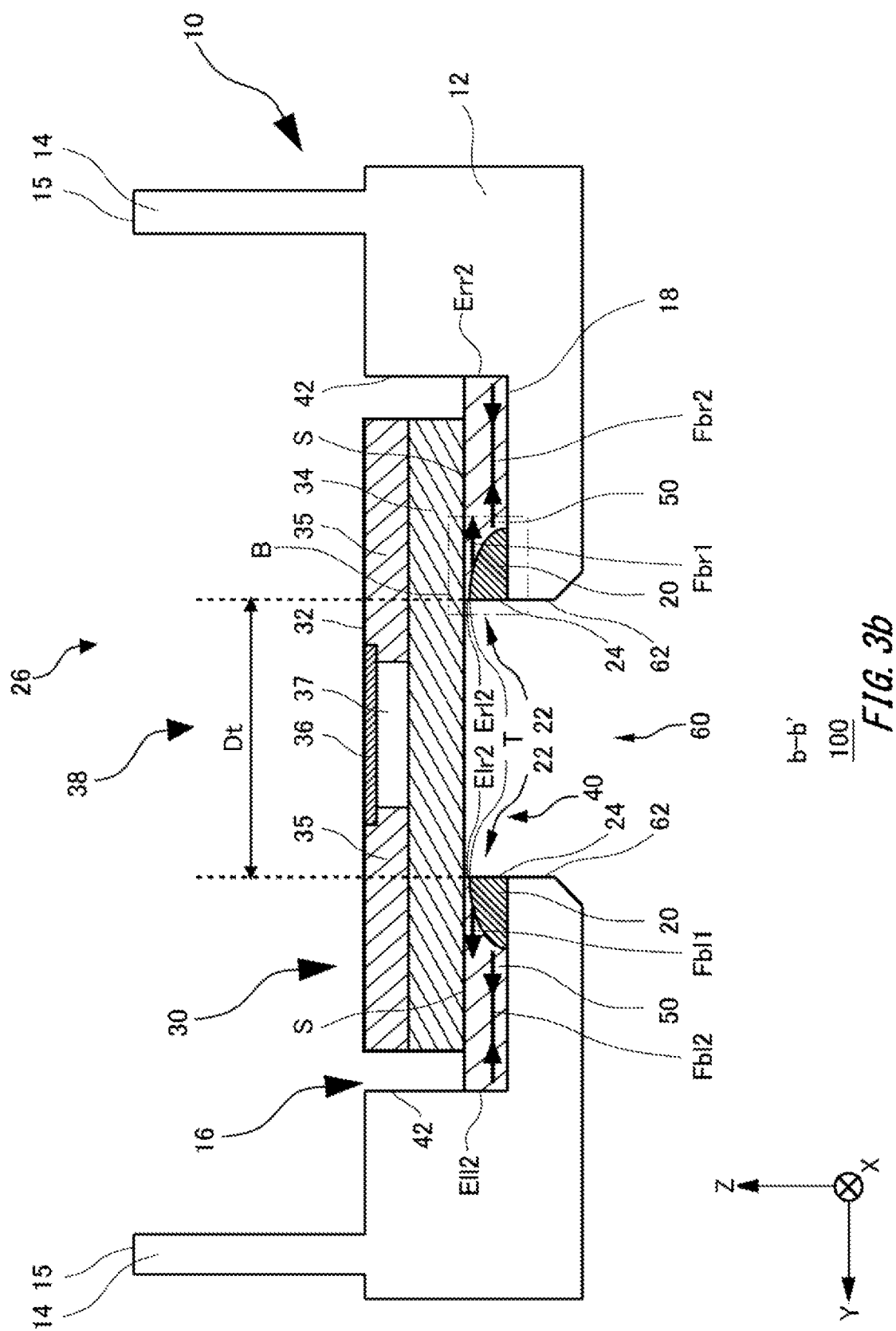

FIG. 3b is a drawing to illustrate an exemplary b-b' cross section shown in FIG. 3a. FIG. 3b schematically illustrates an exemplary cross section of a sensor case 10. As shown in FIG. 3b, a pressure sensor device 100 of the present example has protrusions 20 with notch portions 22, and tops T of the protrusions 20 and edges 24 of the notch portions 22 overlap in the XY plane. Also, the edges 24 of the notch portions 22 and an edge 62 of an aperture 60 overlap in the XY plane. That is, this is a case in which the diameter Dd and the distance Dtt shown in FIG. 1a are equal to each other. A diaphragm 36 may be provided, inside a region in the Y axis direction between two protrusions 20 in the Y axis direction, and inside a region surrounded by two protrusions 20 in the X axis direction, in the X axis direction.

As shown in FIG. 3b, an adhesive 50 on the side close to the −Y axis direction relative to the aperture 60 has two ends: one end Err2 contacting one side wall 42 on the −Y axis direction side of two side walls 42 in the b-b' cross section; and the other end Erl2 on the aperture 60 side. Also, an adhesive 50 on the side close to the +Y axis direction relative to the aperture 60 has two ends: one end Ell2 contacting one side wall 42 on the +Y axis direction side of two side walls 42 in the b-b' cross section; and the other end Elr2 on the aperture 60 side. In the XY plane, the end Erl2 may overlap an edge 24 on the −Y axis direction side between two edges 24 in the b-b' cross section. Also, the end Erl2 may overlap an edge 62 on the −Y axis direction side between two edges 62 in the b-b' cross section. Similarly, in the XY plane, the end Elr2 may overlap an edge 24 on the +Y axis direction side between two edges 24 in the b-b' cross section. Also, the end Elr2 may overlap an edge 62 on the +Y axis direction side between two edges 62 in the b-b' cross section.

In the pressure sensor device 100 of the present example, since the tops T of the protrusions 20 and the edges 24 of the notch portions 22 overlap in the XY plane, the adhesive 50 does not exist on the +Y axis direction side relative to the protrusion 20 on the −Y axis direction side in the b-b' cross section. Thus, tensile stress Fbr1 applied to the +Y axis direction side, i.e., applied originating from the protrusion 20 toward the aperture 60 side, is not generated. Similarly, the adhesive 50 does not exist on the −Y axis direction side relative to a protrusion 20 on the +Y axis direction side in the b-b' cross section. Thus, tensile stress Fbl1 is not generated on the −Y axis direction side, i.e., on the aperture 60 side, originating from the protrusion 20.

Figure 3C:
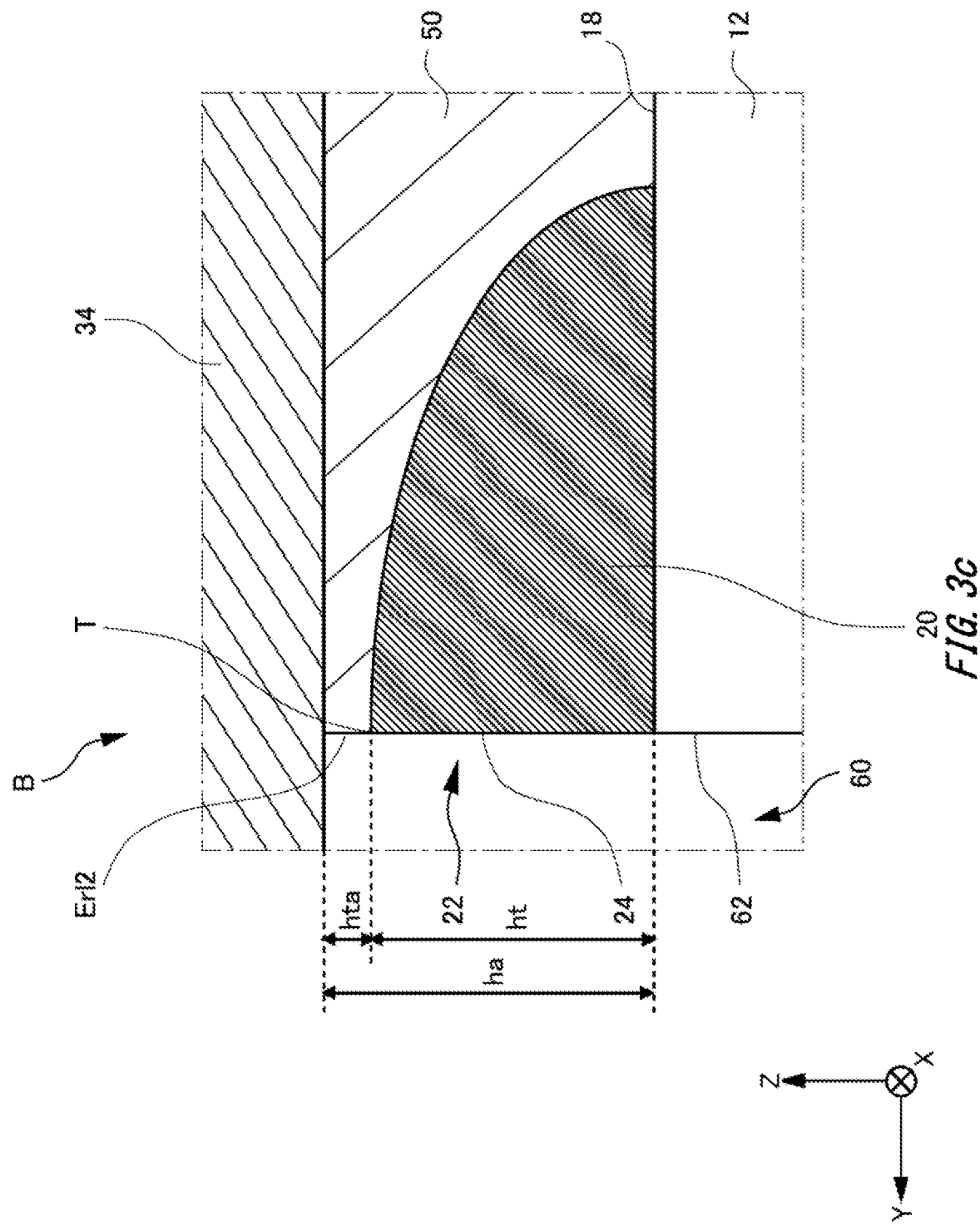
FIG. 3c is an enlarged drawing of the region B shown in FIG. 3b.

FIG. 3c is an enlarged drawing of the region B shown in FIG. 3b. As shown in FIG. 3c, the pressure sensor device 100 of the present example has a protrusion 20 with a notch portion 22, and a top T of the protrusion 20 and an edge 24 of the notch portion 22 overlap in the XY plane. Also, the edge 24 of the notch portion 22 and the edge 62 of the aperture 60 overlap in the XY plane. Also, the adhesive 50 is provided above the protrusion 20 so as to contact the protrusion 20, and a support substrate 34 of an absolute pressure sensor unit 30 is provided above the adhesive 50 so as to contact the adhesive 50. The end Elr2 may overlap the edge 24 on the +Y axis direction side and the edge 62 on the +Y axis direction side in the XY plane. The top T of the protrusion 20 and the bottom surface of the support substrate 34 do not contact each other.

A height ha of the adhesive 50 from the bottom surface 18 may be from 110% to 150% inclusive of a height ht of the protrusion 20. A height hta from the top T of the protrusion 20 to the bottom surface of the support substrate 34 may be from 30% to 50% inclusive of the height ha. The height ht of the protrusion 20 may be from 60 μm to 200 μm inclusive, as an example. The height hta may be from 10 μm to 50 μm inclusive, as an example. Also, the height ha may be from 70 μm to 250 μm inclusive.

In the present example also, same as the pressure sensor device 100 of FIG. 1b, compressive stress Fbr2 and Fbl2 are generated in the adhesives 50 existing on end sides of the bottom surface 18 in the Y axis direction respectively. On the other hand, because the adhesive 50 does not exist in a region under the diaphragm 36 having larger influence on a variation of output of the pressure sensor device 100, tensile stress caused by the existence of the adhesive 50 is not generated. Thus, a distortion caused on the bottom of the absolute pressure sensor unit 30, the bottom positioned on the aperture 60, can be effectively suppressed compared with the example in FIG. 1b. Therefore, it is possible to suppress a variation of output of the absolute pressure sensor unit 30 more than that of the example in FIG. 1b.

Figure 4A:
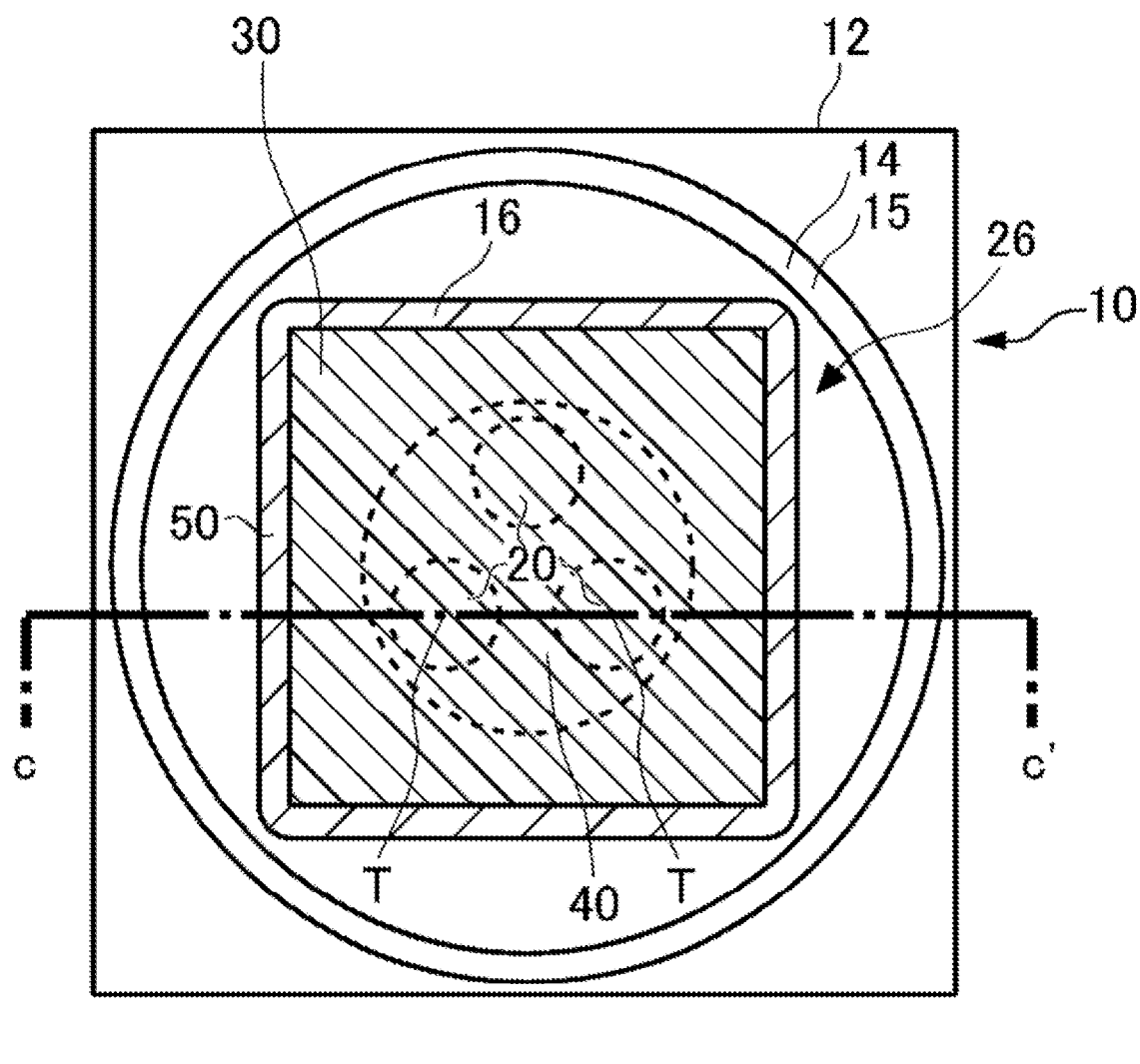
FIG. 4a is a drawing to illustrate another exemplary upper surface of a pressure sensor device 100 according to the present embodiment.
Figure 4A:
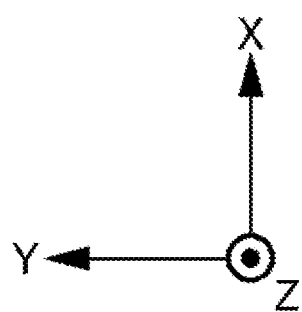

FIG. 4a is a drawing to illustrate another exemplary upper surface of a pressure sensor device 100 according to the present embodiment. The pressure sensor device 100 of the present example is different from the pressure sensor device 100 illustrated in FIG. 1a, in that there is no aperture 60, and three protrusions 20 are provided in space 40 such that they form an equilateral triangle in the XY plane. Although the three protrusions 20 are provided such that they form an equilateral triangle in the present example, they may be provided such that they form another type of triangle.

Figure 4B:
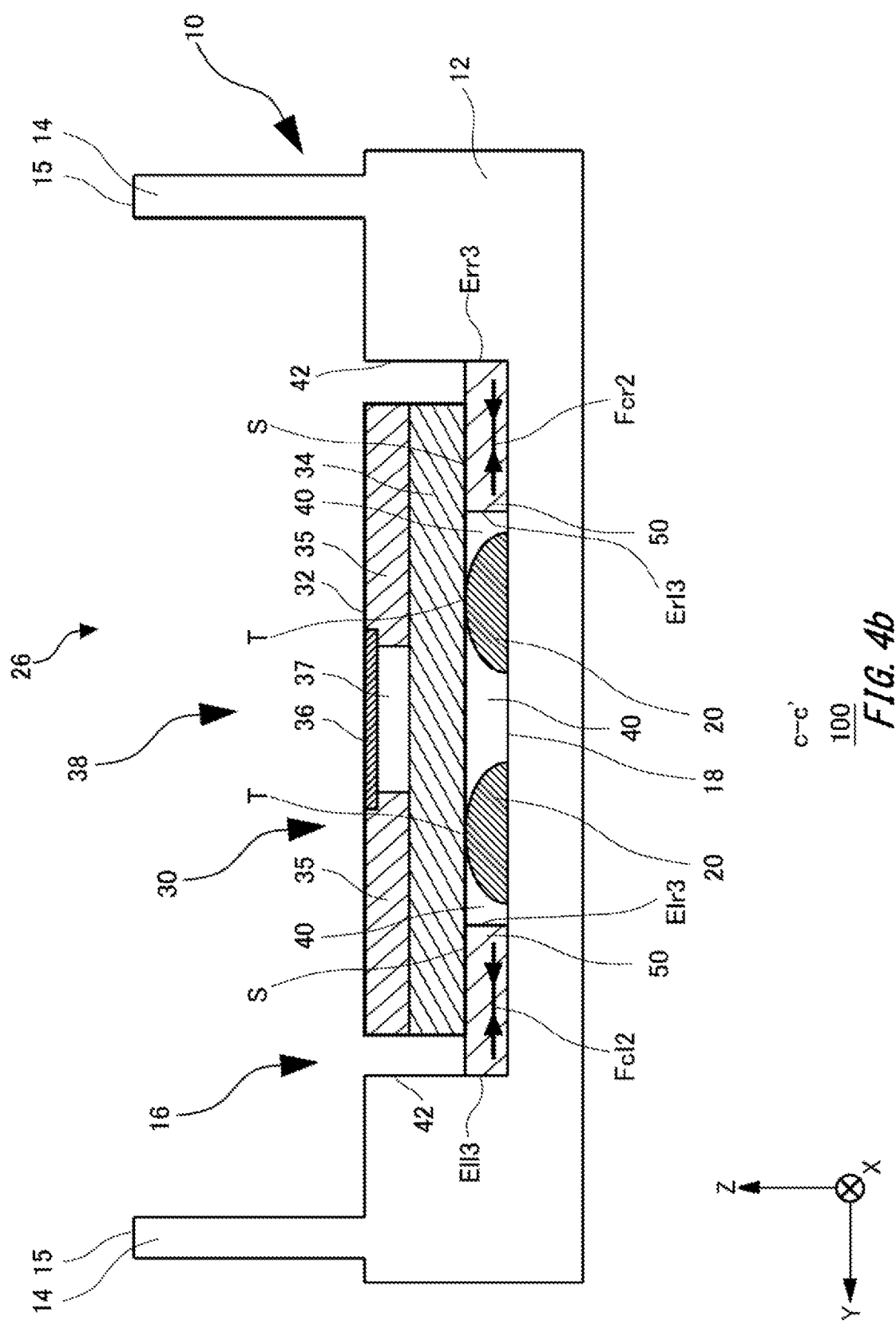

FIG. 4b is a drawing to illustrate an exemplary c-c' cross section shown in FIG. 4a. FIG. 4b schematically illustrates an exemplary cross section of a sensor case 10. The c-c' cross section is a cross section passing through tops T of two protrusions 20 being parallel to the Y axis direction, among the three protrusions 20. As shown in FIG. 4b, the pressure sensor device 100 of the present example has an adhesive 50 on each end side of the bottom surface 18 in the Y axis direction. The protrusions 20 are provided to the side close to the middle of the bottom surface 18 relative to the adhesive 50 in the Y axis direction. The adhesive 50 is not provided and space 40 is provided between a protrusion 20 and the adhesive 50, and between the protrusions 20. In the XY plane also, the adhesive 50 is not provided and the space 40 is provided to each periphery of the protrusions 20. That is, the space 40 free of the adhesive 50 is provided inside a region under an absolute pressure sensor unit 30, i.e., on the periphery (inside and outside in the XY plane) of the three protrusions 20.

As shown in FIG. 4b, the adhesive 50 on the side close to the −Y axis direction relative to the space 40, has two ends: one end Err3 contacting one side wall 42 on the −Y axis direction side of two side walls 42 in the c-c' cross section; and the other end Erl3 on the space 40 side. Also, the adhesive 50 on the side close to the +Y axis direction relative to the space 40 has two ends: one end Ell3 contacting one side wall 42 on the +Y axis direction side of two side walls 42 in the c-c' cross section; and the other end Elr3 on the space 40 side.

In the pressure sensor device 100 of the present example, each periphery of the protrusions 20 in the XY plane is not filled with the adhesive 50. That is, the adhesive 50 does not exist between the protrusions 20 in the XY plane. Thus, compressive stress caused by the existence of the adhesive 50 is not generated between the protrusions 20. Compressive stress Fcr2 and Fcl2 are generated in the adhesive 50 existing on the side close to the −Y axis direction relative to the space 40 and the adhesive 50 existing on the side close to the +Y axis direction relative to the space 40 respectively. On the other hand, tensile stress and compressive stress caused by the existence of the adhesive 50 can be reduced in a region under the diaphragm 36 having larger influence on a variation of output of the pressure sensor device 100. Thus, a distortion caused in the middle of the bottom of the absolute pressure sensor unit 30 in the XY plane can be suppressed, and a variation of output of the absolute pressure sensor unit 30 can be suppressed.

Note that, although shown in the present example is an example in which three protrusions 20 are provided within the space 40 in the XY plane, only one protrusion 20 may also be provided. That is, it may have a configuration in which space 40 is provided to the periphery of the one protrusion 20 in the XY plane, and the protrusion 20 and an adhesive 50 do not contact each other. According to this configuration also, same as above, a distortion caused at the bottom of an absolute pressure sensor unit 30 can be suppressed, and a variation of output of the absolute pressure sensor unit 30 can be suppressed.

Figure 5A:
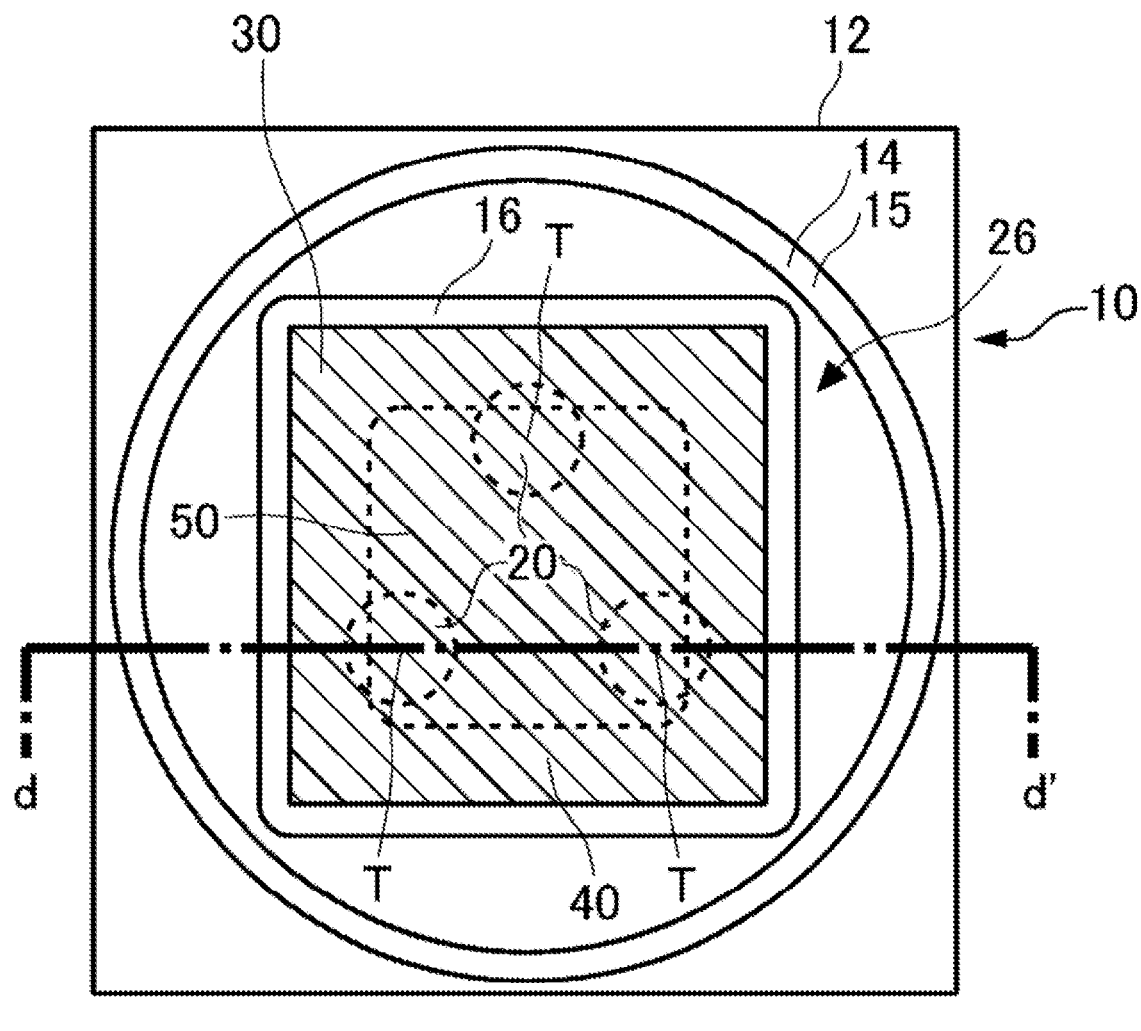
FIG. 5a is a drawing to illustrate another exemplary upper surface of a pressure sensor device 100 according to the present embodiment.
Figure 5A:
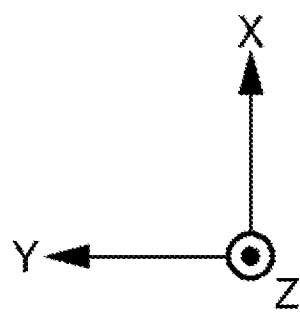

FIG. 5a is a drawing to illustrate another exemplary upper surface of a pressure sensor device 100 according to the present embodiment. The pressure sensor device 100 of the present example is not provided with an aperture 60. Also, an adhesive 50 is provided inside space 40 under the absolute pressure sensor unit 30, when seen from above. Here, providing the adhesive 50 inside the space 40 refers to providing the adhesive 50 on the middle side of the absolute pressure sensor unit 30 in the XY plane, and providing the space 40 outside the adhesive 50, when seen from above.

In the present example, the space 40 free of the adhesive 50 is provided in a region under the absolute pressure sensor unit 30, outside the three protrusions 20 so as to contact three protrusions 20. Note that, more effect of reducing stress may be obtained by extending the space 40 free of the adhesive 50 such that the space 40 is also provided inside a region surrounded by the three protrusions 20.

FIG. 5b is a drawing to illustrate an exemplary d-d' cross section shown in FIG. 5a. FIG. 5b schematically illustrates an exemplary cross section of a sensor case 10. The d-d' cross section is a cross section passing through tops T of two protrusions 20 being parallel to the Y axis direction, among the three protrusions 20.

As shown in FIG. 5b, the pressure sensor device 100 of the present example has the adhesive 50 on the middle side of the bottom surface 18 in the Y axis direction, and has the space 40 on each end side of the bottom surface 18 in the Y axis direction, and under each end side of the absolute pressure sensor unit 30 in the Y axis direction. That is, an end Err4 of the adhesive 50 does not contact one side wall 42 on the −Y axis direction side of two side walls 42 in the d-d′ cross section. Also, an end Ell4 of the adhesive 50 does not contact one side wall 42 on the +Y axis direction side of two side walls 42 in the d-d′ cross section.

The adhesive 50 is provided extending to reach the side close to the −Y axis direction relative to a top T of a protrusion 20 on the −Y axis direction side between two protrusions 20 in the d-d′ cross section. The adhesive 50 is provided extending to reach the side close to the +Y axis direction relative to a top T of a protrusion 20 on the +Y axis direction side between two protrusions 20 in the d-d′ cross section. Thus, the tops T of the protrusions 20 and the bottom surface of the absolute pressure sensor unit 30 do not contact each other.

Parts of the protrusions 20 contact the space 40. Note that, same as the configuration of the notch portions 22 in FIG. 3b, the top T of the protrusion 20 on the −Y axis direction side between two protrusions 20 in the d-d′ cross section, and an end Err4 of the adhesive 50 may overlap in the XY plane. Similarly, the top T of the protrusion 20 on the +Y axis direction side between two protrusions 20 in the d-d′ cross section, and an end Ell4 of the adhesive 50 may overlap in the XY plane.

Compressive stress Fdm2 is generated in the adhesive 50, on the middle side of the bottom surface 18 in the Y axis direction. Also, tensile stress Fdr1 is generated in the adhesive 50, from the top T of the protrusion 20 on the −Y axis direction side between the two protrusions 20 in the d-d′ cross section to the +Y and −Y axes direction sides. Also, tensile stress Fdl1 is generated in the adhesive 50, from the top T of the protrusion 20 on the +Y axis direction side between the two protrusions 20 in the d-d′ cross section to the +Y and −Y axes direction sides.

In the pressure sensor device 100 of the present example, because a space 40 is provided on the outer circumference of the adhesive 50 and under the absolute pressure sensor unit 30 in the XY plane, stress Fv is propagated in the Z axis direction from a base portion 12 to the absolute pressure sensor unit 30 through the adhesive 50, in the adhesive 50 near the space 40. Thus, stress is unlikely to be generated in the Y axis direction on the bottom surface of the absolute pressure sensor unit 30. Therefore, it is possible to suppress a variation of output of the absolute pressure sensor unit 30.

Figure 6A:
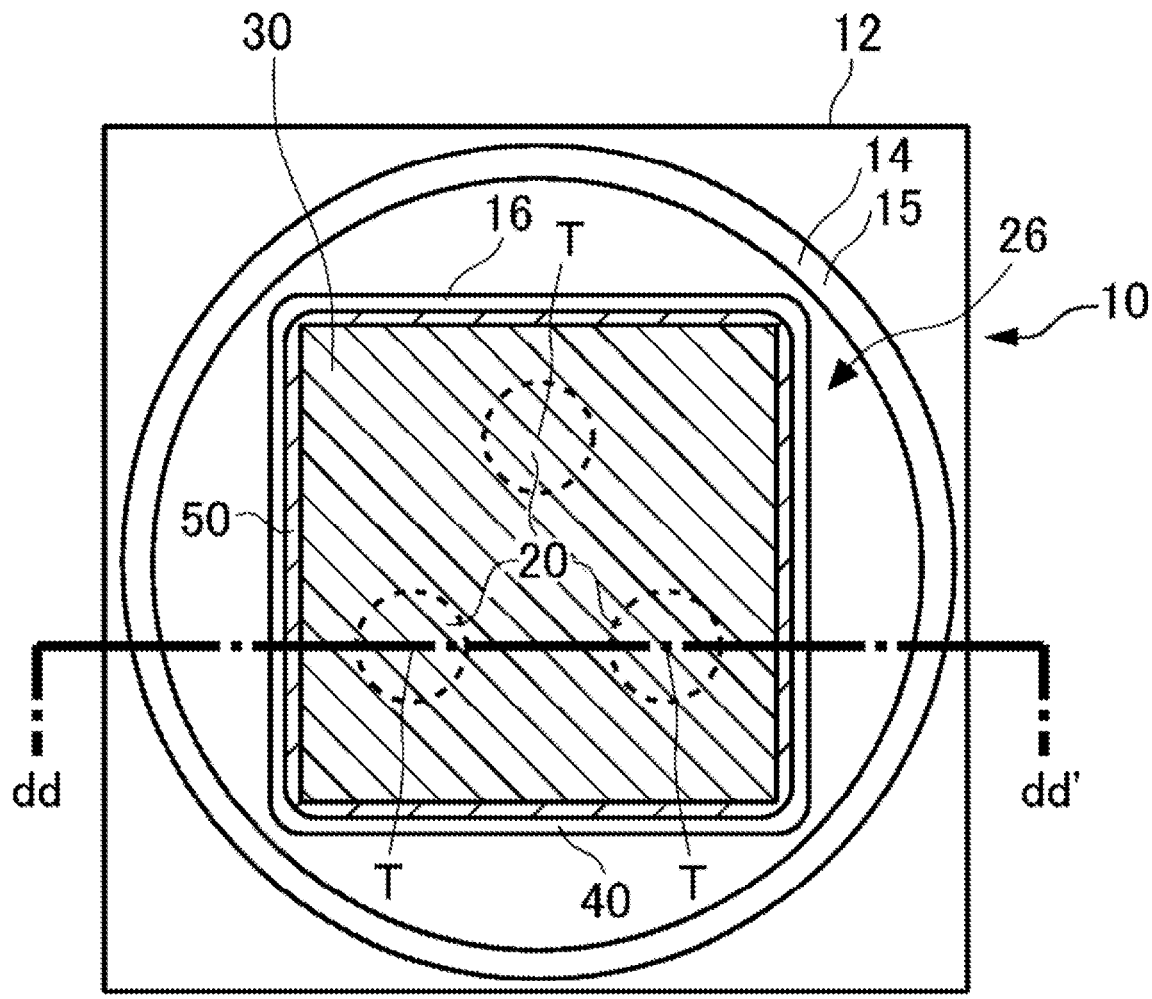
FIG. 6a is a top view of a pressure sensor device 160 of Comparative Example 2.
Figure 6A:
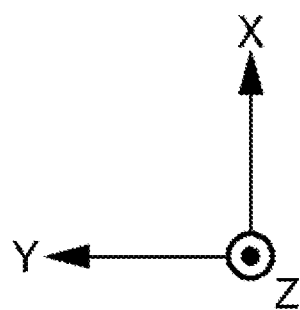

FIG. 6a is a top view of a pressure sensor device 160 of Comparative Example 2. The pressure sensor device 160 of Comparative Example 2 is different from the pressure sensor device 100 illustrated in FIG. 5a, in that an entire region under an absolute pressure sensor unit 30 is filled with an adhesive 50.

Figure 6B:
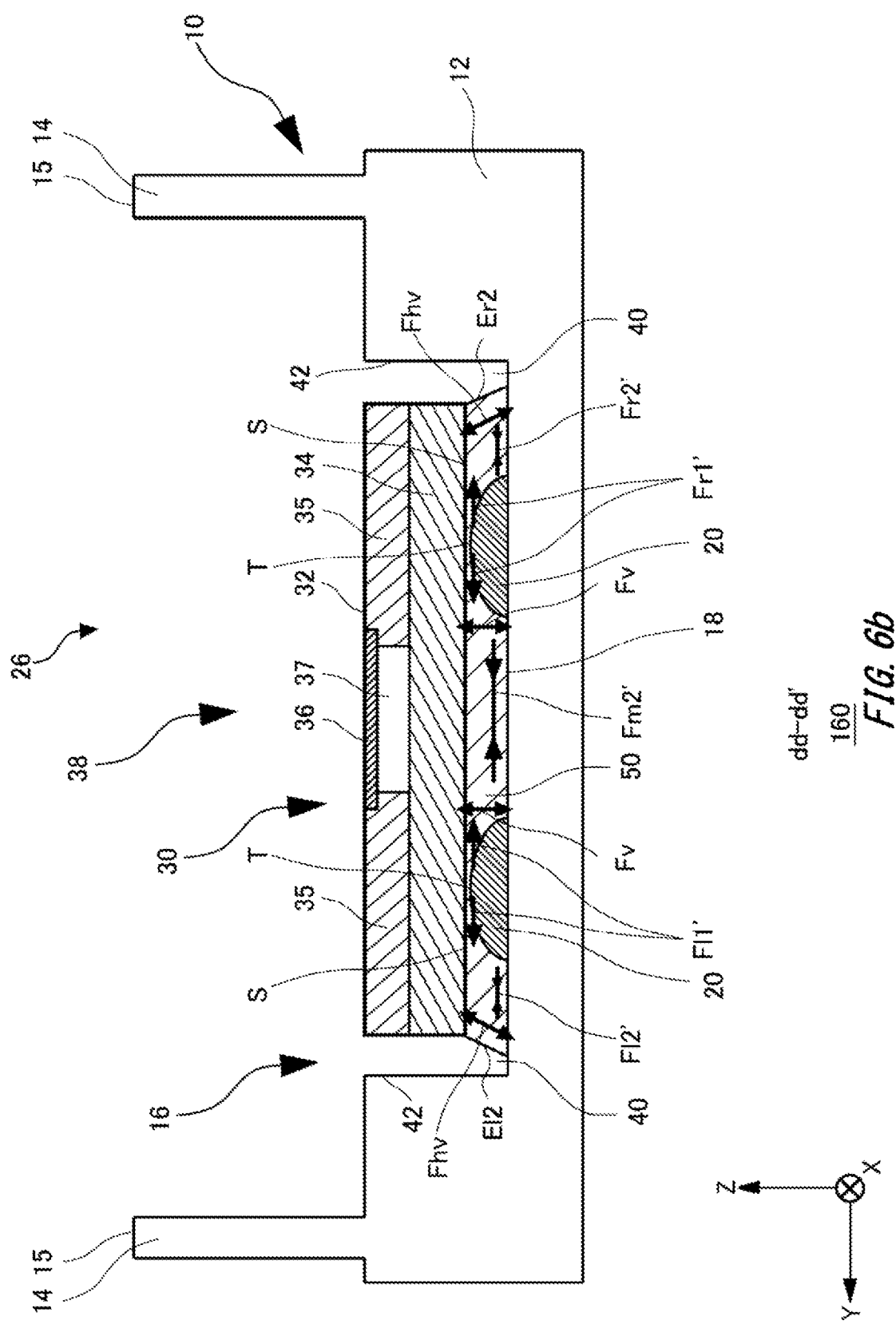

FIG. 6b is a drawing to illustrate an exemplary dd-dd′ cross section shown in FIG. 6a. The dd-dd′ cross section is a cross section passing through tops T of two protrusions 20 being parallel to the Y axis direction, among three protrusions 20. As shown in FIG. 6b, the pressure sensor device 160 of Comparative Example 2 is filled with the adhesive 50 in an entire region under an absolute pressure sensor unit 30. The adhesive 50 has ends Er2 and El2 in directions diagonal to the bottom surface 18. Also, there is a space 40 between the end Er2 and a side wall 42, and between the end El2 and a side wall 42, respectively.

Compressive stress Fm2′ is generated in the adhesive 50, on the middle side of the bottom surface 18 in the Y axis direction. Also, tensile stress Fr1′ is generated in the adhesive 50, from a top T of a protrusion 20 on the −Y axis direction side between the two protrusions 20 in the dd-dd′ cross section to the +Y and −Y axes direction sides. Also, tensile stress Fl1′ is generated in the adhesive 50, from a top T of a protrusion 20 on the +Y axis direction side between the two protrusions 20 in the dd-dd′ cross section to the +Y and −Y axes direction sides. Furthermore, compressive stress Fr2′ is generated in the adhesive 50 on the side close to the −Y axis direction relative to the protrusion 20 on the −Y axis direction side between the two protrusions 20. Also, compressive stress Fl2′ is generated in the adhesive 50 on the side close to the +Y axis direction relative to the protrusion 20 on the +Y axis direction side between the two protrusions 20.

In the pressure sensor device 160 of Comparative Example 2, because a region under the absolute pressure sensor unit 30 is filled with the adhesive 50, and there is a space 40 on each end side of adhesive 50 in the Y axis direction, stress Fhv is propagated in directions diagonal to the bottom surface 18 from a base portion 12 to the absolute pressure sensor unit 30 through the adhesive 50, as well as the stress Fv propagated in the Z axis direction. Because the stress Fhv in diagonal directions causes deformation of a gauge resistor in the X axis direction and the Y axis direction, in a process of releasing the stress also, a variation of output is caused in the X axis direction and the Y axis direction. Thus, according to the configuration in FIG. 5b, it is possible to obtain more effect of suppressing a variation of output caused by the stress Fhv in diagonal directions, compared with the configuration in FIG. 6b.

Figure 7A:
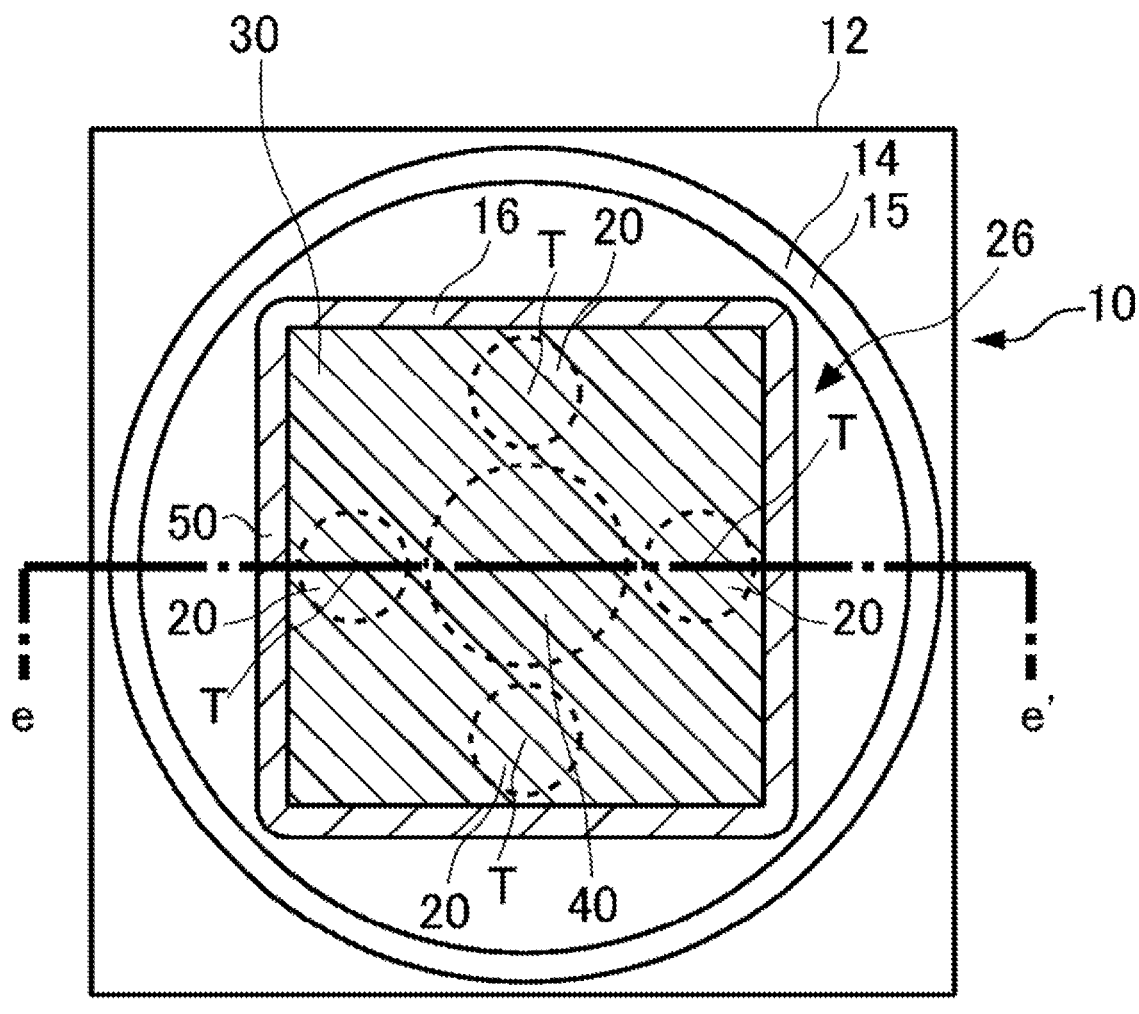
FIG. 7a is a drawing to illustrate another exemplary upper surface of a pressure sensor device 100 according to the present embodiment.

FIG. 7a is a drawing to illustrate another exemplary upper surface of a pressure sensor device 100 according to the present embodiment. The pressure sensor device 100 of the present example is different from the pressure sensor device 100 illustrated in FIG. 4a, in that protrusions 20 are not provided in space 40, and the protrusions 20 are provided such that they contact an adhesive 50 and do not contact the space 40. That is, the space 40 free of the adhesive 50 is provided on the middle side of a region under an absolute pressure sensor unit 30 in the Y axis direction, and each periphery of four protrusions 20 is filled with the adhesive 50. Also, although the number of protrusions 20 is four in the present example, it is not limited to four. With respect to the four protrusions 20, although the four protrusions 20 are provided such that they form a square in the present example, they may be provided such that they form another quadrangle shape such as a trapezoid. Also, although a sensor case 10 does not have an aperture 60 in the present example, the sensor case 10 may be configured to have an aperture 60.

Figure 7B:
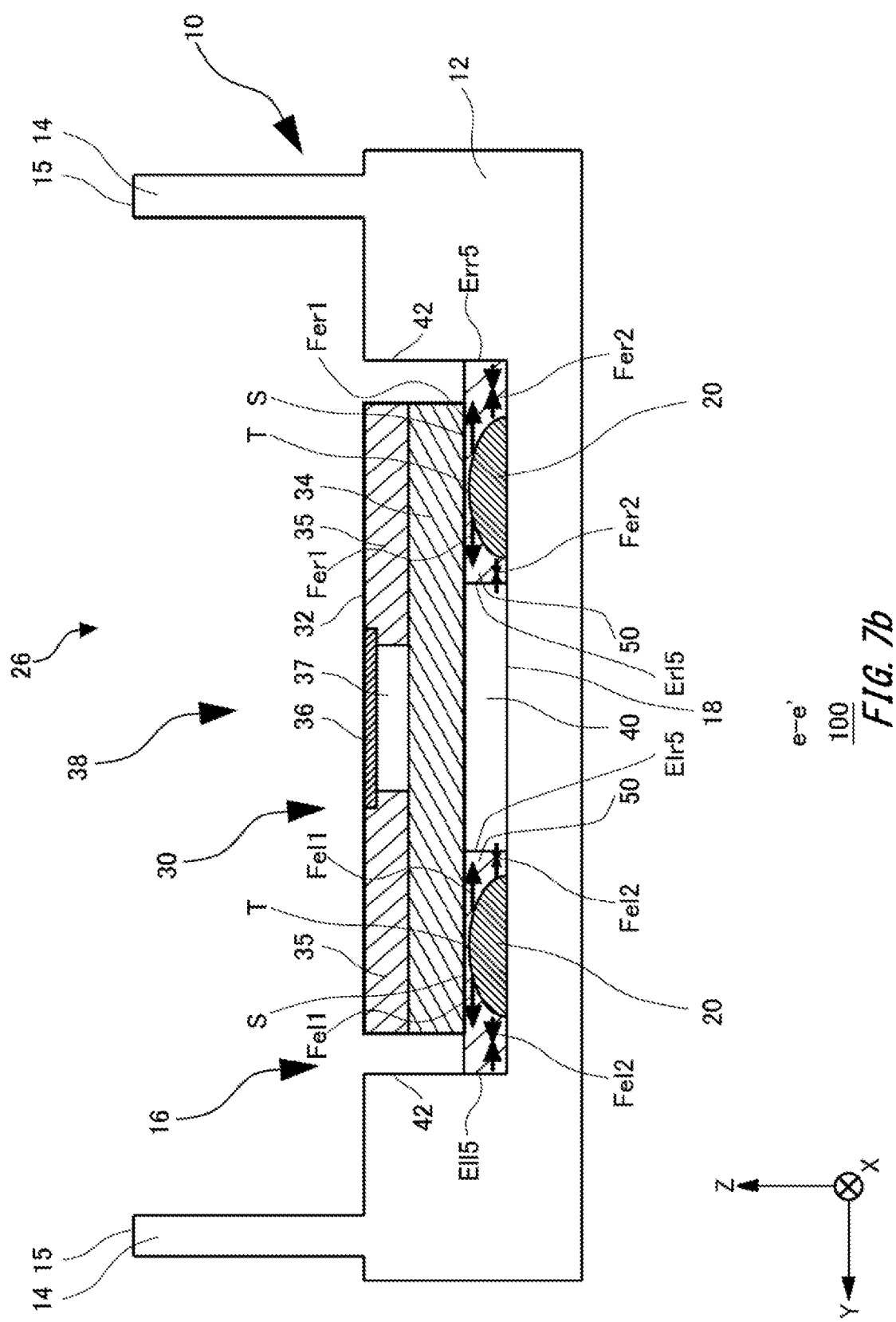

FIG. 7b is a drawing to illustrate an exemplary e-e′ cross section shown in FIG. 7a. FIG. 7b schematically illustrates an exemplary cross section of a sensor case 10. The e-e′ cross section is a cross section passing through tops T of two protrusions 20 positioned on a diagonal line that is parallel to the Y axis direction, among the four protrusions 20.

As shown in FIG. 7b, the pressure sensor device 100 of the present example has the adhesive 50 on each end side of the bottom surface 18 in the Y axis direction. An end Err5 of the adhesive 50 contacts one side wall 42 on the −Y axis direction side of two side walls 42 in the e-e′ cross section, and end Erl5 of the adhesive 50 contacts the space 40. Also, an end Ell5 of the adhesive 50 contacts one side wall 42 on the +Y axis direction side of the two side walls 42 in the e-e′ cross section, and end Elr5 of the adhesive 50 contacts the space 40. In the e-e′ cross section, tensile stress Fer1 and Fel1 are generated in the adhesive 50 from tops T of the protrusions 20 to the +Y and −Y axes direction sides respectively.

The protrusions 20 are provided such that they contact the adhesive 50, and do not contact the space 40. In the present example, because the adhesive 50 is provided to each periphery of the protrusions 20 in the XY plane, the tops T of the protrusions 20 and the bottom surface of the absolute pressure sensor unit 30 do not contact each other.

In the pressure sensor device 100 of the present example, compressive stress Fer2 and Fel2 are generated in the adhesives 50 existing on end sides of the bottom surface 18 in the Y axis direction respectively. On the other hand, since there is the space 40 under a diaphragm 36 having larger influence on a variation of output of the pressure sensor device 100, with respect to a protrusion 20 on the side close to the −Y axis direction relative to the space 40, the distance from top T to the end Erl5 can be reduced. Also, with respect to the protrusion 20 on the side close to the +Y axis direction relative to the space 40, the distance from top T to the end Elr5 can be reduced. Thus, the compressive stress Fer2 generated in the adhesive 50 existing on the side close to the +Y axis direction relative to the protrusion 20 on the −Y axis direction side between the two protrusions 20 in the e-e' cross section, i.e., existing on the side close to the space 40, can be reduced compared to a case in which an entire region under the absolute pressure sensor unit 30 is filled with an adhesive 50. Also, the compressive stress Fel2 generated in the adhesive 50 existing on the side close to the −Y axis direction relative to the protrusion 20 on the +Y axis direction side between the two protrusions 20 in the e-e' cross section, i.e., existing on the side close to the space 40, can be reduced compared to a case in which the entire region under the absolute pressure sensor unit 30 is filled with an adhesive 50. Thus, a distortion caused in the middle of the bottom surface of the absolute pressure sensor unit 30 in the XY plane can be suppressed. Therefore, it is possible suppress a variation of output of the absolute pressure sensor unit 30.

Figure 8A:
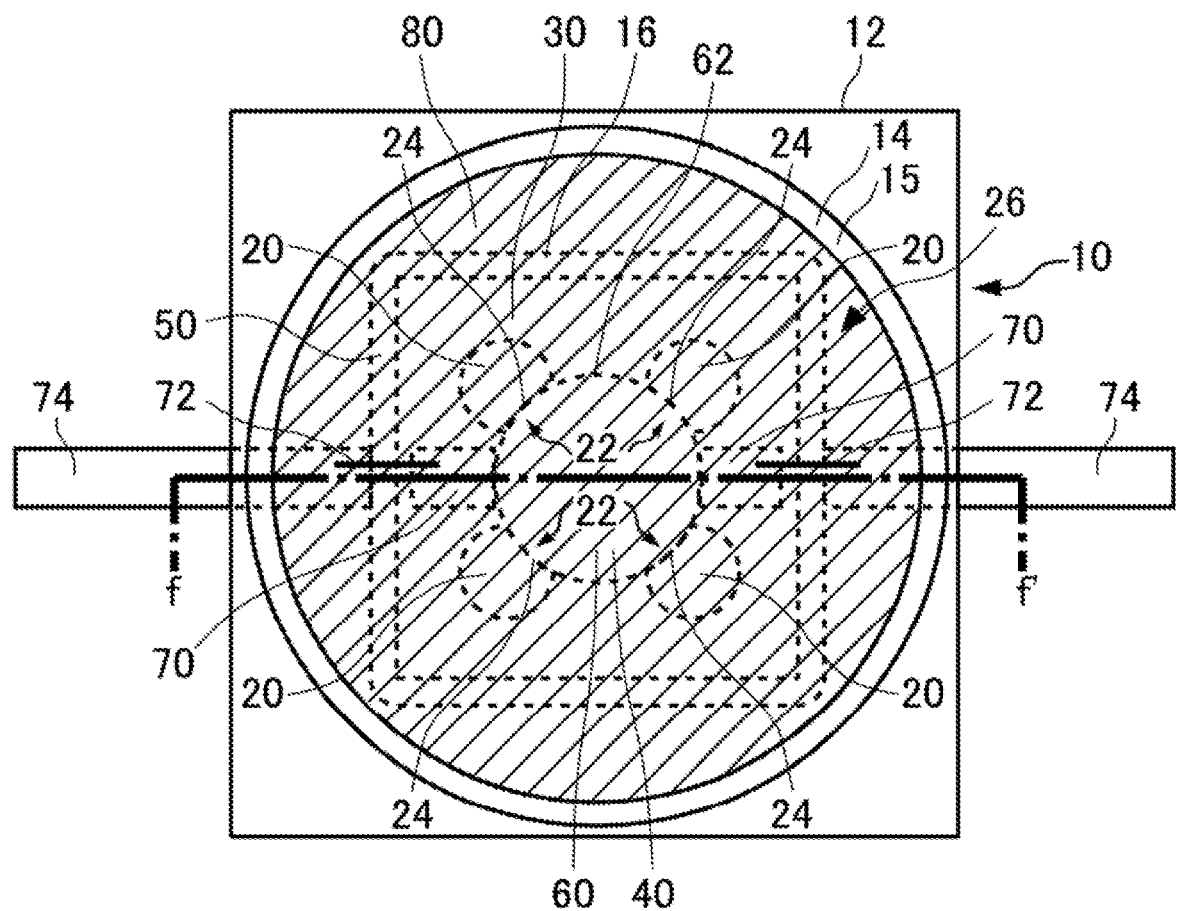
FIG. 8a is a drawing to illustrate another exemplary upper surface of a pressure sensor device 100 according to the present embodiment.
Figure 8A:
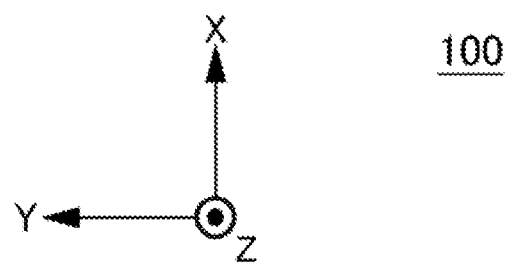

FIG. 8a is a drawing to illustrate another exemplary upper surface of a pressure sensor device 100 according to the present embodiment. The pressure sensor device 100 of the present example has an absolute pressure sensor unit 30 filled with protectant 80 such that the protectant 80 covers an upper surface 32 compared to the pressure sensor device 100 illustrated in FIG. 1a. The upper surface 32 of the absolute pressure sensor unit 30 is provided with electrode pads 70. Each electrode pad 70 is connected to a lead terminal 74 by a bonding wire 72. Note that, in FIG. 8a, hatching of adhesive 50 illustrated in FIG. 1a is deleted from the illustration.

Figure 8B:
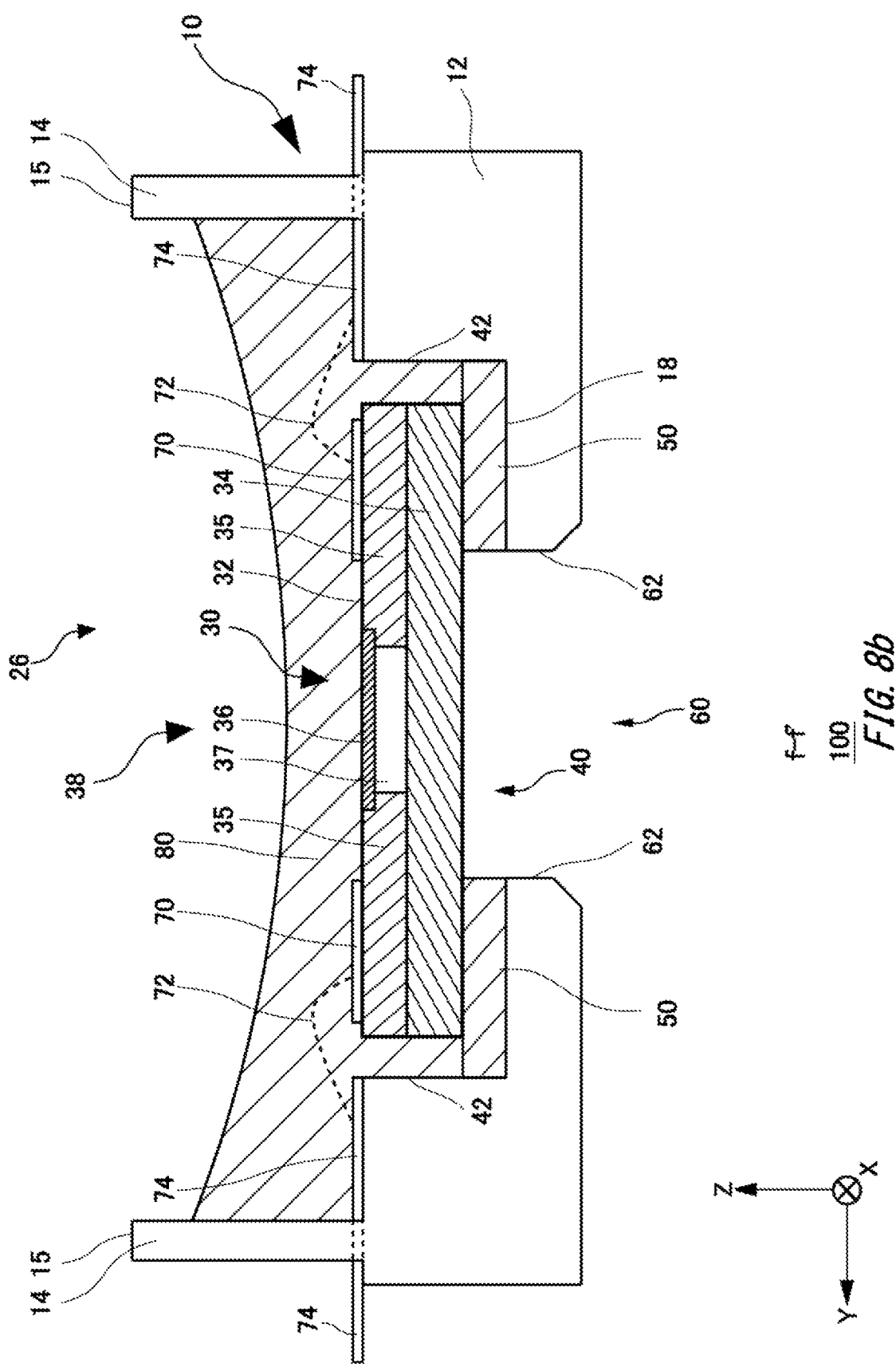

FIG. 8b is a drawing to illustrate an exemplary f-f' cross section shown in FIG. 8a. FIG. 8b schematically illustrates an exemplary cross section of a sensor case 10. As shown in FIG. 8b, the pressure sensor device 100 of the present example has a sensor case 10 filled with the protectant 80 such that the absolute pressure sensor unit 30 is covered with the protectant 80. The protectant 80 fills, after wire bonding the electrode pads 70 provided to the upper surface 32 of the absolute pressure sensor unit 30 and lead terminals 74 with bonding wires 72. The protectant 80 may be composed of the same kind of material as a composing material for the adhesive 50. In the present embodiment, the same kind of material refers to a material having the same principal chain of a component composing the adhesive 50. Both the protectant 80 and the adhesive 50 may be composed of a fluorine-based material, as an example. PFPE (perfluoropolyether) or the like can be used as the fluorine-based material.

The protectant 80 is made of gel including a free-oil. In the present embodiment, it is desirable to set free-oil concentration difference between the protectant 80 and the adhesive 50 to be as little as possible. The less the free-oil concentration difference is, the more free-oil included in the protectant 80 can be prevented from being diffused into the adhesive 50. Thus, the adhesive 50 can be prevented from being swollen by absorbing the diffused free-oil. Therefore, a change in stress balance between peripheral members such as the absolute pressure sensor unit 30 and the base portion 12 can be prevented.

Figure 9A:
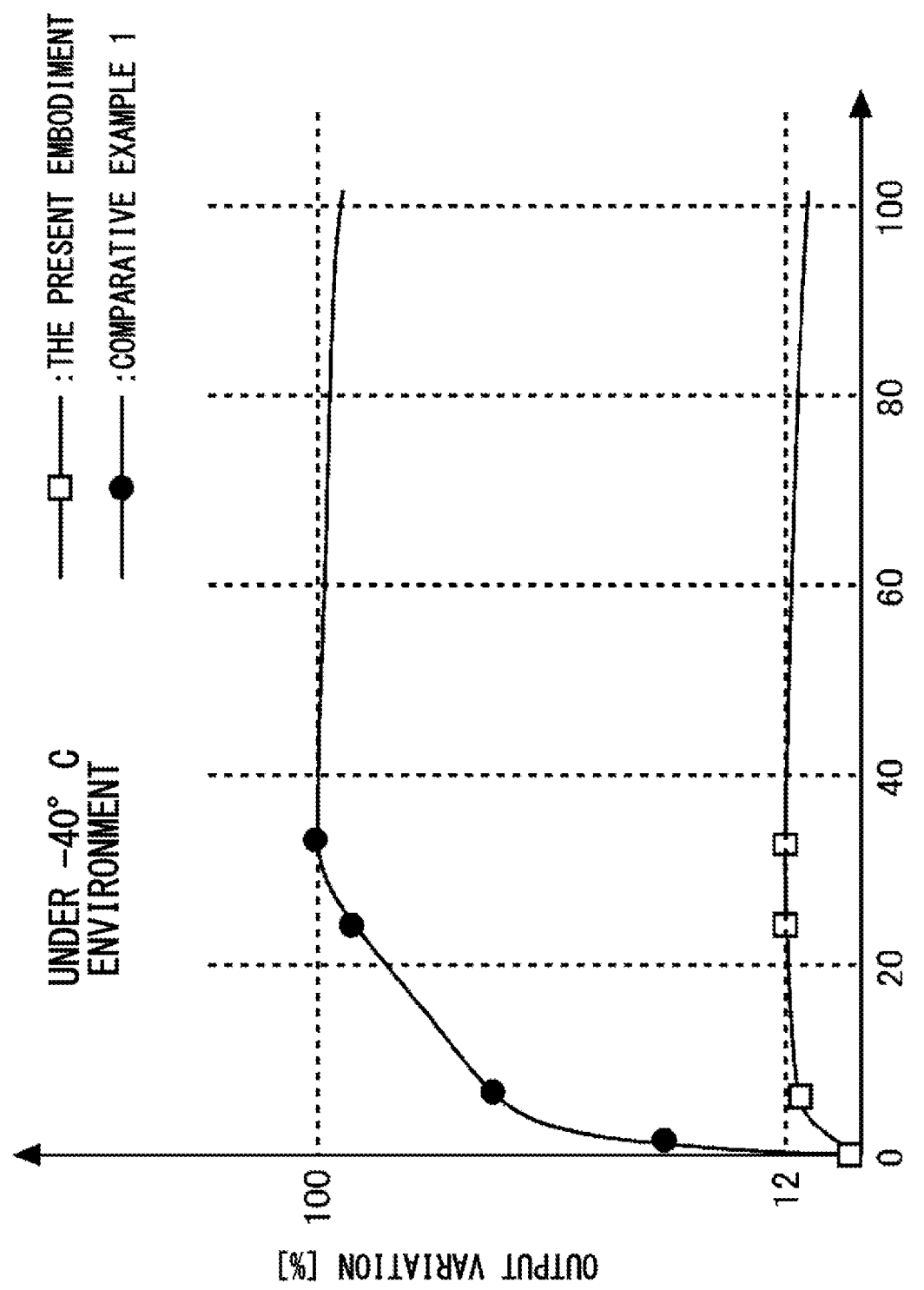

FIG. 9a is a drawing to illustrate a temporal change of a variation of output of the pressure sensor device 100 of FIG. 1a at −40° C., i.e., under a low temperature environment. Also illustrated in FIG. 9a is a temporal change of a variation of output of the pressure sensor device 150 of Comparative Example 1 illustrated in FIG. 2a and FIG. 2b. In FIG. 9a, the variation of output is illustrated, standardizing the maximum value of Comparative Example 1 as 100%.

As can be seen from FIG. 9a, the present example and the pressure sensor device 150 of Comparative Example 1 display their maximum variations of output when approximately 30 hours has elapsed since the measurement has started under the low temperature environment of −40° C. The maximum value of a variation of output of the pressure sensor device 100 having the aperture 60 can be suppressed to approximately ⅛ compared to the maximum value of a variation of output of Comparative Example 1.

Figure 9B:
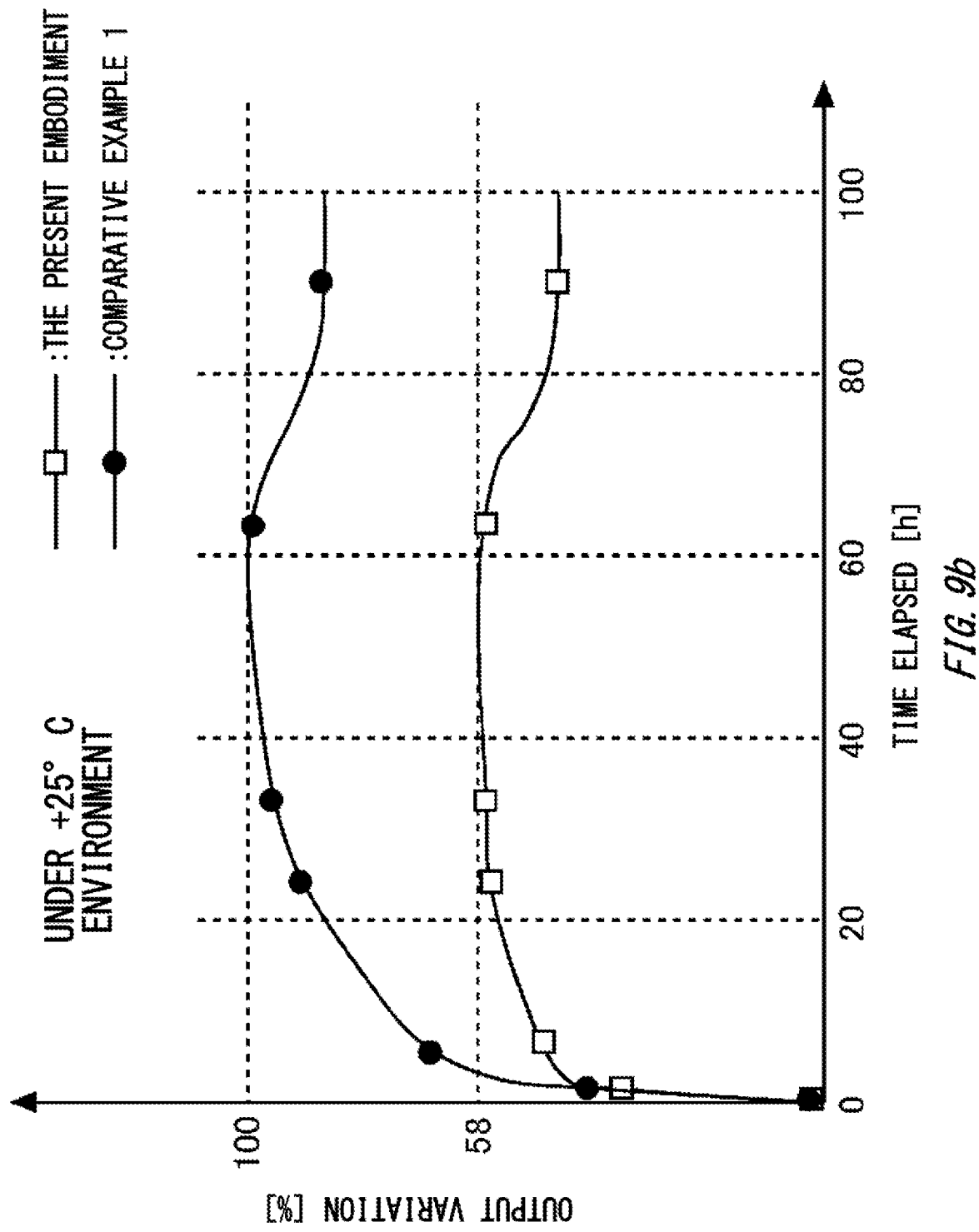

FIG. 9b is a drawing to illustrate a temporal change of a variation of output of the pressure sensor device 100 of FIG. 1a at 25° C., i.e., under an ordinary temperature environment. As can be seen from FIG. 9b, the present example and the pressure sensor device 150 of Comparative Example 1 display their maximum variations of output when approximately 60 hours has elapsed since the measurement has started under an ordinary environment of +25° C. The maximum value of the variation of output of the pressure sensor device 100 having the aperture 60 can be suppressed to approximately ⅗ compared to the maximum value of the variation of output of Comparative Example 1.

Figure 9C:
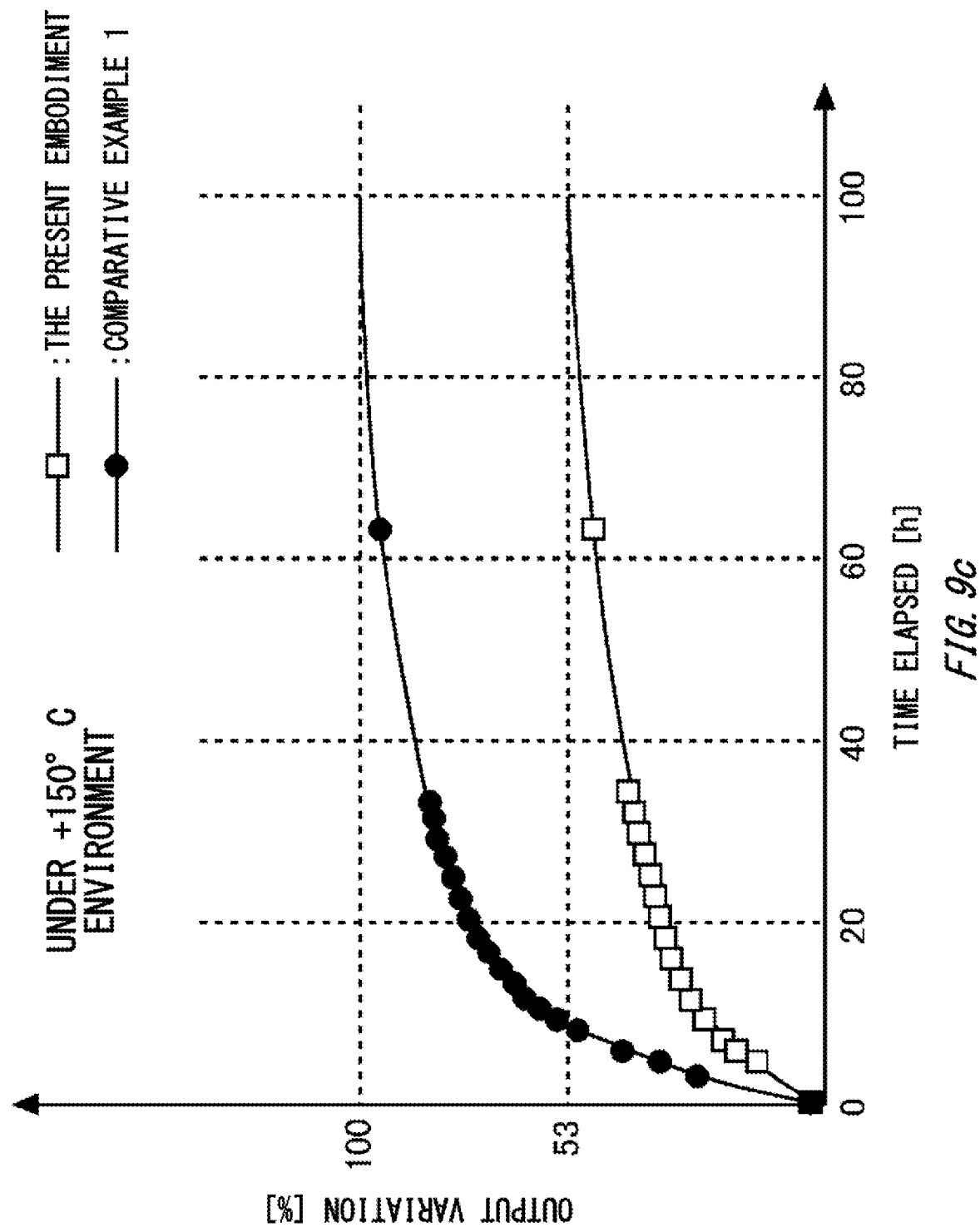

FIG. 9c is a drawing to illustrate a temporal change of a variation of output of the pressure sensor device 100 of FIG. 1a at 150° C., i.e., under a high temperature environment. As can be seen from FIG. 9c, variations of output of the present example and the pressure sensor device 150 of Comparative Example 1 are gradually saturated as time elapses, under a high temperature environment of 150° C. When approximately 100 hours has elapsed since the measurement has started, the variation of output of the pressure sensor device 100 having the aperture 60 can be suppressed to approximately ½ compared to the variation of output of Comparative Example 1.

Figure 10A:
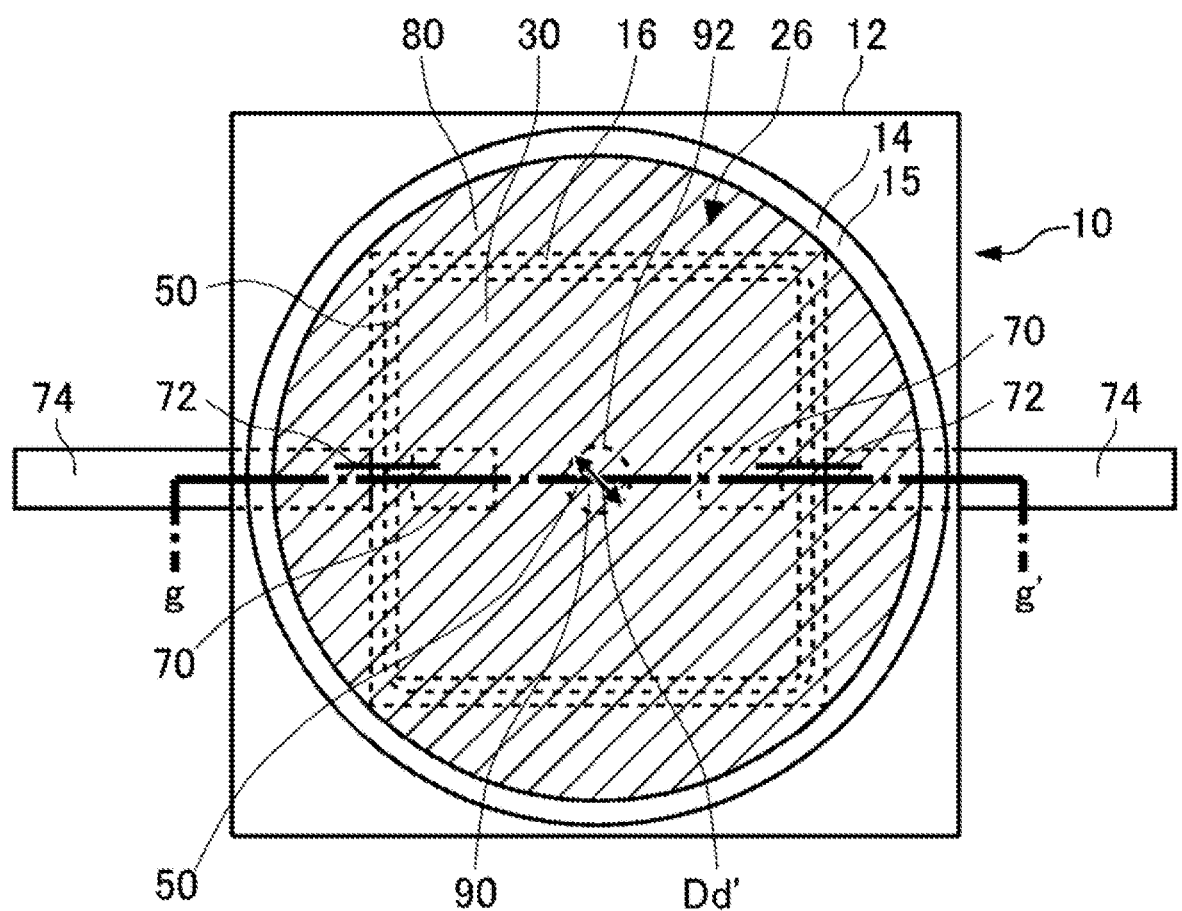
FIG. 10a is a drawing to illustrate an exemplary upper surface of a pressure sensor device 200 according to the second embodiment.

FIG. 10a is a drawing to illustrate an exemplary upper surface of a pressure sensor device 200 according to the second embodiment. The pressure sensor device 200 of the present example includes an absolute pressure sensor unit 30, and a sensor case 10 to accommodate the absolute pressure sensor unit 30. The sensor case 10 has a pressure receiving aperture portion 26 on an upper surface 15. The sensor case 10 has a bottom surface aperture portion 90 that is smaller than the pressure receiving aperture portion 26 on the bottom surface 18. Specifically, the bottom surface aperture portion 90 may have a surface area on an adhesive 50 side or the opposite side (the bottom surface side) that is smaller than a surface area of the pressure receiving aperture portion 26.

In the present example, the upper surface 15 refers to an upper surface of a wall 14. Also, in the present example, the pressure receiving aperture portion 26 refers to the inside of the wall 14 when seen from above, i.e., a region surrounded by the wall 14. In the present example, although the wall 14 is provided in a circular shape and the pressure receiving aperture portion 26 is provided in a circular shape when seen from above, they may be provided in another shape such as quadrangle shapes.

In the Z axis direction, the adhesive 50 is provided between the absolute pressure sensor unit 30 and the sensor case 10 to fix the absolute pressure sensor unit 30 and the sensor case 10 together. The adhesive 50 may be provided above the bottom surface aperture portion 90. That is, when seen from above, the adhesive 50 may be provided such that it overlaps with the bottom surface aperture portion 90. The adhesive 50 is provided above the bottom surface aperture portion 90 in the present example. However, the adhesive 50 may not be provided above the bottom surface aperture portion 90.

The bottom surface aperture portion 90 may be provided at the center of a base portion 12 surrounded by the wall 14 when seen from above. The bottom surface aperture portion 90 may be provided overlapping the absolute pressure sensor unit 30, or may be provided not to overlap the absolute pressure sensor unit 30, when seen from above. In the present example, the bottom surface aperture portion 90 is provided overlapping the absolute pressure sensor unit 30 when seen from above. The bottom surface aperture portion 90 may be provided in a circular shape when seen from above. That is, edges 92 of the bottom surface aperture portion 90 may be in circumferential shape when seen from above. The bottom surface aperture portion 90 may be provided in another shape such as a quadrangle shape when seen from above.

A diameter Dd' is a diameter of the bottom surface aperture portion 90. A width Ddf is a width of a diaphragm 36 in the Y axis direction. The width Ddf may be a diameter of the diaphragm 36 in a top view. The diameter Dd' may be from 0.5 mm to 2.0 mm inclusive, or may be from 1.0 mm to 1.5 mm inclusive. The diameter Dd' may be smaller than the width Ddf.

FIG. 10b is a drawing to illustrate an exemplary g-g' cross section shown in FIG. 10a. The g-g' cross section is an YZ plane passing through lead terminals 74, the wall 14, and a protectant 80.

The sensor case 10 may have a concave portion 16 to accommodate the absolute pressure sensor unit 30. The sensor case 10 may have the bottom surface aperture portion 90 on the bottom surface 18 of the concave portion 16. The bottom surface 18 refers to the bottom of the concave portion 16 facing the bottom surface of the absolute pressure sensor unit 30. The bottom surface aperture portion 90 may be provided in the middle of the bottom surface 18 of the concave portion 16 in the Y axis direction. Also, the sensor case 10 has the pressure receiving aperture portion 26 on the upper surface 15. The pressure receiving aperture portion 26 is a region surrounded by two walls 14 shown in the g-g' cross section.

The pressure sensor device 200 of the present example may include the adhesive 50 between the absolute pressure sensor unit 30 and the sensor case 10 in the Z axis direction. The adhesive 50 may be provided above the bottom surface aperture portion 90, but this is not essential. Above the bottom surface aperture portion 90 refers to a region in the +Z axis direction side relative to the bottom surface aperture portion 90, and inside the two edges 92 of the bottom surface aperture portion 90 in the Y axis direction. In the present example, the adhesive 50 is provided above the bottom surface aperture portion 90. The adhesive 50 may be continuously provided from the +Y axis direction side relative to the bottom surface aperture portion 90 to the −Y axis side of the bottom surface aperture portion 90, passing above the bottom surface aperture portion 90.

Above the bottom surface aperture portion 90, the bottom surface of the adhesive 50 and the bottom surface 18 may be provided on the same XY plane, or the bottom surface of the adhesive 50 may be provided protruding in the −Z axis direction side relative to the bottom surface 18, i.e., between the two edges 92 of the bottom surface aperture portion 90 in a YZ plane. In the present example, the bottom surface of the adhesive 50 and the bottom surface 18 are provided on the same XY plane.

In the Y axis direction, width of the adhesive 50 may be larger than width of the absolute pressure sensor unit 30. That is, an entire bottom surface of the absolute pressure sensor unit 30 may contact the adhesive 50.

The diaphragm 36 to detect pressure may be provided to the upper surface side of the absolute pressure sensor unit 30. The diaphragm 36 is provided contacting the upper surface of the absolute pressure sensor unit 30 in the present example. However, the diaphragm 36 may be provided not contacting the upper surface of the absolute pressure sensor unit 30. That is, the diaphragm 36 may be provided between the middle and the upper surface of the absolute pressure sensor unit in the Z axis direction.

The diaphragm 36 may be provided to the lower surface side of the absolute pressure sensor unit 30, i.e., on the bottom surface aperture portion 90 side. Pressure applied to the absolute pressure sensor unit 30 from the −Z axis direction side through the bottom surface aperture portion 90 may be detected by the diaphragm 36 provided to the bottom surface aperture portion 90 side.

Moisture can exist at an interface between an adhesive 50 and a sensor case 10, i.e., on the bottom surface 18, the moisture derived from humidity in an atmosphere to which the bottom surface 18 is exposed. If the bottom surface 18 is coated with the adhesive 50 in a process of attaching an absolute pressure sensor unit 30 to the sensor case 10, bubbles derived from the moisture may be caught between the adhesive 50 and the bottom surface 18. If the sensor case 10 is rapidly heated by reflow in a substrate mounting process, the moisture can be boiled explosively and turn into water vapor, thus rapidly expand its volume.

In the pressure sensor device 200 of the present example, the adhesive 50 is provided above the bottom surface aperture portion 90. Therefore, water vapor of the moisture boiled explosively by the reflow is easily discharged out of the sensor case 10 through the bottom surface aperture portion 90. Thus, it will be easy to suppress rapid volume expansion of the water vapor of the moisture boiled explosively. Thus, because pressure to push up the absolute pressure sensor unit 30 in the +Z axis direction side is unlikely to be exerted by this volume expansion at the interface between the base portion 12 and the adhesive 50 (i.e., on the bottom surface 18), it will be easy to suppress the adhesive 50 from peeling off the bottom surface 18. Thus, it will be easy to suppress a characteristic change of the absolute pressure sensor unit 30, damage to the protectant 80, and disconnection of bonding wires 72, which result from a change in stress balance that can be caused by the adhesive 50 peeling off the bottom surface 18.

Also, in the pressure sensor device 200 of the present example, since it will be easy to suppress the rapid volume expansion of the water vapor of the moisture boiled explosively by the reflow, the adhesive force of the adhesive 50 between the absolute pressure sensor unit 30 and the base portion 12 is not required to bond them with the adhesive force that is equal to or more than the pressure generated by this volume expansion. Thus, a process of increasing the adhesive force between the absolute pressure sensor unit 30 and the base portion 12 is no longer needed. Thus, it will be easy to suppress increase in production cost that results from addition of the process. Thus, it is possible to supply the pressure sensor device 200 of stable quality without increasing adhesion strength between the absolute pressure sensor unit 30 and the base portion 12.

Figure 11A:
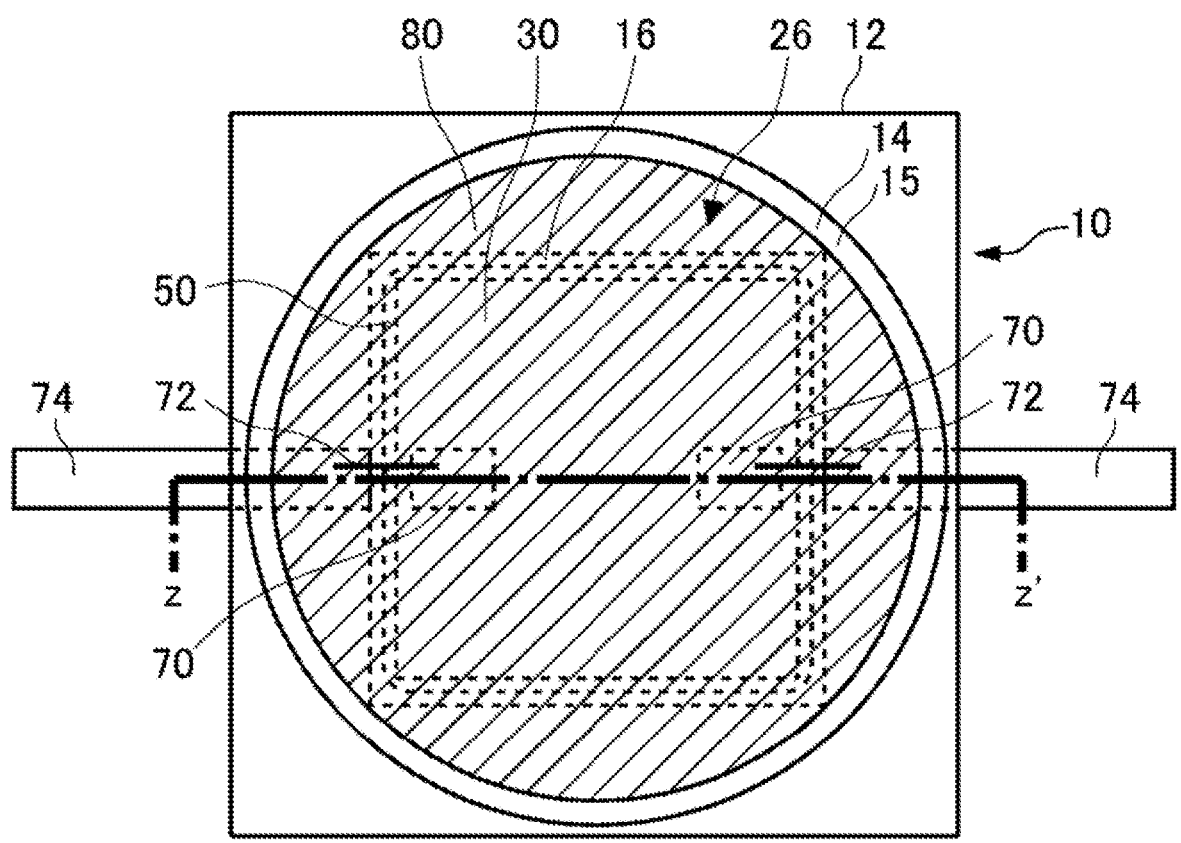
FIG. 11a is a drawing to illustrate an upper surface of a pressure sensor device 250 of Comparative Example 3.
Figure 11A:
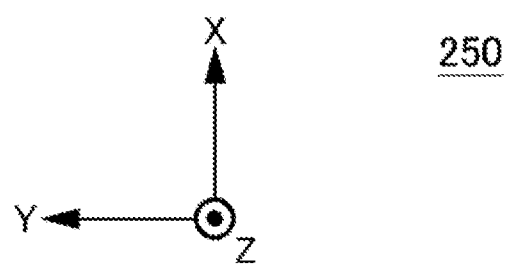

FIG. 11*a* is a drawing to illustrate an upper surface of a pressure sensor device 250 of Comparative Example 3. The pressure sensor device 250 of Comparative Example 3 is different from the pressure sensor device 200 of the present example illustrated in FIG. 10*a*, in that the pressure sensor device 250 does not have a bottom surface aperture portion 90 on the bottom surface 18 of a sensor case 10.

FIG. 11*b* is a drawing to illustrate a z-z' cross section of FIG. 11*a*. The z-z' cross section is an YZ plane passing through lead terminals 74, a wall 14, and a protectant 80. As shown in FIG. 11*b*, the pressure sensor device 250 of Comparative Example 3 does not have a bottom surface aperture portion 90 on the bottom surface 18.

Figure 11C:
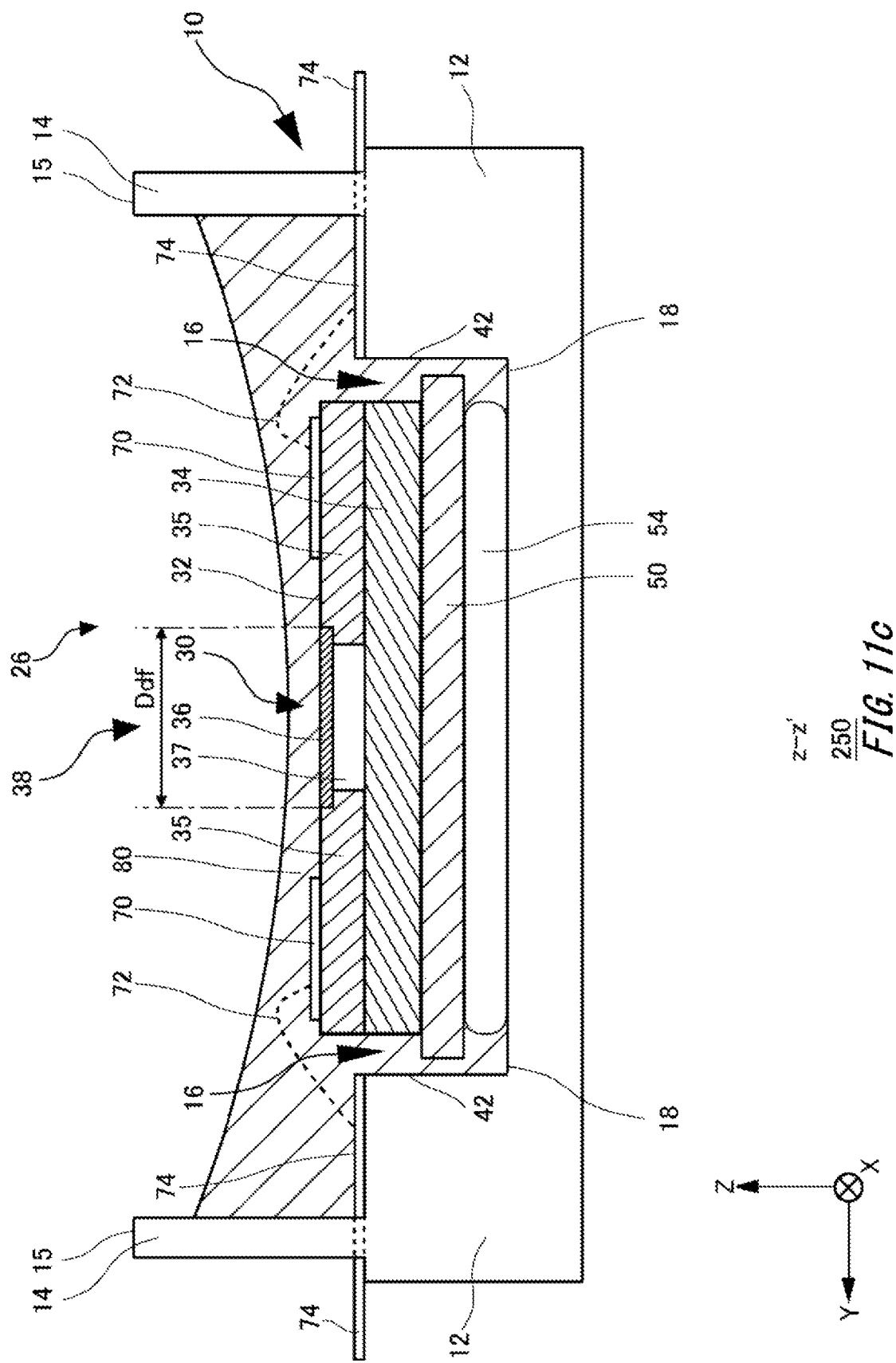

FIG. 11*c* is a drawing to illustrate a cross section in case of heating the sensor case 10 in the z-z' cross section of FIG. 11*a*. Since the pressure sensor device 250 of Comparative Example 3 does not have the bottom surface aperture portion 90 on the bottom surface 18, if the sensor case 10 is rapidly heated by reflow in a substrate mounting process, water vapor 54 of moisture boiled explosively by the reflow is unlikely to be discharged out of the sensor case 10. Thus, as shown in FIG. 11*c*, the water vapor 54 of the moisture boiled explosively is likely to rapidly expand its volume. Thus, because pressure to push up the absolute pressure sensor unit 30 in the +Z axis direction side is exerted by this volume expansion at the interface between the base portion 12 and the adhesive 50 (i.e., the bottom surface 18), the adhesive 50 is likely to peel off the bottom surface 18. Thus, it is difficult to suppress a characteristic change of the absolute pressure sensor unit 30, damage to the protectant 80, and disconnection of bonding wires 72, which result from a change in stress balance that can be caused by the adhesive 50 peeling off the bottom surface 18.

Also, in the pressure sensor device 250 of the Comparative Example 3, since it is difficult to suppress the rapid volume expansion of the water vapor 54 of the moisture boiled explosively by the reflow, the adhesive force of the adhesive 50 between the absolute pressure sensor unit 30 and the base portion 12 is required to bond them with the adhesive force that is equal to or more than the pressure generated by this volume expansion. Thus, a process to increase adhesive force between the absolute pressure sensor unit 30 and the base portion 12 will be necessary. Thus, production cost is likely to increase due to addition of the process. Thus, it is difficult to supply the pressure sensor device 200 of stable quality without increasing adhesion strength between the absolute pressure sensor unit 30 and the base portion 12.

Figure 12A:
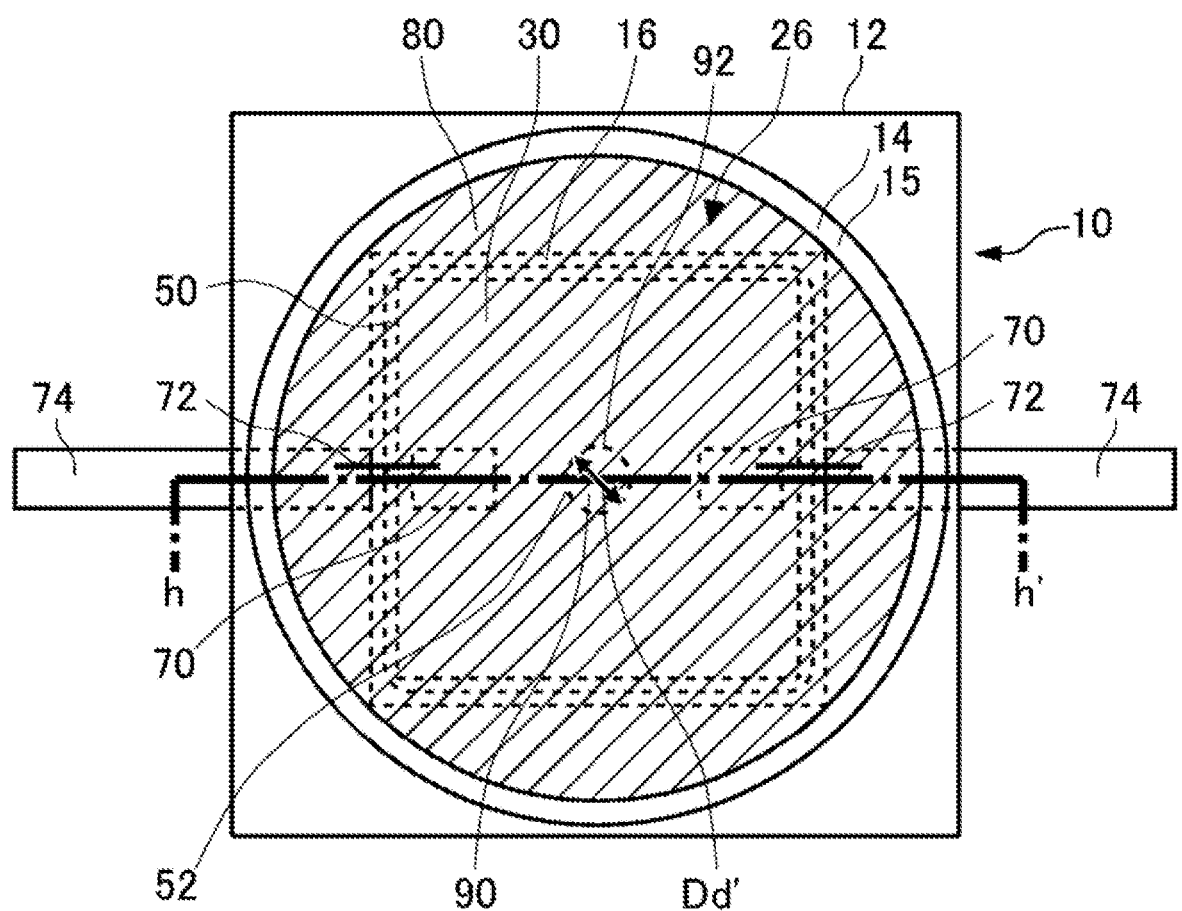
FIG. 12a is a drawing to illustrate another exemplary upper surface of a pressure sensor device 200 according to the second embodiment.

FIG. 12*a* is a drawing to illustrate another exemplary upper surface of a pressure sensor device 200 according to the second embodiment. The pressure sensor device 200 of the present example is different from the pressure sensor device 200 illustrate in FIG. 10*a*, in that the pressure sensor device 200 of the present example is not provided with an adhesive 50 above a bottom surface aperture portion 90. That is, the adhesive 50 of the pressure sensor device 200 of the present example is provided in regions excluding a region for the bottom surface aperture portion 90, when seen from above. In other words, the adhesive 50 and the bottom surface aperture portion 90 do not overlap when seen from above. In the top view, edges 92 of the bottom surface aperture portion 90 and edges 52 of the adhesive 50 may match.

FIG. 12*b* is a drawing to illustrate an exemplary h-h' cross section shown in FIG. 12*a*. The h-h' cross section is an YZ plane passing through lead terminals 74, a wall 14, and a protectant 80. As shown in FIG. 12*b*, the pressure sensor device 200 of the present example is not provided with an adhesive 50 above the bottom surface aperture portion 90.

Edges 52 are edges of the adhesive 50. The edges 52 may refer to portions, among portions of the adhesive 50, to contact outside air flowing in the Y axis direction through the bottom surface aperture portion 90. In the Y axis direction, positions of the edges 52 of the adhesive 50 may match positions of the edges 92 of the bottom surface aperture portion 90.

The edges 52 may be arranged inside the bottom surface aperture portion 90 in the Y axis direction. That is, the edges 52 may be protruding on a side close to the bottom surface aperture portion 90 relative to the edges 92 in the Y axis direction. The edges 52 may be arranged outside the bottom surface aperture portion 90 in the Y axis direction. That is, an edge 52 on the +Y axis direction side may be arranged on the side close to the +Y axis direction relative to an edge 92 on the +Y axis direction side, and an edge 52 on the −Y axis direction side may be arranged on the side close to the −Y axis direction relative to an edge 92 on the −Y axis direction side.

Since the adhesive 50 of the pressure sensor device 200 of the present example is not provided above the bottom surface aperture portion 90 when seen from above, if a sensor case 10 is rapidly heated by reflow in a substrate mounting process, water vapor 54 of the moisture boiled explosively by the reflow is discharged out of the sensor case 10, passing through the bottom surface aperture portion 90 from the edges 52. Thus, it will be easy to suppress rapid volume expansion of the water vapor 54 of the moisture boiled explosively. Thus, it will be easy to suppress the adhesive 50 from peeling off bottom surfaces 18 due to pressure exerted by this volume expansion, at interfaces between base portions 12 and the adhesive 50 (i.e., the bottom surfaces 18). Thus, it will be easy to suppress a characteristic change of the absolute pressure sensor unit 30, damage to the protectant 80, and disconnection of bonding wires 72, which result from a change in stress balance that can be caused by the adhesive 50 peeling off the bottom surfaces 18.

Also, in the pressure sensor device 200 of the present example, since it will be easy to suppress the rapid volume expansion of the water vapor 54 of the moisture boiled explosively by the reflow, the adhesive force of the adhesive 50 between the absolute pressure sensor unit 30 and the base portions 12 is not required to bond them with the adhesive force that is equal to or more than the pressure generated by this volume expansion. Thus, a process of increasing adhesive force between the absolute pressure sensor unit 30 and the base portion 12 is no longer needed. Thus, it will be easy to suppress increase in production cost that results from addition of the process. Thus, it is possible to supply the pressure sensor device 200 of stable quality without increasing adhesion strength between the absolute pressure sensor unit 30 and the base portions 12.

Figure 13A:
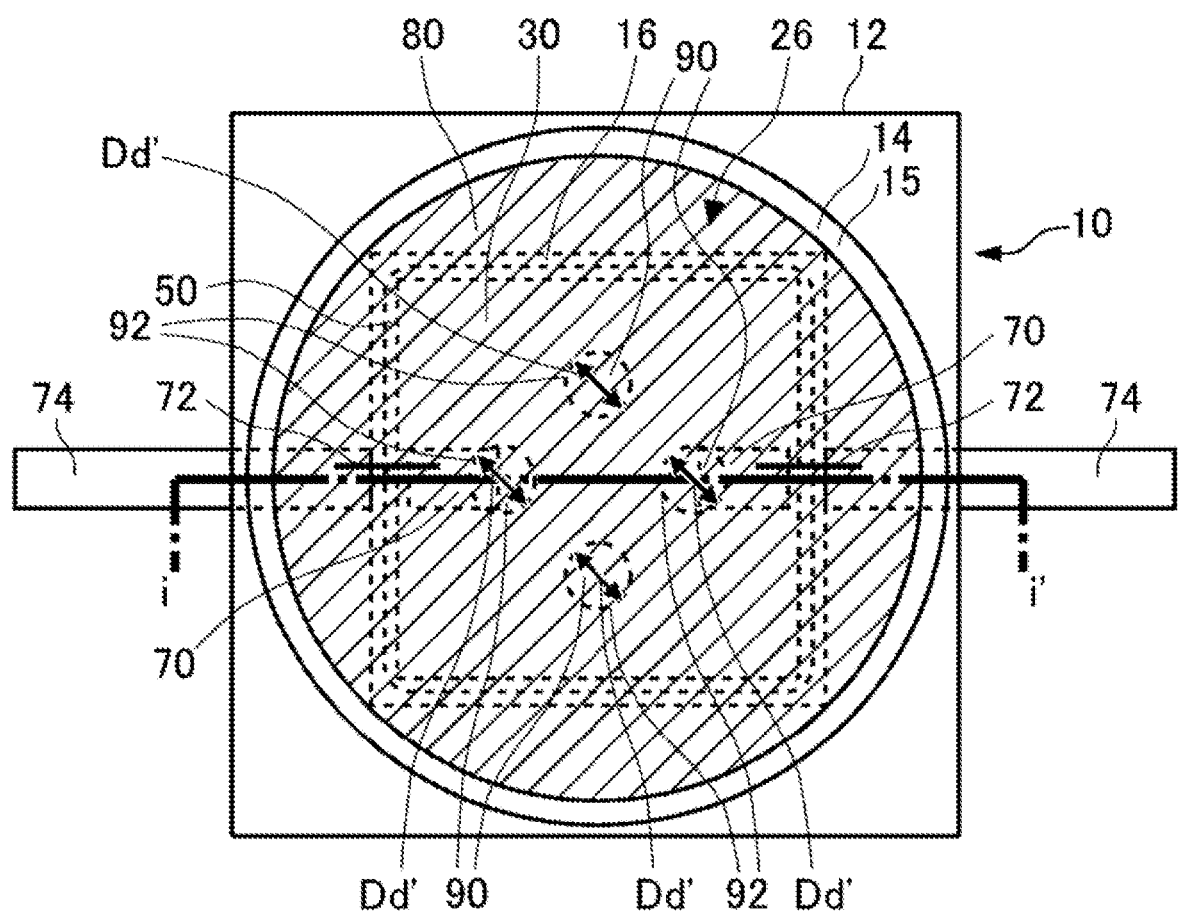
FIG. 13a is a drawing to illustrate another exemplary upper surface of a pressure sensor device 200 according to the second embodiment.

FIG. 13a is a drawing to illustrate another exemplary upper surface of a pressure sensor device 200 according to the second embodiment. The pressure sensor device 200 of the present example is different from the pressure sensor device 200 illustrated in FIG. 10a, in that the pressure sensor device 200 of the present example has a plurality of bottom surface aperture portions 90. Although four bottom surface aperture portions 90 are provided in the present example, two, three, or five or more bottom surface aperture portions 90 may also be provided.

In the present example, the four bottom surface aperture portions 90 are provided such that if their respective centers are connected, they form a square when seen from above. However, the four bottom surface aperture portions 90 may be provided such that their respective centers form a trapezoid or another type of quadrangle shape. In the present example, the two bottom surface aperture portions 90 arranged on a diagonal line of the square may be arranged in the X axis direction, and the other two bottom surface aperture portions 90 may be arranged in the Y axis direction.

The four bottom surface aperture portions 90 are provided in circular shapes having respective diameters Dd' in the present example when seen from above. However, some bottom surface aperture portions 90 among the four bottom surface aperture portions 90 may have respective diameters smaller or larger than the diameter Dd'. The diameters of the four bottom surface aperture portions 90 may all be different from each other.

Although the four bottom surface aperture portions 90 are respectively provided in circular shapes when seen from above in the present example, they may be provided in other shapes such as quadrangle shapes. Two bottom surface aperture portions 90 among the four apertures may be provided in circular shapes when seen from above, and the other two bottom surface aperture portions 90 may be provided in quadrangle shapes when seen from above. Shapes of the bottom surface aperture portions 90 in a top view are not particularly limited.

Figure 13B:
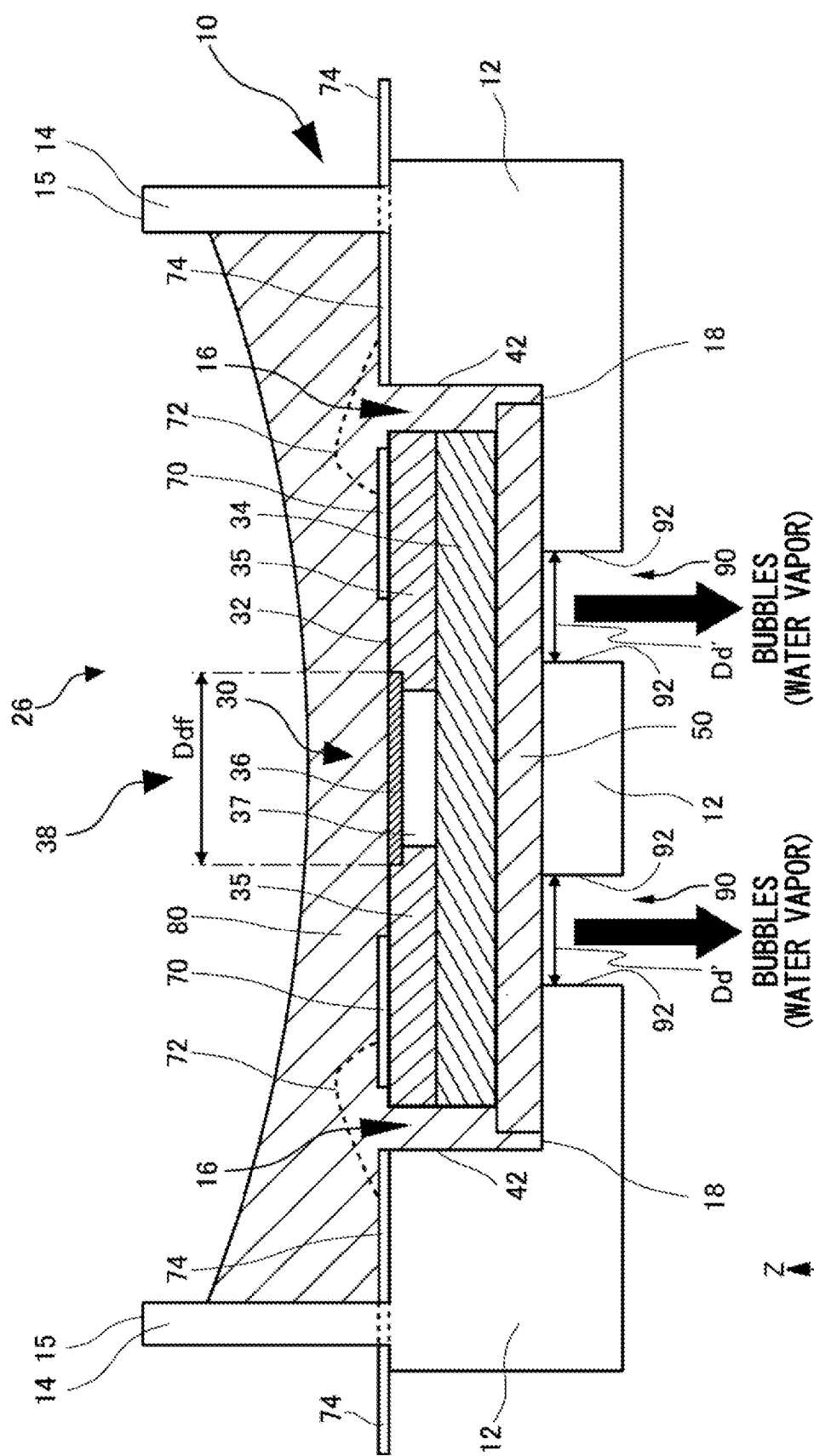

FIG. 13b is a drawing to illustrate an exemplary i-i' cross section shown in FIG. 13a. The i-i' cross section is an YZ plane passing through lead terminals 74, a wall 14, and a protectant 80. As shown in FIG. 13b, the pressure sensor device 200 of the present example is provided with two bottom surface aperture portions 90 in the i-i' cross section. An adhesive 50 is provided above the bottom surface aperture portion 90.

Since the pressure sensor device 200 of the present example is provided with a plurality of the bottom surface aperture portions 90, if a sensor case 10 is rapidly heated by reflow in a substrate mounting process, water vapor 54 of the moisture boiled explosively by the reflow is even easier to be discharged out of the sensor case 10 than that of the pressure sensor device 200 illustrated in FIG. 10b. Thus, it will be even easier to suppress rapid volume expansion of the water vapor 54 of the moisture boiled explosively than the pressure sensor device 200 illustrated in FIG. 10b suppressing it. Thus, it will be even easier to suppress the adhesive 50 from peeling off the bottom surface 18 due to pressure exerted by this volume expansion, at an interface between a base portion 12 and the adhesive 50 (i.e., the bottom surface 18), than the pressure sensor device 200 illustrated in FIG. 10b suppressing it. Thus, it will be even easier to suppress a characteristic change of an absolute pressure sensor unit 30, damage to the protectant 80, and disconnection of bonding wires 72, which result from a change in stress balance that can be caused by the adhesive 50 peeling off the bottom surface 18, than the pressure sensor device 200 illustrated in FIG. 10b suppressing them.

Also, in the pressure sensor device 200 of the present example, since it will be easy to suppress the rapid volume expansion of the water vapor 54 of the moisture boiled explosively by the reflow, a process of increasing adhesive force between the absolute pressure sensor unit 30 and the base portion 12 is no longer needed, same as the pressure sensor device 200 illustrated in FIG. 10b. Thus, it will be easy to suppress increase in production cost that results from addition of the process. Thus, it is possible to supply the pressure sensor device 200 of stable quality without increasing adhesion strength between the absolute pressure sensor unit 30 and the base portion 12.

Figure 14A:
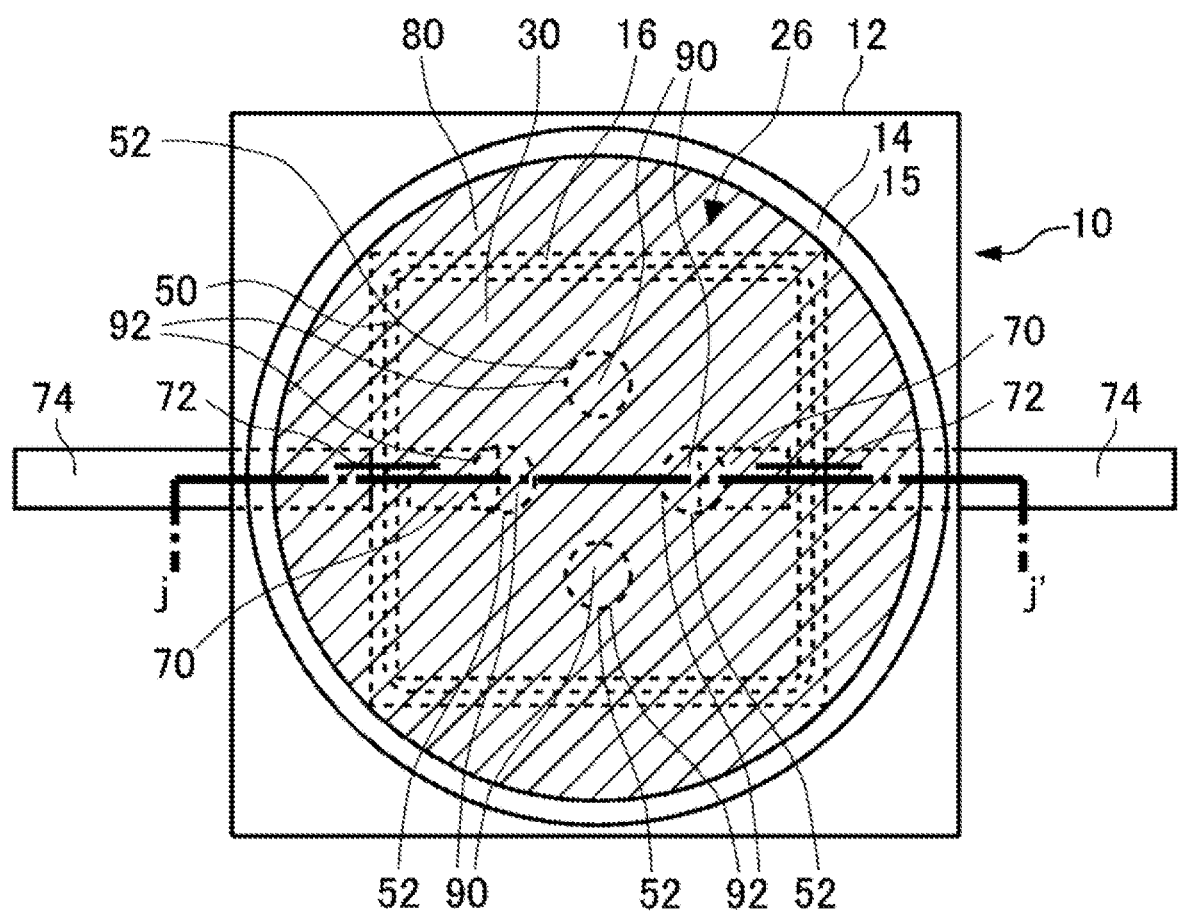
FIG. 14a is a drawing to illustrate another exemplary upper surface of a pressure sensor device 200 according to the second embodiment.

FIG. 14a is a drawing to illustrate another exemplary upper surface of a pressure sensor device 200 according to the second embodiment. The pressure sensor device 200 of the present example is different from the pressure sensor device 200 illustrated in FIG. 13a, in that the pressure sensor device 200 of the present example is not provided with an adhesive 50 above bottom surface aperture portions 90. That is, the adhesive 50 and the bottom surface aperture portion 90 of the pressure sensor device 200 of the present example do not overlap when seen from above. In the top view, edges 92 of the bottom surface aperture portion 90 and edges 52 of the adhesive 50 may match. Note that, in FIG. 14a, illustrations of diameters Dd' of bottom surface aperture portions 90 are omitted for visibility of the drawing.

FIG. 14b is a drawing to illustrate an exemplary j-j' cross section shown in FIG. 14a. The j-j' cross section is an YZ plane passing through lead terminals 74, a wall 14, and a protectant 80. As shown in FIG. 14b, in the pressure sensor device 200 of the present example, an adhesive 50 is not provided above two individual bottom surface aperture portions 90.

In the Y axis direction, positions of the edges 52 of the adhesive 50 may match positions of the edges 92 of the bottom surface aperture portions 90.

The edges 52 may be arranged inside the bottom surface aperture portions 90, or may be arranged outside the bottom surface aperture portions 90 in the Y axis direction.

Since the pressure sensor device 200 of the present example is provided with a plurality of the bottom surface aperture portions 90, if a sensor case 10 is rapidly heated by reflow in a substrate mounting process, water vapor 54 of the moisture boiled explosively by the reflow is even easier to be discharged out of the sensor case 10 than that of the pressure sensor device 200 illustrated in FIG. 12b. Thus, it will be even easier to suppress rapid volume expansion of the water vapor 54 of the moisture boiled explosively than the pressure sensor device 200 illustrated in FIG. 12b suppressing it. Thus, it will be even easier to suppress the adhesive 50 from peeling off the bottom surface 18 due to pressure exerted by this volume expansion, at an interface between a base portion 12 and the adhesive 50 (i.e., the bottom surface 18), than the pressure sensor device 200 illustrated in FIG. 12b suppressing them. Thus, it will be even easier to suppress a characteristic change of an absolute pressure sensor unit 30, damage to the protectant 80, and disconnection of bonding wires 72, which result from a change in stress balance that can be caused by the adhesive 50 peeling off the bottom surface 18, than the pressure sensor device 200 illustrated in FIG. 12b suppressing them.

Also, in the pressure sensor device 200 of the present example, since it will be easy to suppress the rapid volume expansion of the water vapor 54 of the moisture boiled explosively by the reflow, a process of increasing adhesive force between the absolute pressure sensor unit 30 and the base portion 12 is no longer needed, same as the pressure sensor device 200 illustrated in FIG. 12b. Thus, it will be easy to suppress increase in production cost that results from addition of the process. Thus, it is possible to supply the pressure sensor device 200 of stable quality without increasing adhesion strength between the absolute pressure sensor unit 30 and the base portion 12.

Figure 15A:
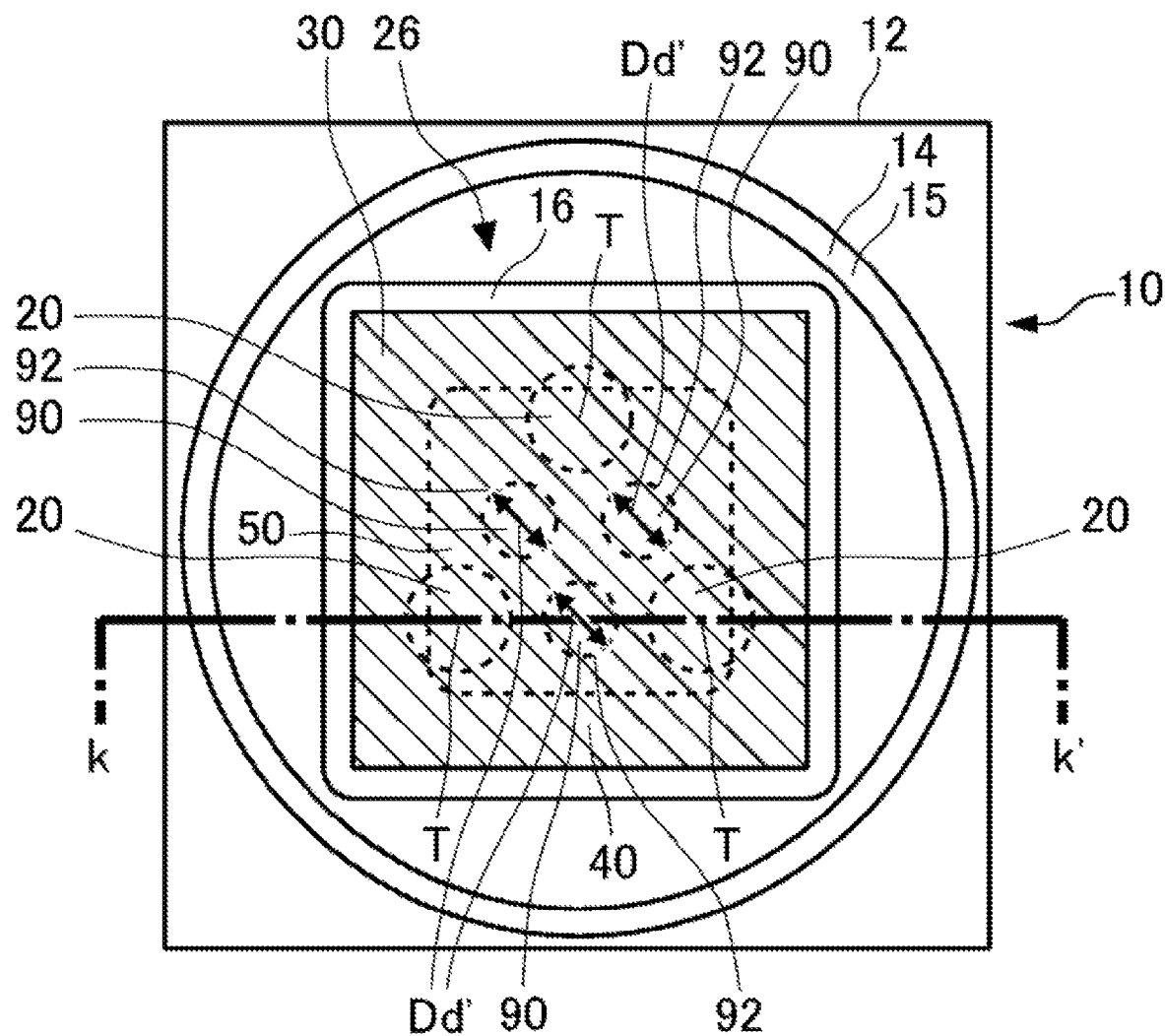
FIG. 15a is a drawing to illustrate another exemplary upper surface of a pressure sensor device 200 according to the second embodiment.
Figure 15A:
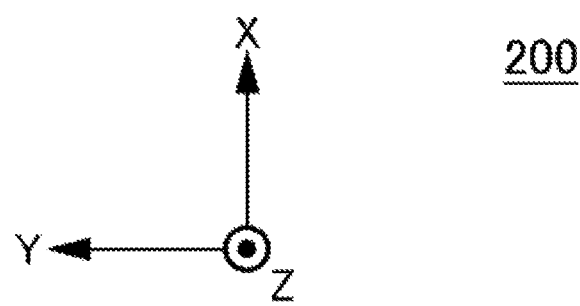

FIG. 15a is a drawing to illustrate another exemplary upper surface of a pressure sensor device 200 according to the second embodiment. The pressure sensor device 200 of the present example is different from the pressure sensor device 100 illustrated in FIG. 5a, in that the pressure sensor device 200 is provided with bottom surface aperture portions 90 on the bottom surface 18 of a sensor case 10. In the present example, protrusions 20 are provided in regions that are different from regions of the bottom surface aperture portions 90. That is, the protrusions 20 are not provided above the bottom surface aperture portions 90. The protrusions 20 are provided such that they do not overlap the bottom surface aperture portions 90 when seen from above.

In the Z axis direction, the adhesive 50 is provided between the absolute pressure sensor unit 30 and the sensor case 10 to fix the absolute pressure sensor unit 30 and the sensor case 10 together. An adhesive 50 is provided above the bottom surface aperture portion 90 in the present example. However, the adhesive 50 may not be provided above the bottom surface aperture portion 90.

Although three bottom surface aperture portions 90 are provided in the present example, one, two, or four or more bottom surface aperture portions 90 may also be provided. In the present example, the three bottom surface aperture portions 90 are provided such that they form an equilateral triangle when seen from above. However, they may be provided such that they form another type of triangle.

The three bottom surface aperture portions 90 are provided in circular shapes having respective diameters Dd' in the present example when seen from above. However, some bottom surface aperture portions 90 among the three bottom surface aperture portions 90 may have respective diameters smaller or larger than the diameter Dd'. The diameters of the three bottom surface aperture portion 90 may all be different from each other.

Although the three bottom surface aperture portions 90 are respectively provided in circular shapes when seen from above in the present example, they may be provided in other shapes such as quadrangle shapes. Two bottom surface aperture portions 90 among the three apertures may be provided in circular shapes when seen from above, and another bottom surface aperture portion 90 may be provided in a quadrangle shape when seen from above. Shapes of the bottom surface aperture portions 90 in a top view are not particularly limited.

FIG. 15b is a drawing to illustrate an exemplary k-k' cross section shown in FIG. 15a. The k-k' cross section is an YZ plane passing through a wall 14. Also, the k-k' cross section is a cross section passing through tops T of two protrusions 20 that are parallel to the Y axis direction, among three protrusions 20, and one bottom surface aperture portion 90 provided between the two protrusions 20.

The pressure sensor device 200 of the present example has an adhesive 50 on the middle side of the bottom surface 18 in the Y axis direction. The adhesive 50 may be provided above the bottom surface aperture portions 90. That is, the adhesive 50 may be continuously provided from the +Y axis direction side relative to the bottom surface aperture portion 90 to the −Y axis side of the bottom surface aperture portion 90, passing above the bottom surface aperture portion 90.

Also, the pressure sensor device 200 of the present example has a space 40 on each end side of the bottom surface 18 in the Y axis direction and under each end side of the absolute pressure sensor unit 30 in the Y axis direction. The adhesive 50 is provided, reaching a side close to the −Y axis direction relative to a top T of a protrusion 20 that is on the −Y axis direction side between two protrusions 20 in the k-k' cross section. The adhesive 50 is provided, reaching a side close to the +Y axis direction relative to a top T of a protrusion 20 that is on the +Y axis direction side between two protrusions 20 in the k-k' cross section. Thus, the tops T of the two protrusions 20 and the bottom surface of the absolute pressure sensor unit 30 do not contact each other. Parts of the protrusions 20 contact the space 40.

In the k-k' cross section, the pressure sensor device 200 of the present example has the bottom surface aperture portion 90 in the middle of a base portion 12 in the Y axis direction. The protrusions 20 may not need to be provided above the bottom surface aperture portion 90. That is, the protrusions 20 and the bottom surface aperture portion 90 may be provided at positions different from each other in the Y axis direction. The protrusions 20 and the bottom surface aperture portion 90 may not have portions overlapping each other in the Z axis direction. That is, entire bottom surfaces of the protrusions 20 may contact the bottom surface 18.

In the pressure sensor device 200 of the present example, the adhesive 50 is provided above the bottom surface aperture portion 90. Therefore, water vapor 54 of the moisture boiled explosively by reflow is easily discharged out of the sensor case 10 through the bottom surface aperture portion 90. Thus, it will be easy to suppress rapid volume expansion of the water vapor 54 of the moisture boiled explosively. Thus it will be easy to suppress the adhesive 50 from peeling off the bottom surface 18 due to pressure exerted by this volume expansion, at the interface between the base portion 12 and the adhesive 50 (i.e., the bottom surface 18). Thus, it will be easy to suppress a characteristic change of the absolute pressure sensor unit 30, damage to the protectant 80, and disconnection of bonding wires 72, which result from a change in stress balance that can be caused by the adhesive 50 peeling off the bottom surface 18.

Also, in the pressure sensor device 200 of the present example, since it will be easy to suppress the rapid volume expansion of the water vapor 54 of the moisture boiled explosively by the reflow, the adhesive force of the adhesive 50 between the absolute pressure sensor unit 30 and the base portion 12 is not required to bond them with the adhesive force that is equal to or more than the pressure generated by this volume expansion. Thus, a process of increasing adhesive force between the absolute pressure sensor unit 30 and the base portion 12 is no longer needed. Thus, it will be easy to suppress increase in production cost that results from addition of the process. Thus, it is possible to supply the pressure sensor device 200 of stable quality without increasing adhesion strength between the absolute pressure sensor unit 30 and the base portion 12.

Also, since the protrusions 20 of the pressure sensor device 200 of the present example are not provided above the bottom surface aperture portion 90, the absolute pressure sensor unit 30 is stably arranged above the protrusions 20 compared with a case in which protrusions 20 are provided above a bottom surface aperture portion 90. Thus, it is possible to stabilize pressure detecting characteristic of the absolute pressure sensor unit 30.

Note that, in the pressure sensor device 200 according to the second embodiment also, stress and distortion can be effectively suppressed by providing space free of the adhesive 50, and a variation of output of the absolute pressure sensor unit 30 can be suppressed further.

Figure 16A:
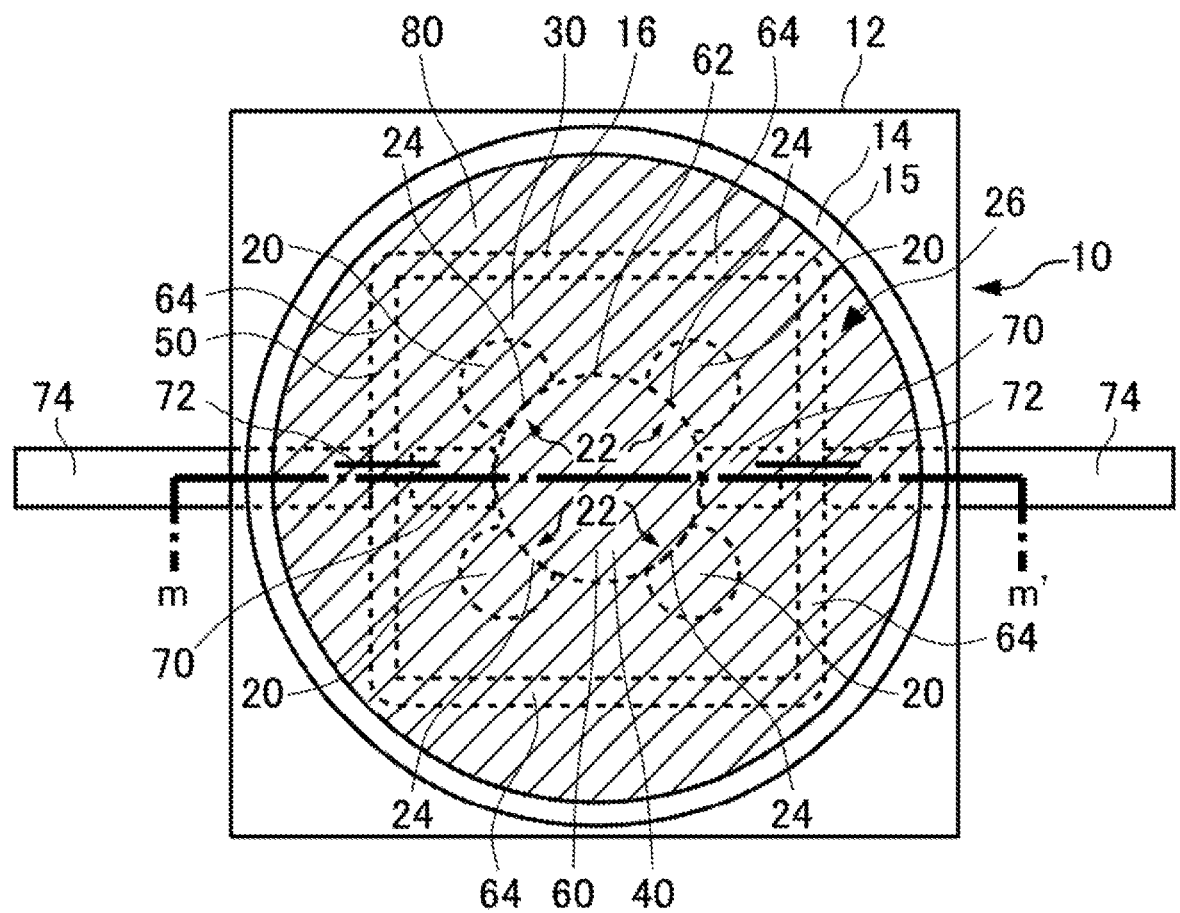
FIG. 16a is a drawing to illustrate another exemplary upper surface of a pressure sensor device 300 according to the third embodiment.

FIG. 16a is a drawing to illustrate an exemplary upper surface of a pressure sensor device 300 according to the third embodiment.

The pressure sensor device 300 of the present example is different from the pressure sensor device 100 illustrated in FIG. 8a, in that the pressure sensor device 300 is provided with grooves 64 at ends of a bottom surface 18 of a sensor case 10. The grooves 64 of the present example are provided in the depth direction (−Z axis direction) from the bottom surface 18. In the depth direction, the grooves 64 terminate between the bottom surface 18 and a bottom surface of a base portion 12 of the sensor case 10. That is, the grooves 64 do not penetrate the bottom surface of the base portion 12.

The grooves 64 may be provided so as to surround an absolute pressure sensor unit 30 when seen from above. That is, the grooves 64 may be provided to an end on the +Y axis side and an end on the −Y axis side, and an end on the +X axis side and an end on the −X axis side of the bottom surface 18.

The grooves 64 may be provided to positions not overlapping the absolute pressure sensor unit 30 when seen from above. That is, the grooves 64 may be provided outside the periphery of the absolute pressure sensor unit 30 so as to surround the absolute pressure sensor unit 30 when seen from above.

FIG. 16b is a drawing to illustrate an exemplary m-m' cross section shown in FIG. 16a. The m-m' cross section is an YZ plane passing through lead terminals 74, a wall 14, and a protectant 80. As shown in FIG. 16b, the pressure sensor device 300 of the present example is provided with grooves 64 on the bottom surface 18 of the sensor case 10. The grooves 64 may be provided to ends on the +Y axis side and the −Y axis side of the bottom surface 18.

In the present example, a position P1 is a position in the Y axis direction on a side surface 66 that is on the −Y axis side of the absolute pressure sensor unit 30. A position P2 is a position in the Y axis direction on a side surface 42 on the −Y axis side. A position P1' is a position in the Y axis direction on the side surface 66 that is on the +Y axis side of the absolute pressure sensor unit 30. A position P2' is a position in the Y axis direction on the side surface 42 that is on the +Y axis side.

In the present example, a position S1 is a position in the Y axis direction on the side wall 46 that is on the +Y axis side (the aperture 60 side) of the groove 64 on the −Y axis side. A position S2 is a position in the Y axis direction on a side wall 44 that is on the −Y axis side of this groove 64. A position S1' is a position in the Y axis direction on the side wall 46 that is on the −Y axis side (the aperture 60 side) of the groove 64 on the +Y axis side. The position S2' is a position in the Y axis direction on the side wall 44 that is on the +Y axis side of this groove 64.

A width Wg is a width between the position S1 and the position S2 in the Y axis direction. A width Wg' is a width between the position S1' and the position S2' in the Y axis direction. The width Wg may be equal to or may be different from the width Wg'.

The position S1 may match the position P1. The position S1' may match the position P1'. That is, the side walls 46 of the grooves 64 on the aperture 60 side may be arranged at the same position as the side surfaces 66 of the absolute pressure sensor 30 when seen from above. The grooves 64 may be provided to positions not overlapping the absolute pressure sensor unit 30 when seen from above.

The position S1 may be arranged on a side close to the +Y axis side (the aperture 60 side) relative to the position P1. By arranging the position S1 on the side close to the +Y axis side relative to the position P1, the groove 64 can accommodate more adhesives 50 compared with a case in which the position S1 matches the position P1. Also the position S1' may be arranged on a side close to the −Y axis side (the aperture 60 side) relative to the position P1'. By arranging the position S1' on the side close to the −Y axis side relative to the position P1', the grooves 64 can accommodate more adhesives 50 compared with a case in which the position S1' matches the position P1'.

The position S2 may match the position P2. The position S2' may match the position P2'. That is, the side walls 44 of the grooves 64 may be in the same XZ plane as the XZ plane of the side walls 42.

In the present example, a position U is a position in the Z axis direction on the bottom surface of the absolute pressure sensor unit 30. A position V is a position in the Z axis direction on the upper surface of the adhesive 50. In the present example, the position V matches the position U. The position V may be arranged on a side close to the −Z axis side relative to the position U. That is, a position on the upper surface of the adhesive may be arranged lower than a position on the bottom surface of the absolute pressure sensor unit 30.

In the present example, a depth Dg is a depth from a bottom surface 18 to the bottom surface of a groove 64. A depth Dp is a depth from a bottom surface 18 to the bottom surface of the base portion 12. The depth Dg may be shallower than half the depth Dp. By making the depth Dg shallower than half the depth Dp, if stress occurs due to the difference in thermal expansion coefficient between the adhesive 50 and the bottom surface 18, distortion is unlikely to occur to the base portion 12 that is under the adhesive 50 due to the stress. The depth Dg may be from 50 μm to 150 μm inclusive. The depth Dg is 100 μm, for example.

The pressure sensor device 300 of the present example is provided with grooves 64 at ends of the bottom surface 18 of a sensor unit 10. Thus, in an assembly process of the pressure sensor device 300, if the absolute pressure sensor unit 30 is loaded to the sensor unit 10 by pressing down an adhesive 50 that is arranged on the bottom surface 18, the adhesive 50 spreading from the aperture 60 side to the side surface 42 side flows down the groove 64, and is accommodated therein. Thus, the adhesive 50 is unlikely to be pushed up higher than the position U on the bottom surface of the absolute pressure sensor unit 30. Thus, the adhesive 50 is unlikely to contact the side surfaces 66. Thus, stress is unlikely to occur due to difference in thermal expansion coefficient between the side surfaces 66 and the adhesive 50. Thus, distortion is unlikely to occur to the side surfaces 66 due to the stress. Thus, it is possible to suppress variation of output of the pressure sensor device 300.

The depth Dg of a groove 64 may be greater than the width Wg of the groove 64. Since the depth Dg is greater than the width Wg, the adhesive 50 can be accommodated in the grooves 64 while miniaturizing the sensor unit 10. Thus, variation of output of the pressure sensor device 300 can be suppressed while miniaturizing the sensor unit 10.

Figure 17A:
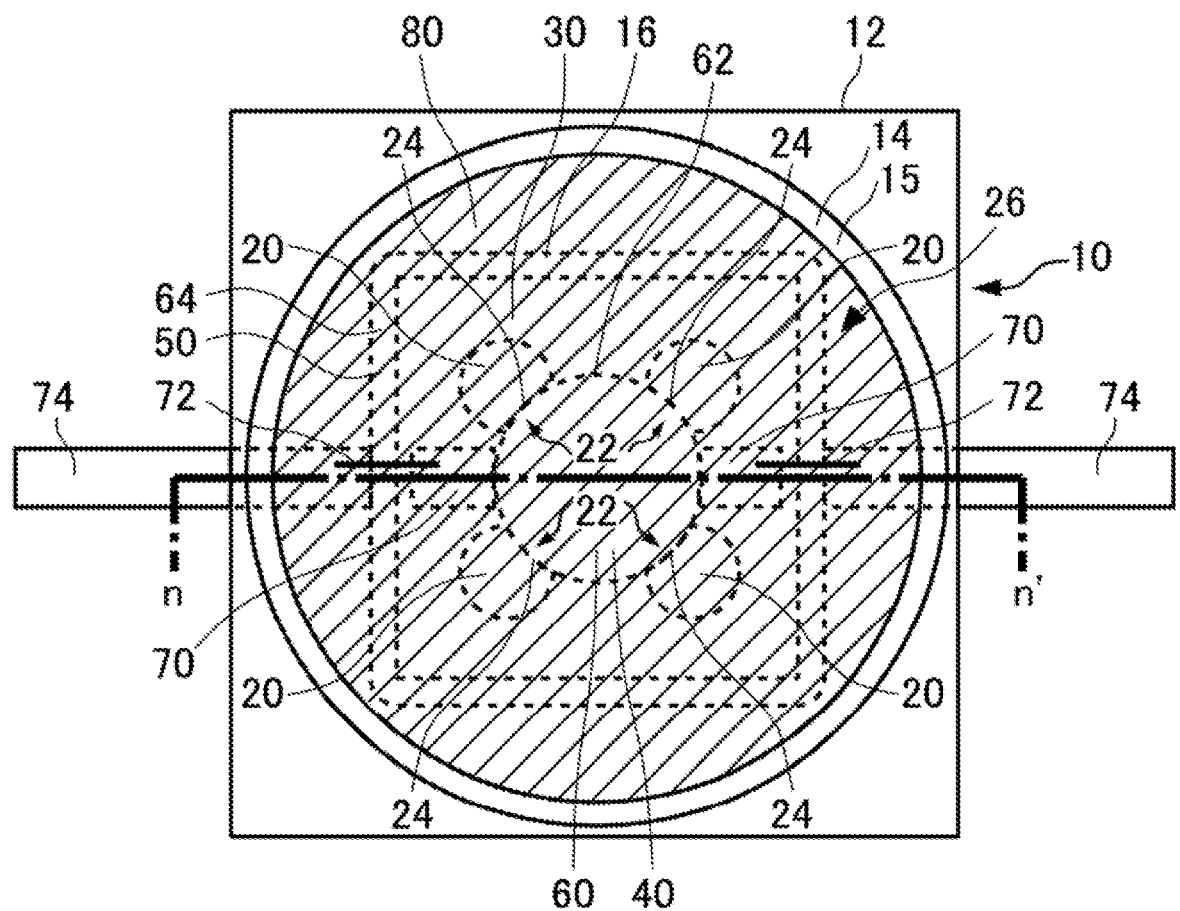
FIG. 17a is a drawing to illustrate the upper surface of a pressure sensor device 350 of Comparative Example 4.
Figure 17A:
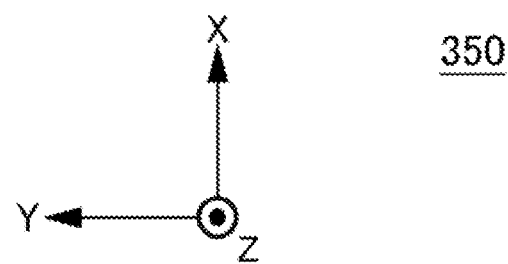

FIG. 17a is a drawing to illustrate the upper surface of a pressure sensor device 350 of Comparative Example 4. The pressure sensor device 350 of Comparative Example 4 is different from the pressure sensor device 300 illustrated in FIG. 16*a* in that grooves 64 are not provided to ends of a bottom surface 18 of a sensor case 10.

Figure 17B:
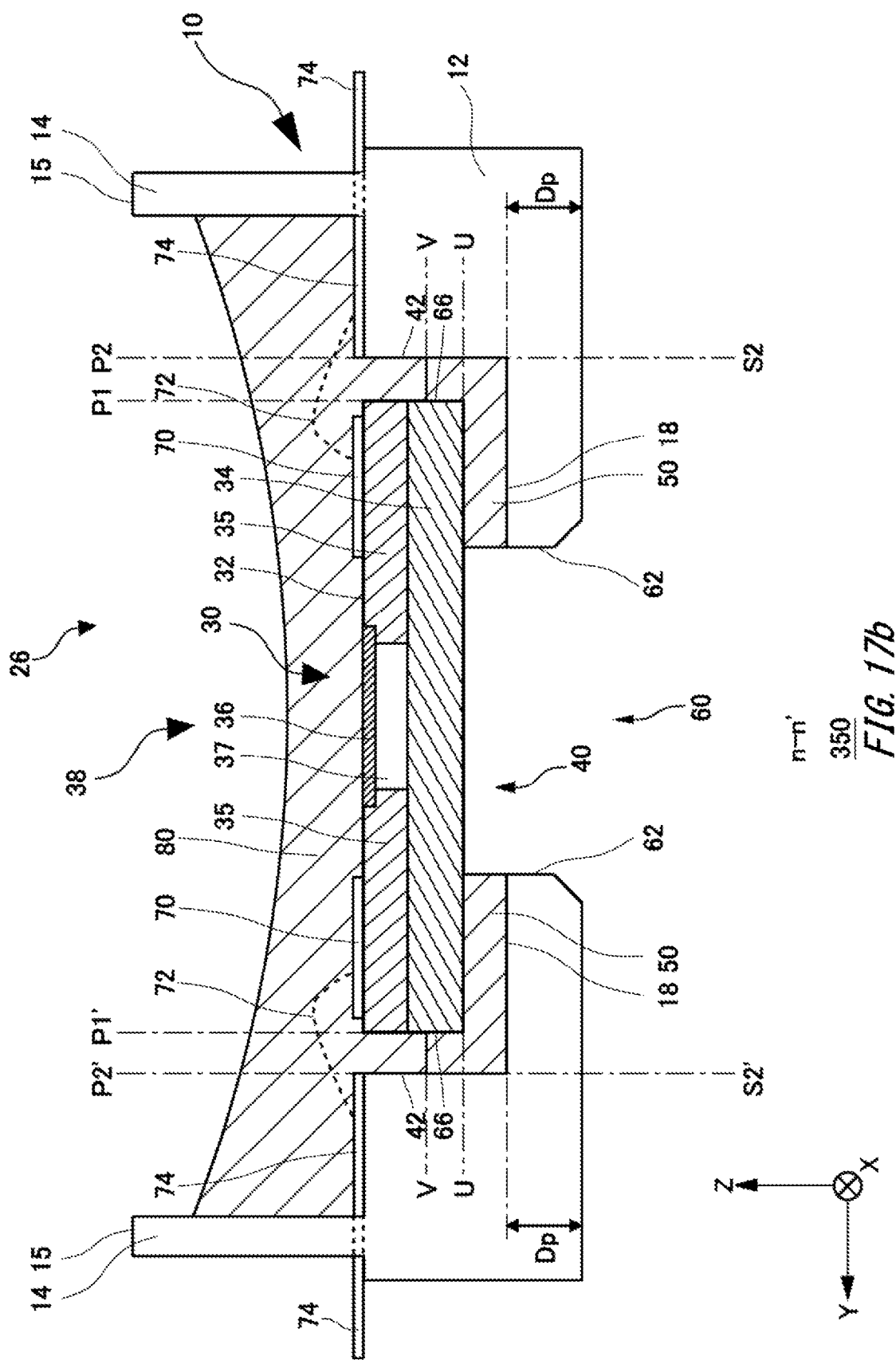

FIG. 17*b* is a drawing to illustrate an n-n' cross section shown in FIG. 17*a*. The n-n' cross section is a YZ plane passing through lead terminals 74, a wall 14, and a protectant 80. As shown in FIG. 17*b*, the pressure sensor device 350 of Comparative Example 4 is not provided with grooves 64 on the bottom surface 18 of the sensor case 10. Thus, in an assembly process of the pressure sensor device 350, if the absolute pressure sensor unit 30 is loaded to the sensor unit 10 by pressing down an adhesive 50 that is arranged on the bottom surface 18, the adhesive 50 spreading from the aperture 60 side to the side surface 42 side is easily pushed up higher than a position U on the bottom surface of the absolute pressure sensor unit 30. That is, a position V in the Z axis direction of the upper surface of the adhesive 50 is easily arranged higher (+Z axis side) than the position U. Thus, stress is likely to occur due to difference in thermal expansion coefficient between the side surfaces 66 and the adhesive 50. Thus, distortion is likely to occur to the side surfaces 66 due to the stress. Thus, variation of output of the pressure sensor device 350 is likely to occur.

Figure 18A:
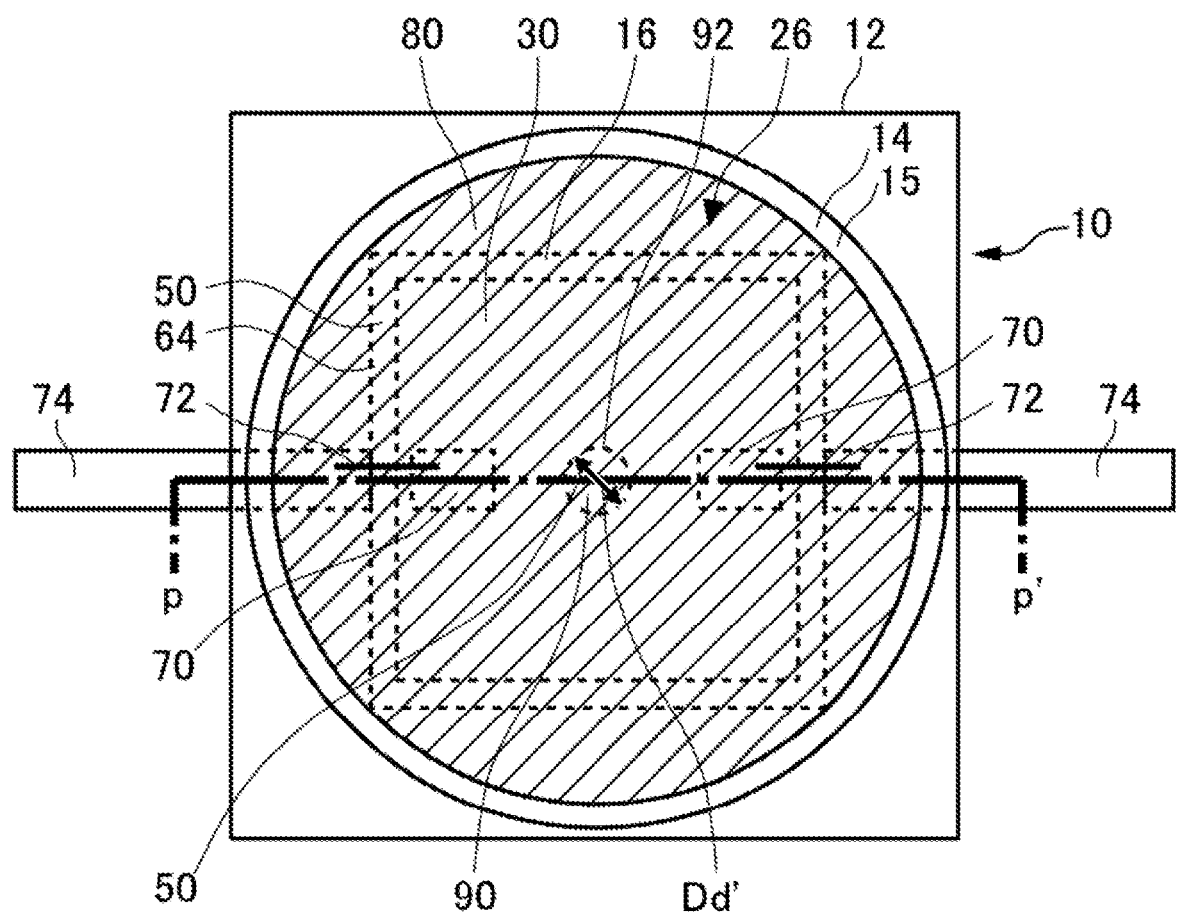
FIG. 18a is a drawing to illustrate another exemplary upper surface of a pressure sensor device 300 according to the third embodiment.

FIG. 18*a* is a drawing to illustrate another exemplary upper surface of a pressure sensor device 300 according to the third embodiment. The pressure sensor device 300 of the present example is different from the pressure sensor device 200 illustrated in FIG. 10*a* in that grooves 64 are provided on ends of a bottom surface 18 of a sensor case 10. The grooves 64 of the present example are provided in the depth direction (−Z axis direction) from the bottom surface 18. The grooves 64 terminate in the depth direction between the bottom surface 18 and the bottom surface of a base portion 12 of the sensor case 10. That is, the grooves 64 do not penetrate the bottom surface of the base portion 12.

The grooves 64 may be provided so as to surround an absolute pressure sensor unit 30 when seen from above. That is, the grooves 64 may be provided to an end on the +Y axis side and an end on the −Y axis side, and an end on the +X axis side and an end on the −X axis side of the bottom surface 18.

The grooves 64 may be provided to positions not overlapping the absolute pressure sensor unit 30 when seen from above. That is, the grooves 64 may be provided outside the periphery of the absolute pressure sensor unit 30 so as to surround the absolute pressure sensor unit 30 when seen from above.

Figure 18B:
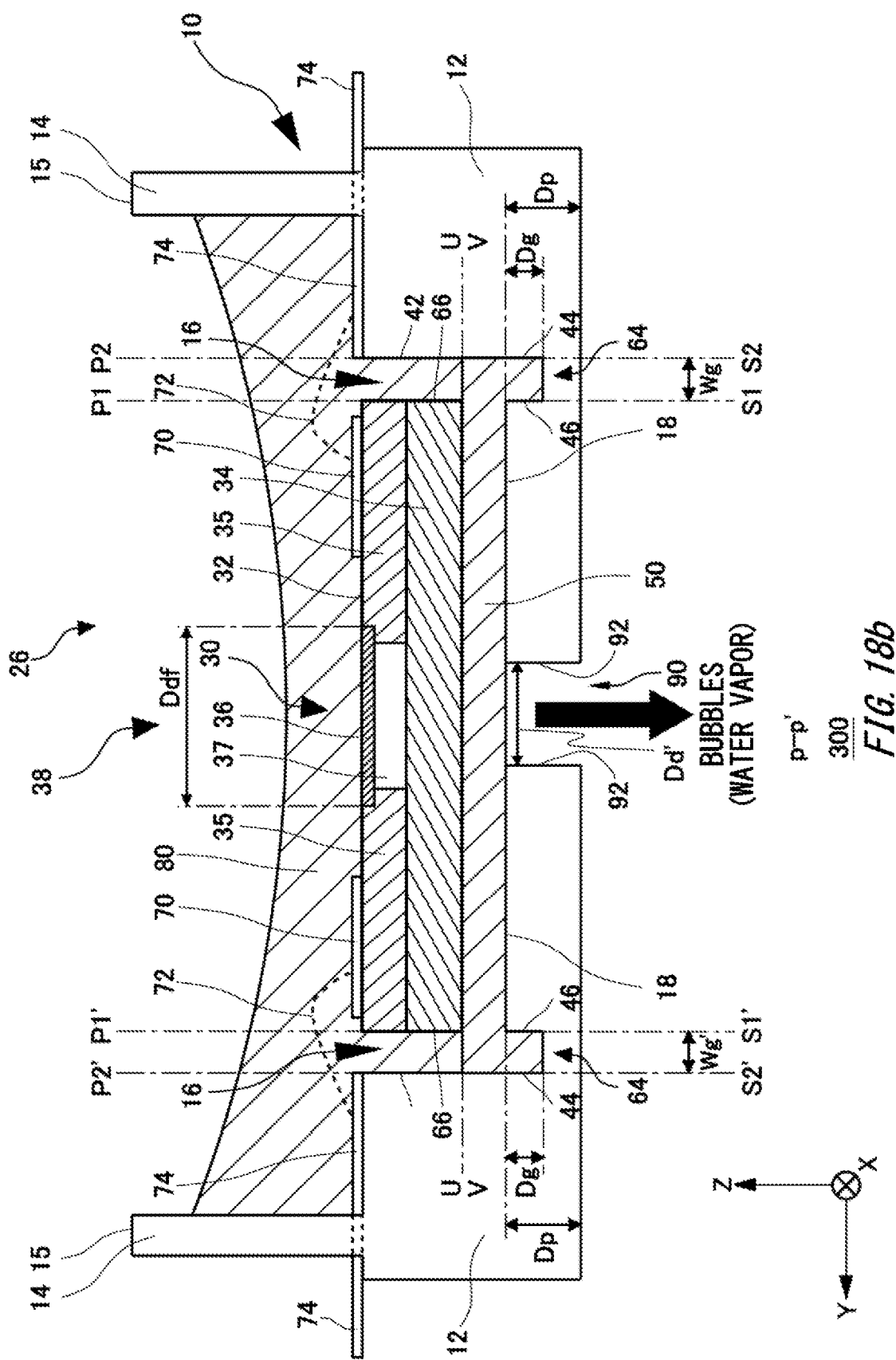

FIG. 18*b* is a drawing to illustrate an exemplary p-p' cross section shown in the drawing 18*a*. The p-p' cross section is a YZ plane passing through lead terminals 74, a wall 14, and a protectant 80. As shown in FIG. 18*b*, a pressure sensor device 300 of the present example is provided with grooves 64 on a bottom surface 18 of a sensor case 10. The grooves 64 may be provided to ends on the +Y axis side and the −Y axis side of the bottom surface 18.

The pressure sensor device 300 of the present example is provided with the grooves 64 on ends on the bottom surface 18 of the sensor unit 10. Thus, in an assembly process of the pressure sensor device 300, if the absolute pressure sensor unit 30 is loaded to the sensor unit 10 by pressing down an adhesive 50 that is arranged on the bottom surface 18, the adhesive 50 spreading from the aperture 60 side to the side surface 42 side flows down the groove 64, and is accommodated therein. Thus, the adhesive 50 is unlikely to be pushed up higher than a position U on the bottom surface of the absolute pressure sensor unit 30. Thus, the adhesive 50 is unlikely to contact side surface 66. Thus, stress is unlikely to occur due to difference in thermal expansion coefficient between the side surfaces 66 and the adhesive 50. Thus, distortion is unlikely to occur to the side surfaces 66 due to the stress. Thus, it is possible to suppress variation of output of the pressure sensor device 300.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A pressure sensor device comprising:
    an absolute pressure sensor unit;
    a sensor case to accommodate the absolute pressure sensor unit; and
    an adhesive provided between the absolute pressure sensor unit and the sensor case to fix the absolute pressure sensor unit and the sensor case, wherein:
    the sensor case has at least one protrusion on a bottom surface;
    the protrusion is under the absolute pressure sensor unit;
    there is space free of the adhesive at a part of a region between the absolute pressure sensor unit and the sensor case, and under the absolute pressure sensor unit; and
    a lower portion of the absolute pressure sensor unit and the bottom surface of the sensor case are fixed via the adhesive.

2. A pressure sensor device comprising:
    an absolute pressure sensor unit;
    a sensor case to accommodate the absolute pressure sensor unit; and
    an adhesive provided between the absolute pressure sensor unit and the sensor case to fix the absolute pressure sensor unit and the sensor case, wherein:
    the sensor case has at least one protrusion on a bottom surface;
    the absolute pressure sensor unit is provided above the protrusion; and
    there is space free of the adhesive at a part of a region between the absolute pressure sensor unit and the sensor case, and under the absolute pressure sensor unit, and
    the sensor case is provided with at least three protrusions, each of which is the protrusion.

3. The pressure sensor device according to claim 1, wherein the adhesive is provided outside the space when seen from above, under the absolute pressure sensor unit.

4. A pressure sensor device comprising:
an absolute pressure sensor unit;
a sensor case to accommodate the absolute pressure sensor unit; and
an adhesive provided between the absolute pressure sensor unit and the sensor case to fix the absolute pressure sensor unit and the sensor case, wherein:
the sensor case has at least one protrusion on a bottom surface;
the absolute pressure sensor unit is provided above the protrusion; and
there is space free of the adhesive at a part of a region between the absolute pressure sensor unit and the sensor case, and under the absolute pressure sensor unit,
the adhesive is provided outside the space when seen from above, under the absolute pressure sensor unit, and
the space is provided inside a region surrounded by a plurality of protrusions, each of which is the protrusion.

5. The pressure sensor device according to claim 1, wherein
the adhesive is provided inside the space when seen from above, under the absolute pressure sensor unit.

6. The pressure sensor device according to claim 5, wherein the space is provided outside a region surrounded by a plurality of protrusions, each of which is the protrusion.

7. The pressure sensor device according to claim 4, wherein the plurality of protrusions contacts the space.

8. The pressure sensor device according to claim 1, wherein a bottom surface of the sensor case has an aperture at a position overlapping the absolute pressure sensor unit, when seen from above the sensor case, wherein
the adhesive does not exist above the aperture.

9. The pressure sensor device according to claim 8, wherein
the protrusion has a notch portion, when seen from above the sensor case, wherein
an edge of the notch portion and an edge of the aperture overlap, when seen from above the sensor case.

10. The pressure sensor device according to claim 9, wherein the edge of the notch portion passes through a top of the protrusion.

11. The pressure sensor device according to claim 1, wherein
the adhesive is provided above the protrusion so as to contact the protrusion, and
the absolute pressure sensor unit is provided above the adhesive so as to contact the adhesive.

12. The pressure sensor device according to claim 1, further comprising a protectant composed of a same kind of material as a composing material of the adhesive, wherein
the sensor case is filled with the protectant such that the absolute pressure sensor unit is covered with the protectant.

13. A pressure sensor device comprising:
an absolute pressure sensor unit,
a sensor case, wherein the sensor case is to
accommodate the absolute pressure sensor unit;
have a pressure receiving aperture portion on an upper surface;
have at least one bottom surface aperture portion smaller than the pressure receiving aperture portion on a bottom surface; and
a protrusion under the absolute pressure sensor unit, wherein
a lower portion of the absolute pressure sensor unit and a bottom surface of the sensor case are fixed via an adhesive.

14. The pressure sensor device according to claim 13, wherein the sensor case has a concave portion to accommodate the absolute pressure sensor unit, wherein
the sensor case has the bottom surface aperture portion on a bottom surface of the concave portion.

15. The pressure sensor device according to claim 13, wherein the sensor case has a plurality of bottom surface aperture portions, each of which is the bottom surface aperture portion.

16. The pressure sensor device according to claim 13, wherein
the adhesive is provided above the bottom surface aperture portion.

17. The pressure sensor device according to claim 13, wherein
the adhesive is not provided above the bottom surface aperture portion.

18. The pressure sensor device according to claim 13, wherein
the protrusion is provided in a region that is different from a region of the bottom surface aperture portion when seen from above.

19. The pressure sensor device according to claim 1, wherein
a groove is provided to an end of a bottom surface of the sensor case, and
the groove is provided so as to surround the absolute pressure sensor unit when seen from above the sensor case.

20. The pressure sensor device according to claim 19, wherein
the groove is provided to a position not overlapping the absolute pressure sensor unit when seen from above the sensor case.

21. The pressure sensor device according to claim 1, wherein
the absolute pressure sensor unit includes a support substrate, and a semiconductor substrate fixed to the support substrate;
a diaphragm is provided to an upper surface side of the semiconductor substrate; and
an enclosed space is provided between the diaphragm and the support substrate.

* * * * *